US007864646B2

(12) United States Patent
Tsukahara et al.

(10) Patent No.: US 7,864,646 B2
(45) Date of Patent: Jan. 4, 2011

(54) OPTICAL RECORDING MEDIUM, OPTICAL RECORDING DEVICE, AND OPTICAL RECORDING AND REPRODUCING DEVICE

(75) Inventors: Osamu Tsukahara, Tokyo (JP); Tomo Kishigami, Tokyo (JP); Yoshihiro Kiyose, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 745 days.

(21) Appl. No.: 11/918,646

(22) PCT Filed: Feb. 15, 2006

(86) PCT No.: PCT/JP2006/302615
§ 371 (c)(1),
(2), (4) Date: Oct. 17, 2007

(87) PCT Pub. No.: WO2006/117913
PCT Pub. Date: Nov. 9, 2006

(65) Prior Publication Data
US 2009/0073846 A1 Mar. 19, 2009

(30) Foreign Application Priority Data
Apr. 28, 2005 (JP) ............... 2005-131878
Apr. 28, 2005 (JP) ............... 2005-131926
May 11, 2005 (JP) ............... 2005-138187

(51) Int. Cl.
G11B 7/00 (2006.01)
(52) U.S. Cl. .................................. 369/59.12
(58) Field of Classification Search ............. 369/59.11, 369/59.12, 59.15, 59.16, 59.17, 59.22, 59.23
See application file for complete search history.

(56) References Cited

U.S. PATENT DOCUMENTS 7,751,293 B2 * 7/2010 Ushiyama et al. ........ 369/59.11

FOREIGN PATENT DOCUMENTS

| JP | 60-302424 | 12/1988 |
| JP | 7-129959 A | 5/1995 |
| JP | 2002-63721 A | 2/2002 |
| JP | 2003-30837 A | 1/2003 |
| JP | 2003-208716 A | 7/2003 |
| WO | WO00/11668 | 3/2000 |

* cited by examiner

Primary Examiner—Nabil Z Hindi
(74) Attorney, Agent, or Firm—Birch, Stewart, Kolasch & Birch, LLP

(57) ABSTRACT

An optical recording method and optical recording device using a multi-pulse write strategy to record on an optical disc by recording a signal (S152), reading the peak level of signals corresponding to spaces in the recorded signal (S153), comparing the peak levels of the signals corresponding to the spaces separately according to the length of the pattern corresponding to the immediately preceding mark (S156), and modifying the pulse width of the multi-pulses in the write strategy accordingly (S157-S159). An optical recording method and optical recording device can thereby be obtained that can adjust the pulse width of the multi-pulses in the write strategy to the optimum value and perform optimal recording on the optical disc.

58 Claims, 30 Drawing Sheets

FIG.1
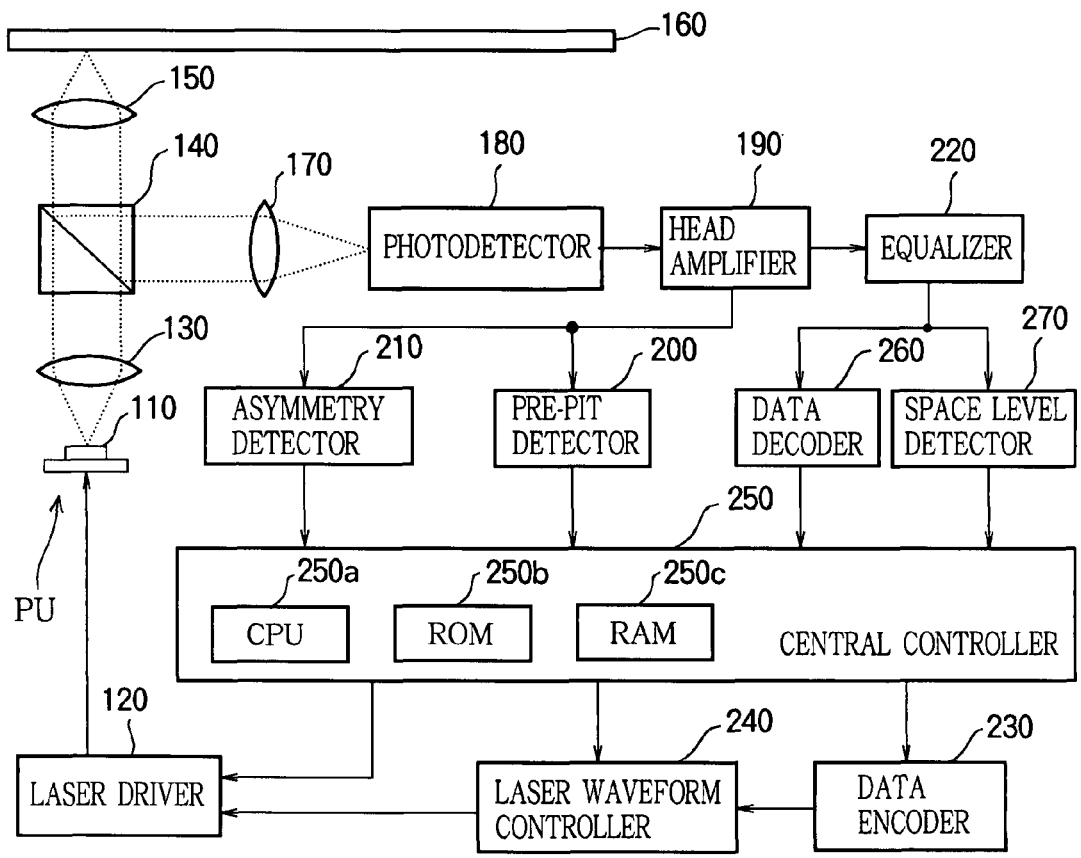
100 : OPTICAL RECORDING AND REPRODUCING DEVICE
FIG.2(a)  FIG.2(b)  FIG.2(c)
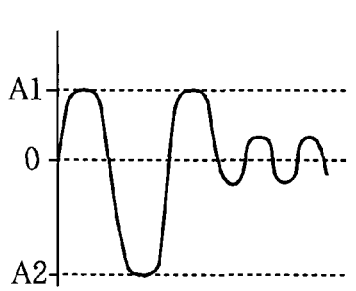 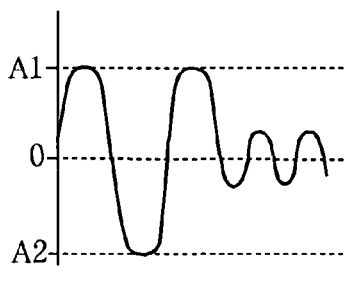 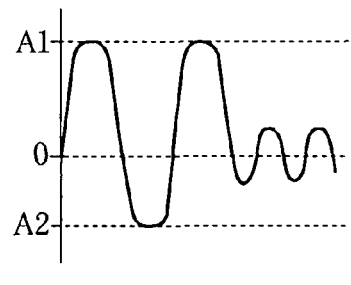

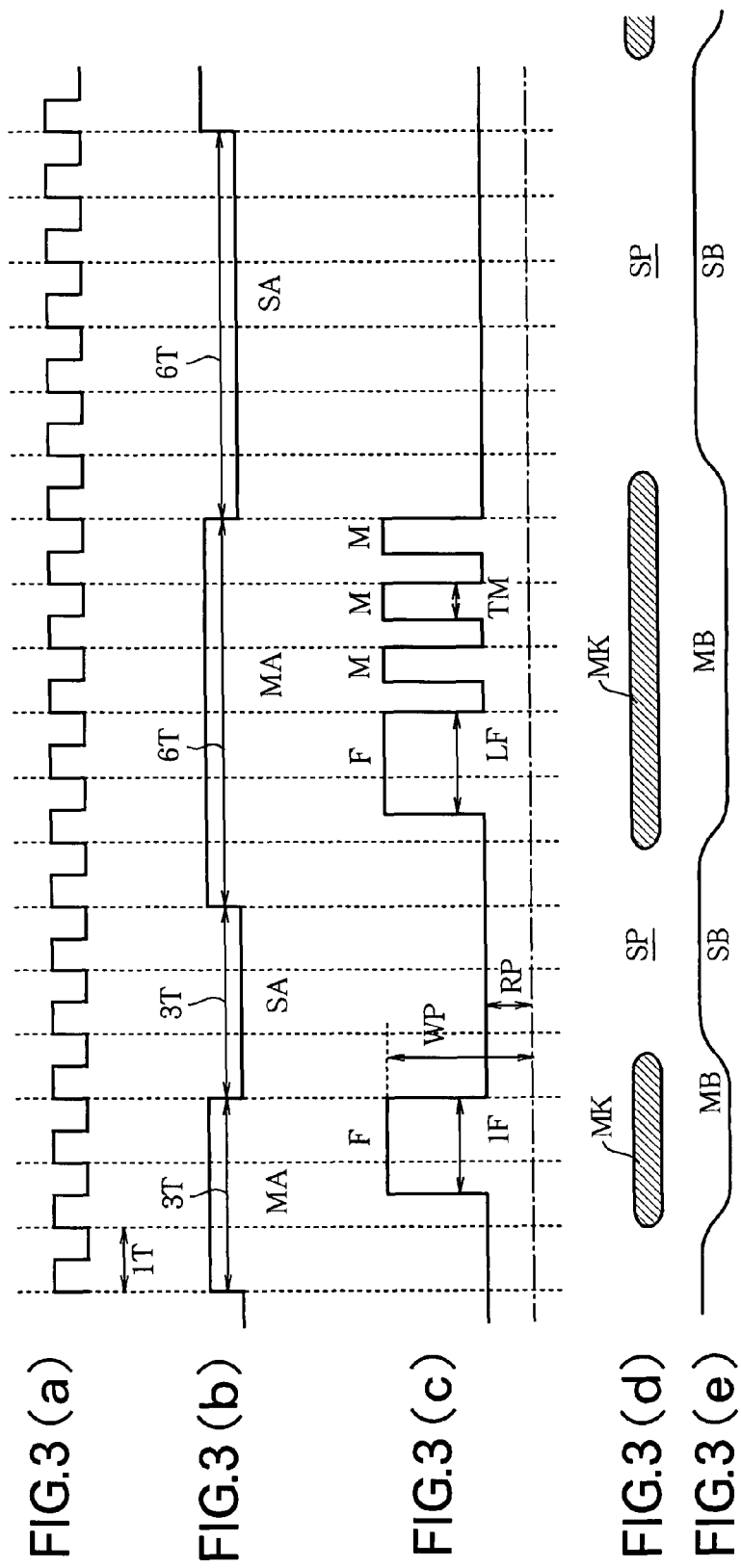

FIG.8 (a)
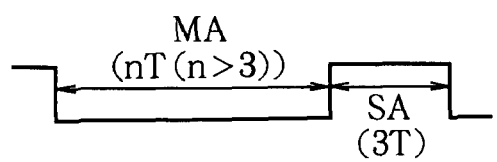
FIG.8 (b)
FIG.8 (c)
FIG.8 (d)
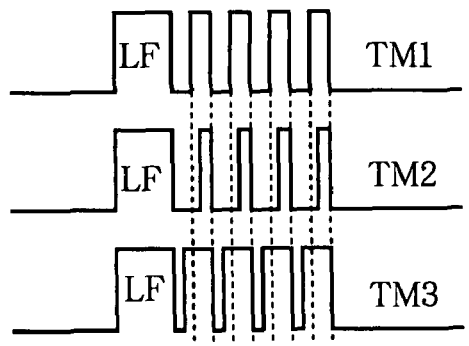
FIG.8 (e)
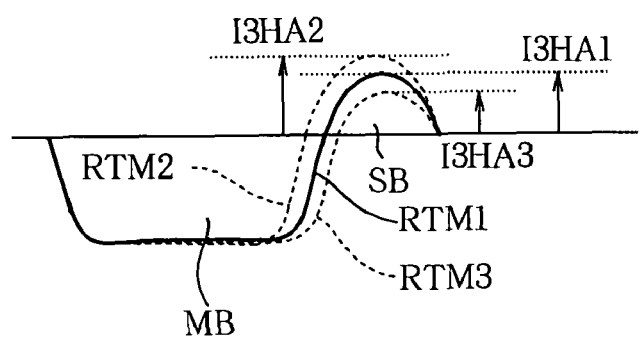

100 : OPTICAL RECORDING AND
REPRODUCING DEVICE

100 : OPTICAL RECORDING AND
REPRODUCING DEVICE

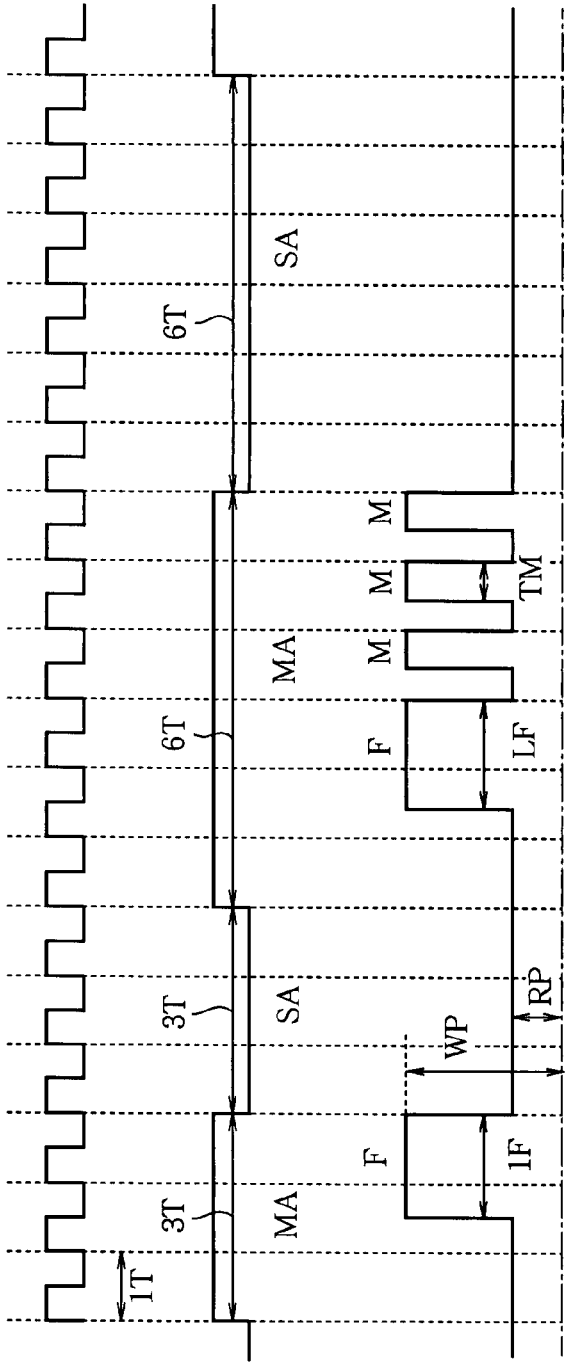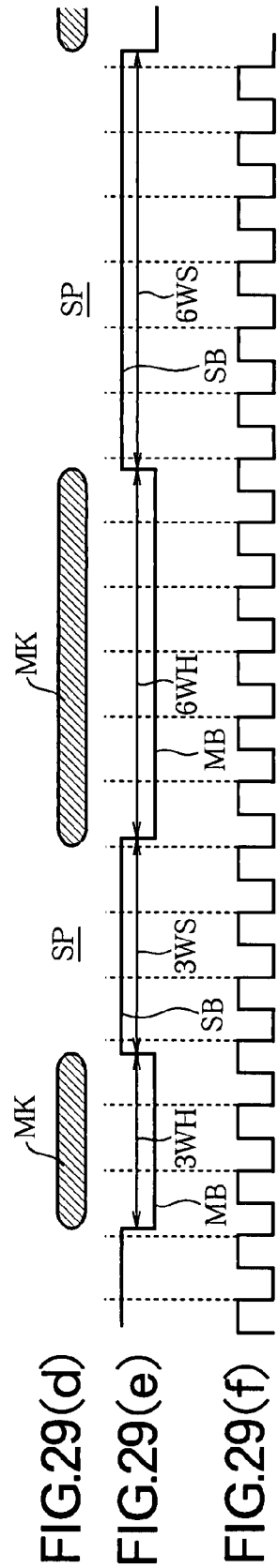
FIG.29(a)
FIG.29(b)
FIG.29(c)
FIG.29(d)
FIG.29(e)
FIG.29(f)

OPTICAL RECORDING MEDIUM, OPTICAL RECORDING DEVICE, AND OPTICAL RECORDING AND REPRODUCING DEVICE

FIELD OF THE INVENTION

The present invention relates to an optical recording method and an optical recording apparatus for recording information on an optical disc, more particularly to a method of adjusting a write strategy used in recording.

The present invention also relates to an optical recording method and optical recording and reproducing apparatus, such as a DVD (digital versatile disc) recorder, for recording information on optical discs, more particularly to a method of selecting a write strategy (laser waveform used for recording) and an apparatus using the method.

BACKGROUND ART

To record information on an optical disc, it is necessary to optimize the write strategy used in recording according to the characteristics of the optical disc.

One method is to read a pit portion formed by test writing and adjust the pulse width of a multi-pulse so that the peak portion of the amplitude of the signal read from the pit portion is approximately flat (see, for example, Patent Document 1).

Another improved method is to reproduce data test-written on an optical disc, detect the phase difference between the reproduced signal and a reference clock, and thereby adjust the starting position of the pulse (see, for example, Patent Document 2).

In another conventional optical recording method and optical recording and reproducing apparatus, to enable the write strategy to be optimized easily and rapidly, the correct direction of change of the write strategy is recognized from the relation between the magnitudes of the initial jitter of the mark and space portions: for example, the leading pulse width for a mark is reduced if the initial mark jitter is greater than the initial space jitter, and the leading mark pulse width is increased if the initial mark jitter is less than the initial space jitter (see, for example, Patent Document 3).

Patent Document 1: Japanese Patent Application Publication No. 2002-63721 (pp. 1-10, FIGS. 1-7)
Patent Document 2: Japanese Patent Application Publication No. 2003-30837 (pp. 1-26, FIGS. 1-10)
Patent Document 3: Japanese Patent Application Publication No. 2003-208716 (paragraphs 0028 and 0029)

DISCLOSURE OF THE INVENTION

Problems to be Solved by the Invention

In the conventional optical recording apparatus described in Patent Document 1, a pit portion formed by test writing is read and the multi-pulse pulse width is adjusted so that the peak portion of the amplitude of the signal read from the pit portion is approximately flat. However, since the variation of the peak portion of the amplitude of the signal read from the pit portion corresponding to the multi-pulse pulse width differs depending on the sensitivity of the optical disc and other factors, it is not clear how much the multi-pulse pulse width should be adjusted. In addition, depending on the characteristics of the optical disc, the signal quality such as jitter is not always improved when the peak portion of the amplitude is approximately flat.

In the conventional optical recording apparatus described in Patent Document 2, data test-written on an optical disc are reproduced, and the phase difference between the reproduced signal and a reference clock is detected to adjust the starting position of the pulse. However, since the phase difference is measured for each combination of mark length and space length immediately preceding or following the mark, the procedure is complicated and a large memory is required for calculating the phase differences and storing the differences for each combination.

In the conventional optical recording method and optical recording and reproducing apparatus described in Patent Document 3, an adjustment is made according to the relation between the magnitudes of the initial mark jitter and the initial space jitter. However, when the leading pulse width is adjusted, the point of minimum jitter does not necessarily yield the optimal write strategy, and when there is a significant difference between the write strategy used for initial recording and the optimal write strategy, it takes time to adjust the leading pulse width.

The present invention seeks to solve the above problems, with the object of obtaining an optical recording method and optical recording apparatus that can perform optimal recording by adjusting the pulse width of a multi-pulse in a write strategy used in recording information on an optical disc to the optimal value for the optical disc.

Another object of the present invention is to obtain an optical recording method and optical recording apparatus that can perform optimal recording by adjusting the write strategy used in recording information on an optical disc to the optimal strategy for the optical disc.

A further object of the present invention is to obtain an optical recording method and optical recording apparatus that can perform optimal recording by adjusting the write strategy used in recording information on an optical disc.

Means of Solution of the Problems

The present invention provides an optical recording method for recording information on an optical recording medium by directing pulsed laser light onto an optical disc, comprising: a writing step of forming marks of prescribed lengths by directing the laser light by a write strategy including only a leading pulse or a leading pulse and a multi-pulse, and forming a recorded portion including marks and spaces of prescribed lengths, each space being situated between two marks; a space level reading step of reading peak levels of signals corresponding to the spaces, the signals being obtained by reading said recorded portion; a recording pulse width modification step of comparing the peak levels of the signals, obtained by reading said recorded portion corresponding to the spaces, according to the lengths of the marks immediately preceding the spaces, and modifying the pulse widths of the multi-pulses in the write strategy according to results of the comparisons; and a writing step of writing to the optical recording medium, using the pulse widths of the write strategy as modified in the recording pulse width modification step.

The present invention also provides an optical recording method for recording information on an optical recording medium by directing pulsed laser light onto an optical disc, comprising: a writing step of forming marks of prescribed lengths by directing the laser light by a write strategy including only a leading pulse or a leading pulse and a multi-pulse, and forming a recorded portion including marks and spaces of prescribed lengths, each space being situated between two marks; a mark level reading step of reading bottom levels of signals corresponding to the marks, the signals being obtained by reading said recorded portion; and a recording pulse modification step of comparing the bottom levels of signals, obtained by reading said recorded portion corresponding to the marks, according to the lengths of the spaces immediately preceding the marks, and modifying the front edge positions of the leading pulses in the write strategy according to results of the comparisons.

This invention further provides an optical recording method comprising: forming marks of lengths corresponding to a prescribed number of clock periods by directing pulsed laser light onto an optical disc, and forming a recorded portion including marks and spaces of lengths corresponding to a prescribed number of clock periods, each space being situated between two marks; and adjusting a pulse width of the laser light for recording so that in a signal obtained by reading the recorded portion, widths of portions corresponding to the marks become equal to the widths of portions corresponding to the spaces of lengths corresponding to the same number of clock periods as the marks.

EFFECT OF THE INVENTION

In an optical recording method for recording information on an optical recording medium by directing pulsed laser light onto an optical disc according to the present invention, comprising a writing step of forming marks of prescribed lengths by directing the laser light by a write strategy including only a leading pulse or a leading pulse and a multi-pulse, and forming a recorded portion including marks and spaces of prescribed lengths, each space being situated between two marks, a space level reading step of reading peak levels of signals corresponding to the spaces, the signals being obtained by reading said recorded portion, a recording pulse width modification step of comparing the peak levels of the signals, obtained by reading said recorded portion corresponding to the spaces, according to the lengths of the marks immediately preceding the spaces, and modifying the pulse widths of the multi-pulses in the write strategy according to results of the comparisons, and a writing step of writing to the optical recording medium, using the pulse widths of the write strategy as modified in the recording pulse width modification step, since the peak levels of the signals corresponding to spaces in the recorded signal are compared according to the lengths of the immediately preceding marks to modify the pulse widths of the multi-pulses in the write strategy, the multi-pulse pulse width optimal for the optical disc can be determined and optimal recording can be carried out.

In an optical recording method for recording information on an optical recording medium by directing pulsed laser light onto an optical disc according to the present invention, comprising a writing step of forming marks of prescribed lengths by directing the laser light by a write strategy including only a leading pulse or a leading pulse and a multi-pulse, and forming a recorded portion including marks and spaces of prescribed lengths, each space being situated between two marks, a mark level reading step of reading bottom levels of signals corresponding to the marks, the signals being obtained by reading said recorded portion, and a recording pulse modification step of comparing the bottom levels of signals obtained by reading said recorded portion corresponding to the marks, according to the lengths of the spaces immediately preceding the marks, and modifying the front edge positions of the leading pulses in the write strategy according to results of the comparisons, since the bottom levels of the signals corresponding to marks in the recorded signal are compared according to the lengths of the immediately preceding spaces to modify the front edge positions of the leading pulses in the write strategy, the front edge position of the leading pulse of the multi-pulse optimal for the optical disc can be determined and optimal recording can be carried out.

In an optical recording method according to this invention comprising forming marks of lengths corresponding to a prescribed number of clock periods by directing pulsed laser light onto an optical disc, and forming a recorded portion including marks and spaces of lengths corresponding to a prescribed number of clock periods, each space being situated between two marks, and adjusting the illumination duration of the laser light for recording so that in a signal obtained by reading the recorded portion, widths of portions corresponding to the marks become equal to the widths of portions corresponding to the spaces of lengths corresponding to the same number of clock periods as the marks, since the illumination duration of the laser light for recording is adjusted so that the widths of portions of the reproduced signal corresponding to the marks become equal to the widths of portions corresponding to the spaces of lengths corresponding to the same number of clock periods as the marks, the optimal leading pulse width for the optical disc can be determined and optimal recording can be carried out.

BRIEF DESCRIPTION OF THE DRAWINGS

FIG. 1 is a block diagram showing an optical recording and reproducing device in a first embodiment of the invention.

FIGS. 2(a) to 2(c) show examples of asymmetries of the reproduced signal detected in the asymmetry detector in the first embodiment of the invention.

FIGS. 3(a) to 3(e) illustrate an exemplary write strategy generated in the optical recording and reproducing device in the first embodiment of the invention when the optical disc is a medium of the dye type.

FIGS. 8(a) to 8(e) show exemplary space levels of reproduced signals detected by the space level detector 270 in the first embodiment of the invention.

FIGS. 29(a) to 29(f) show an exemplary write strategy generated in the optical recording and reproduced device in the fifth embodiment of the invention when the optical disc is a medium of the dye type.

EXPLANATION OF REFERENCE CHARACTERS

Figure 4:
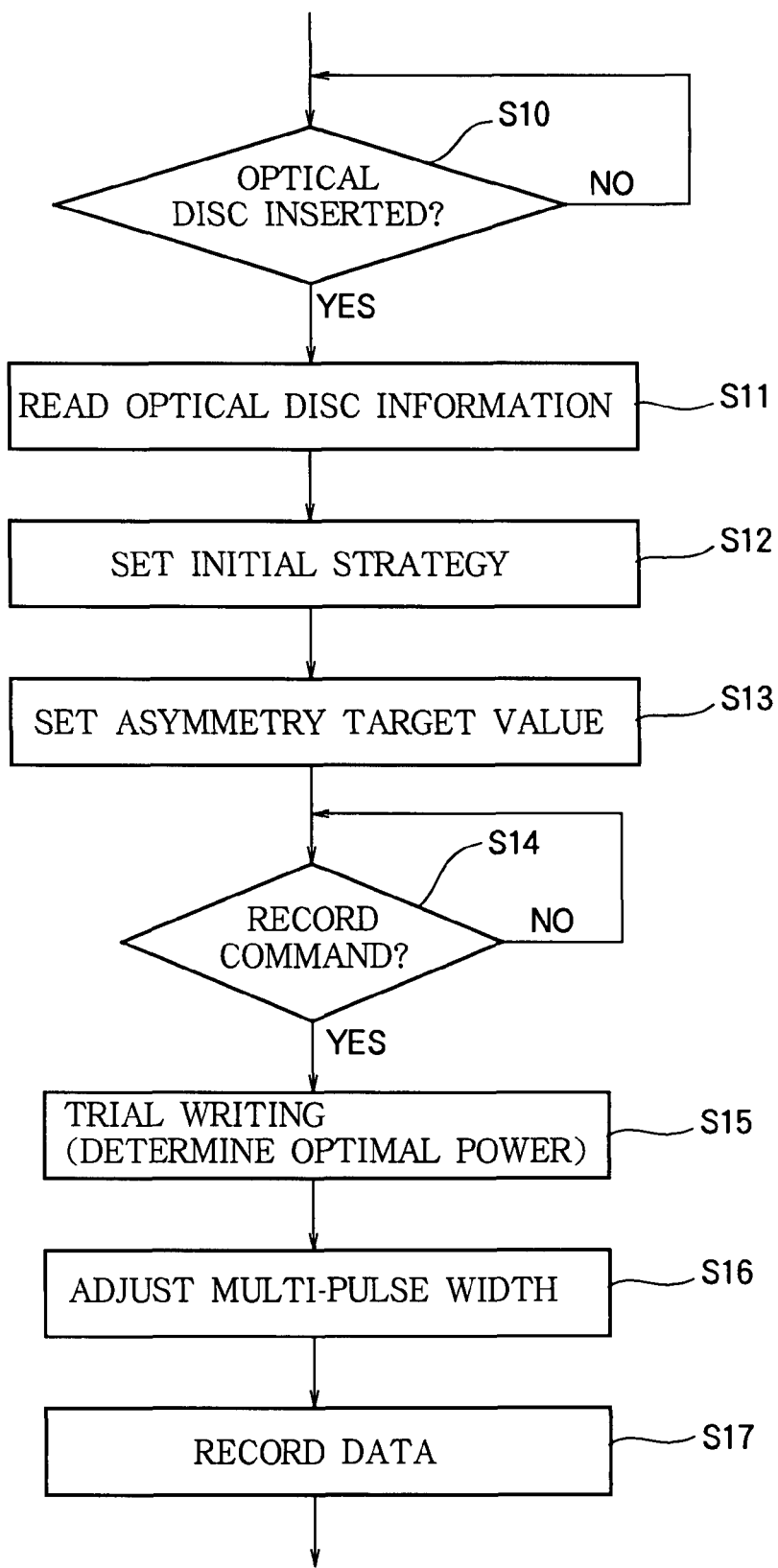
FIG. 4 is a flowchart illustrating the recording procedure of the optical recording and reproducing device in the first embodiment of the invention.

100 optical recording and reproducing device, 110 semiconductor laser, 120 laser driver, 130 collimator lens, 140 beam splitter, 150 objective lens, 160 optical disc, 170 sensor lens, 180 photodetector, 190 head amplifier, 200 pre-pit detector, 210 asymmetry detector, 220 equalizer, 230 data encoder, 240 laser waveform controller, 250 central controller, 260 data decoder, 270 space level detector, 280 mark level detector, 290 pulse width detector.

BEST MODE OF PRACTICING THE INVENTION

Embodiments of the invention will now be described with reference to the attached drawings.

First Embodiment

The optical recording method in the first and second embodiments below performs mark-edge recording (PWM recording). To record information, it causes a semiconductor laser to emit multiple pulses according to a write strategy (laser emission waveform rule used in recording) to form recording marks, based on the data to be recorded on the optical disc. In other words, the write strategy used in the first and second embodiments is a strategy of the multi-pulse type, having one or more pulses in the mark period. As described below, in a write pulse strategy of this multi-pulse type, the pulse widths in the first and second embodiments are adjusted according to the peak levels of signals corresponding to spaces read from a test-written signal.

In addition, in the first and second embodiments described below, lengths of marks and lengths of spaces between the marks are the lengths of the signal portions corresponding to the marks and spaces, expressed in units of the period T of the channel clock used in recording and reproducing, and the recording of information onto the optical disc is carried out by illuminating the optical disc with optical pulses in EFM (8-16) modulation patterns with 3T to 11T and 14T marks, that is, mark lengths of n clock periods, where n is 3 to 11 or 14. The longest mark (the mark with length 14T) is a sync pattern.

FIG. 1 shows an example of the basic structure of an optical recording and reproducing device 100 according to the first embodiment of the invention. In FIG. 1, the semiconductor laser 110 used as a laser light source is driven and controlled by a laser driver 120.

When data are reproduced, a laser beam emitted from the semiconductor laser 110 and having the output value (reproducing power) necessary for data reproduction is focused onto the optical disc 160 through a collimator lens 130, beam splitter 140, and objective lens 150. The light reflected from the optical disc 160 passes through the objective lens 150, is separated from the incident light by the beam splitter 140, and is then received through a sensor lens 170 by a photodetector 180.

In the above structure, the semiconductor laser 110, collimator lens 130, beam splitter 140, objective lens 150, and sensor lens 170 constitute the optical system, which in turn, together with the photodetector 180 and the laser driver 120, constitutes the optical pickup PU.

The photodetector 180 converts the optical signal to an electrical signal. The electrical signal converted by the photodetector 180 is input through a head amplifier 190 into a pre-pit detector 200, an asymmetry detector 210, and an equalizer 220. From the input electrical signal, the pre-pit detector 200 detects prerecorded pre-pit information unique to the optical disc 160, such as a recommended asymmetry value β.

The electrical signal input from the head amplifier 190 to the equalizer 220 is reshaped and input to a data decoder 260 and a space level detector 270. The data decoder 260 binarizes the input signal and generates (reproduces) the data recorded on the optical disc 160 by performing such processes as demodulation and error correction on the input electrical signal.

The space level detector 270 detects the peak level of the space portions of the reproduced signal. Peak levels of spaces of each number of clock periods are detected separately for each length of the mark immediately preceding the space (for each mark length expressed as a number of clock periods). For example, the peak levels of a 3T space are detected separately for the case of a preceding 3T mark and for preceding mark lengths other than 3T.

The asymmetry detector 210 couples the input electrical signal by AC (alternating current) coupling and detects the peak level A1 and bottom level A2 of the AC-coupled electrical signal. Using the equation (1) below, it calculates an asymmetry value β from the detected peak level A1 and bottom level A2.

$$\beta = (A1 + A2)/(A1 - A2) \quad (1)$$

The peak level A1 and bottom level A2 occur in places where spaces of maximum length alternate with marks of maximum length; these values are expressed with a zero level equal to the average value of the peak level and bottom level in places where spaces of minimum length and marks of minimum length appear alternately.

FIGS. 2(a) to 2(c) show examples of the detection of the asymmetry value in the detected reproduced signal (the signal output from the head amplifier 190) in the asymmetry detector 210. FIG. 2(a) illustrates the case in which $\beta<0$. FIG. 2(b) illustrates the case in which $\beta=0$. FIG. 2(c) illustrates the case in which $\beta>0$.

In the recording of data, a data encoder 230 adds error correction symbols to the original data to be recorded that are received from a central controller 250 and modulates the data to generate the recording data on which the driving signal to the semiconductor laser 110 is based. A laser waveform controller 240 generates a write strategy signal based on the recording data. That is, after the write strategy is set by the central controller 250, when the data encoder 230 provides recording data specifying a number of periods n, more specifically, recording data specifying one of 3T to 11T or 14T, the laser waveform controller 240 outputs a write strategy signal corresponding to the provided recording data (a signal having a waveform approximately matching the waveform of the emitted optical pulse train).

The laser driver 120 drives the semiconductor laser 110 with driving current responsive to the write strategy signal thus generated. A laser beam emitted from the semiconductor laser 110 with the output value (recording power) necessary for recording the data is focused onto the optical disc 160 through the collimator lens 130, beam splitter 140, and objective lens 150. This generates marks and thus recorded portions comprising marks with spaces between them.

FIGS. 3(a) to 3(e) show an example of a write strategy generated in the laser waveform controller 240 in the optical recording and reproducing apparatus 100 shown in FIG. 1 when the optical disc 160 is a medium of the dye type. FIG. 3(a) shows a channel clock having a period T used for recording (a recording channel clock). FIG. 3(b) shows exemplary data to be recorded comprising marks MA and spaces SA. FIG. 3(c) shows the write strategy signal, i.e., the emitted optical pulse pattern, for recording the data in FIG. 3(b). In the emitted optical pulse pattern, the level is changed between the recording power level WP and reproducing power level RP, and the width of each pulse is defined as the duration spent at the recording power level WP.

FIG. 3(d) shows marks MK and spaces SP positioned between the marks MK, generated on the optical disc by recording with the write strategy in FIG. 3(c). The horizontal axis in FIG. 3(d) indicates length (position) along the tracks on the optical disc, but for convenience, this axis is shown here as corresponding to the emitted optical pulse pattern in FIG. 3(c).

FIG. 3(e) shows a reproduced signal obtained by reading the marks MK and the spaces SP in FIG. 3(d). This reproduced signal has portions MB corresponding to the marks MK and portions SB corresponding to the spaces SP.

The shortest mark has a length of n=3 periods, corresponding to 3T, while the longest mark has a length of n=14 periods, corresponding to 14T.

FIG. 3(b) and FIG. 3(c) show a case in which the shortest mark, namely the 3T mark, is recorded, and then the fourth-shortest mark, namely the 6T mark, is recorded.

As shown at the left in FIG. 3(c), when the recorded data are the shortest mark, the write strategy consists only of a leading pulse F having pulse width 1F.

As shown at the right in FIG. 3(c), the write strategy for recording the fourth shortest mark consists of a leading pulse F having pulse width LF followed by three multi-pulses M.

The write strategy for recording the p-th shortest mark (4<p<10, having a length corresponding to (p+2)T=nT), consists of a leading pulse F having pulse width LF, followed by (p−1) multi-pulses M.

The write strategy for recording the longest mark (a mark having length 14T) consists of a leading pulse F having pulse width LF, followed by eleven multi-pulses M.

As shown, the marks from the fourth shortest mark to the longest mark have the same leading pulse width LF.

The write strategy for recording the second shortest mark consists of a leading pulse F having pulse width 2F, followed by one multi-pulse M.

The write strategy for recording the third shortest mark consists of a leading pulse having pulse width 3F, followed by two multi-pulses M.

The width of the multi-pulses M is the same in all of the cases above.

During reproducing and writing operations by the optical recording and reproducing device 100, the central controller 250 controls the device as a whole. The central controller 250 receives pre-pit information from the pre-pit detector 200, an asymmetry value from the asymmetry detector 210, reproduced data from the data decoder 260, and a space level value from the space level detector 270, and provides control signals to the data encoder 230, the laser waveform controller 240, and the laser driver 120.

In addition, the central controller 250 controls the determination of the write strategy, especially the calculation of pulse widths and the asymmetry value, and controls trial writing performed by use of a modified write strategy and asymmetry value as described later with reference to FIG. 4 and FIG. 5, 6, or 7.

The central controller 250 comprises, for example, a CPU 250a, a ROM 250b storing programs for the operation of the CPU 250a, and a RAM 250c for storing data. The programs stored in the ROM 250b include calculations for adjusting pulse widths of the multi-pulses and a section defining modification of the pulse widths of the multi-pulses, as described later with reference to FIG. 5, 6 or 7, FIGS. 8(a) to 8(e), and FIGS. 9(a) to 9(c). The ROM 250b stores various constants such as coefficients for determining modification values of the pulse widths and tolerances for determining modification precision in the modification of the pulse widths of the multi-pulses, as described later.

It is a general practice to optimize the recording power by performing trial writing before recording information. The procedure will be described below.

First, trial writing on the optical disc 160 is performed by use of a test pattern comprising 3T-11T marks and spaces corresponding to random recording data, for example, under varied recording power; next, the area on the optical disc 160 on which this test pattern has been recorded is reproduced, the asymmetry value is detected by the asymmetry detector 210, and the detected asymmetry value is compared with a target asymmetry value in the central controller 250 to obtain the optimal recording power.

In general, the higher the recording power is, the higher the asymmetry value becomes, and the lower the recording power is, the lower the asymmetry value becomes.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disc 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

In this basic optical recording method, in the first and second embodiments, when a signal is reproduced by reading the marks MK and spaces SP generated by trial writing, the peak levels of the signal portions SB corresponding to the spaces SP are detected separately for each length of the mark MK immediately preceding the space SP (the length, expressed in clock periods, of the reproduced signal portions MB corresponding to the mark MK), the peak levels are mutually compared, and the pulse widths of the multi-pulses are adjusted according to the results of the comparisons.

The procedure followed in the optical recording method of the first embodiment will now be described with reference to FIG. 4.

First, when the optical disc 160 to be used in recording is inserted in the optical recording device 100, a sensor (not shown) detects this (step S10) and notifies the central controller 250, and the central controller 250 drives the optical pickup PU, thereby reading from the optical disc 160 the disc-specific information prerecorded by the disc manufacturer, such as the recommended write strategy values and the recommended value of the asymmetry value $\beta$ (step S11).

Next, in step S12, the recommended write strategy value read from the optical disc 160 is set in the central controller 250 (in the RAM 250c, for example) as the initial write strategy for adjusting the pulse width of the multi-pulses. It is possible to use a specific write strategy preset in the optical recording device 100 instead of values read from the optical disc 160 as the initial write strategy.

Next, in step S13, the recommended value of the asymmetry value $\beta$ read from the optical disc 160 is set in the central controller 250 (in the RAM 250c, for example) as the target value to be used for optimizing the recording power. It is possible to use a specific value preset in the optical recording device 100 instead of a value read from the optical disc 160 as the target asymmetry value $\beta$.

Then, when a record command is given by a means not shown in the drawings (S14), in step S15, trial writing on the optical disc 60 is performed by use of the initial write strategy and target asymmetry value set as described above. That is, the write strategy (the strategy for each nT) set in the central controller 250 in step S12 is set in the laser waveform controller 240, a write strategy based on a test pattern is generated in the laser waveform controller 240, and trial writing on the optical disc 66 is performed using the optical pickup. Then the area on the optical disc 160 on which the test pattern has been recorded is reproduced using the optical pickup, the asymmetry value detected by the asymmetry detector 210 is compared with the target asymmetry value set in step S13 in the central controller 250, and control is performed to make the two values match, whereby the optimal recording power is determined.

When this trial writing has been performed and the power has been adjusted, in step S16, the pulse width of the multi-pulse is adjusted. The power may be readjusted when the pulse width of the multi-pulse is adjusted in step S16.

Finally, in step S17, the multi-pulse pulse width adjusted in step S16 is set in the laser waveform controller 240, a write strategy based on the recording data is generated in the laser waveform controller 240, and using the recording power determined in step S15, original data are written (original writing) on the optical disc 60. If the recording power has been readjusted in step S16, the recording power determined in step S16 may be used instead of the value determined in step S15.

Of the above processes, the process in step S10 is performed by the central controller 250 and a sensor (not shown) for detecting the insertion of an optical disc, the process in step S11 is performed by the optical pickup PU, the head amplifier 190, the equalizer 220, the data decoder 260, and the central controller 250, the processes in steps S12 and S13 are performed by the central controller 250, the process in step S14 is performed by the central controller 250 and a means (interface) for receiving record commands (not shown), the process in step S15 is performed by the head amplifier 190, the asymmetry detector 210, the central controller 250, the laser waveform controller 240, and the optical pickup PU, the process in step S16 is performed by the head amplifier 190, the equalizer 220, the space level detector 270, the central controller 250, the laser waveform controller 240, and the optical pickup PU, and the process in step S17 is performed by the central controller 250, the laser waveform controller 240, and the optical pickup PU.

Figure 5:
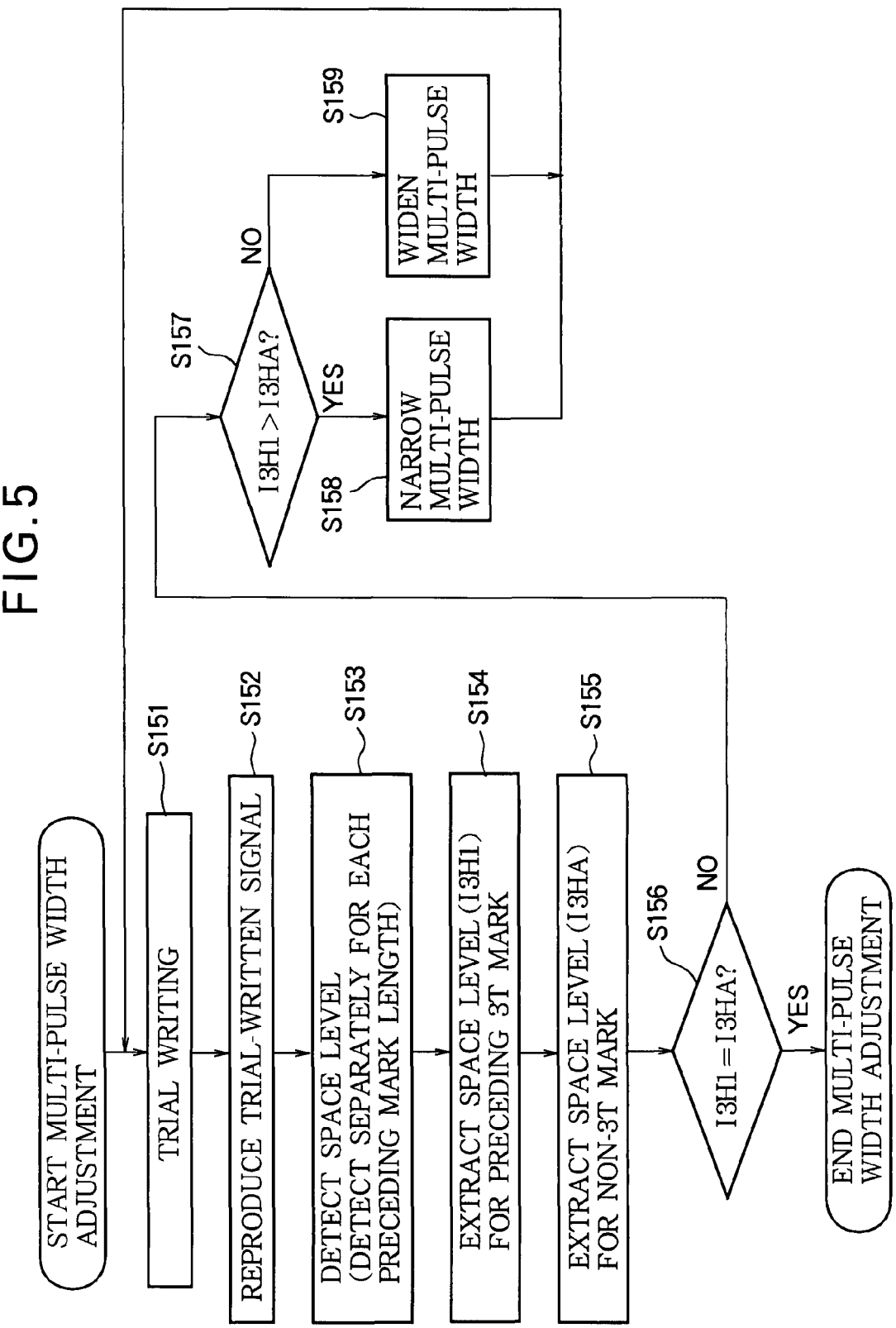
FIG. 5 is a flowchart illustrating an exemplary multi-pulse adjustment procedure for the optical recording and reproducing device in the first embodiment of the invention.

FIG. 5 shows the process performed in step S16 in FIG. 4 in more detail.

In step S151, the initial write strategy set in step S12 and the recording power determined in step S14 are used to perform trial writing on the optical disc 60, and in step S152, the signal written in step S151 is reproduced.

The process in step S151 is performed by the central controller 250, laser waveform controller 240, and optical pickup PU, and the process in step S152 is performed by the optical pickup PU, head amplifier 190, and equalizer 220.

Next, in step S153, the space level detector 270 detects signal levels of a space having a length of 3T in the signal reproduced in step S152; the signal levels are detected separately for each length of the mark preceding the space.

Next, in step S154, from the signal levels detected in step S153 for the space of length 3T, the space signal level I3H1 (the level of signal SB corresponding to space SP) for the case in which the mark preceding the space has a length of 3T is extracted. The processes in steps S153 and S154 are performed by the space level detector 270 and the central controller 250.

Next, in step S155, from the signal levels detected in step S153 for the space of length 3T, the space signal levels for all cases in which the mark preceding the space has a length other than 3T are extracted, and their mean value I3HA is calculated.

As the space signal levels for the cases in which the mark preceding the space has a length other than 3T, the mean value of the space signal levels for all cases in which the preceding mark has a length other than 3T was used here, but it is possible to use the space signal level for the case in which the preceding mark has a specific length nT other than 3T, or the mean value of the space signal levels for a plurality of cases in which the preceding mark has a length other than 3T (a plurality of differing values of nT).

Next, in step S156, the space signal level I3H1 extracted in step S154 for a preceding mark length of 3T and the space signal level I3HA extracted in step S155 for preceding mark lengths other than 3T are compared, and if the two values are equal, the multi-pulse adjustment is terminated.

It is not necessary for the space signal level I3H1 for a preceding mark length of 3T and the space signal level I3HA for preceding mark lengths other than 3T to match exactly; if they match within a preset tolerance, the space signal level I3H1 for a preceding mark length of 3T and the space signal level I3HA for preceding mark lengths other than 3T are taken to be equal, and the multi-pulse adjustment is terminated.

When the space signal level I3H1 for a preceding mark length of 3T and the space signal level I3HA for preceding mark lengths other than 3T are not equal, step S157 is carried out.

In step S157, the space signal level I3H1 for a preceding mark length of 3T and the space signal level I3HA for preceding mark lengths other than 3T are compared to determine which has the higher value.

When the space signal level I3H1 for the preceding mark length of 3T has the higher value, in step S158, the pulse width of the multi-pulse is modified so that it becomes narrower than the pulse width of the multi-pulse used in trial writing in step S151.

When the space signal level I3H1 for the preceding mark length of 3T has the lower value, in step S158, the pulse width of the multi-pulse is modified so that it becomes wider than the pulse width of the multi-pulse used in trial writing in step S151.

In the modification of the pulse width of the multi-pulses, the modification value of the pulse width of the multi-pulses corresponding to the difference between the space signal level I3H1 for the preceding mark length of 3T and the space signal level I3HA for preceding mark lengths other than 3T is calculated in advance, and the pulse width of the multi-pulse is modified according to the modification value corresponding to the difference between the space signal level I3H1 for the preceding mark length of 3T and the space signal level I3HA for the preceding mark lengths other than 3T. Alternatively, a preset fixed value or a minimum value that can be changed in the laser waveform controller 240 may be used.

The processes in steps S155 to S159 are performed in the central controller 250.

After the pulse width of the multi-pulse is modified in step S158 or in step S159, the modified pulse width of the multi-pulse is used to perform trial writing in step S151 and the subsequent steps are repeated so as to perform the multi-pulse adjustment until, in step S156, the space signal level I3H1 for the preceding mark length of 3T and the space signal level I3HA for the preceding mark lengths other than 3T become equal.

Prior to the trial writing in step S151, the optimal power may be readjusted.

The multi-pulse adjustment is performed until the space signal level I3H1 for the preceding mark length of 3T and the space signal level I3HA for the preceding mark lengths other than 3T become equal, but it is possible to terminate the multi-pulse adjustment when the difference between the space signal level I3H1 for a preceding mark length of 3T and the space signal level I3HA for preceding mark lengths other than 3T reaches a minimum.

It is also possible to terminate the multi-pulse adjustment when the difference between the space signal level I3H1 for a preceding mark length of 3T and the space signal level I3HA for preceding mark lengths other than 3T is smaller than a preset tolerance value.

It is also possible to preset a limit value for the multi-pulse adjustment, and to terminate the multi-pulse adjustment when the number of times the multi-pulses have been modified exceeds the limit value. For example, when the result in step S156 is negative, the procedure may proceed to step S161 in FIG. 6, in which it is determined whether the number of modifications has exceeded a prescribed value. If the value is exceeded (Yes in step S161), the multi-pulse adjustment is terminated. If the value is not exceeded (No in step S161), the procedure proceeds to step S157. The process in step S161 is performed in the central controller 250.

Figure 7:
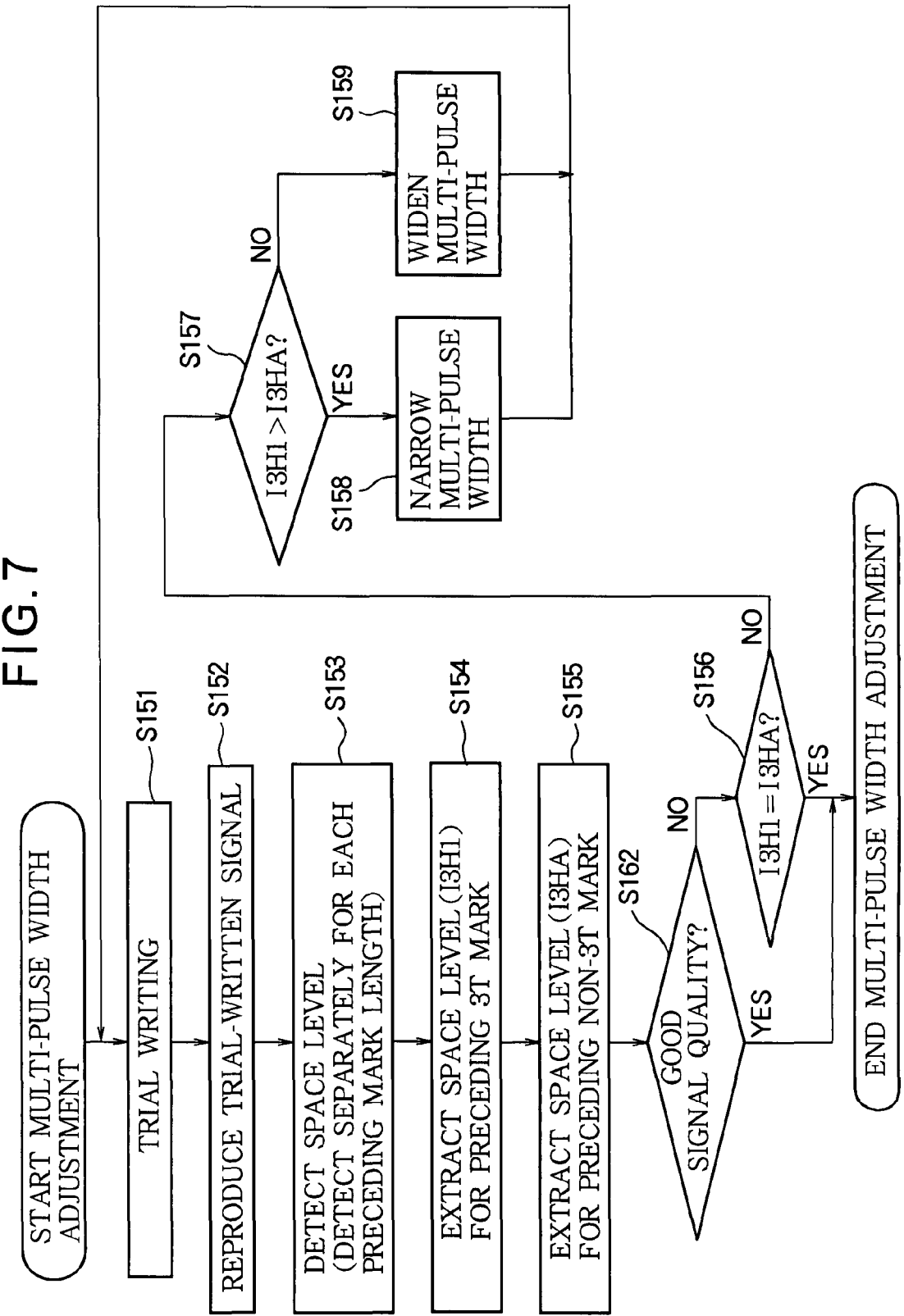
FIG. 7 is a flowchart illustrating yet another exemplary multi-pulse adjustment procedure for the optical recording and reproducing device in the first embodiment of the invention.

It is also possible to terminate the multi-pulse adjustment when the signal quality, e.g., jitter, is better than a predetermined reference standard. For example, signal quality such as jitter value may be checked following step S155, as shown in FIG. 7 (step S162); if the signal quality, e.g., jitter value, is better than the predetermined reference standard, the multi-pulse adjustment is terminated; if the signal quality is inferior, the procedure proceeds to step S156. The process in step S162 is performed in the central controller 250.

As described above, in step S16, using the reproduced signal of the test-written trial signal, the space signal levels of a space having a length of 3T are compared, the comparison being between the case in which the preceding mark has a length of 3T and the cases in which the preceding mark has a length other than 3T, and the pulse width of the multi-pulses in the write strategy used for recording is modified accordingly. The reason will be explained with reference to FIGS. 8(a) to 8(e) and FIGS. 9(a) to 9(c).

FIGS. 8(a) to 8(e) and FIGS. 9(a) to 9(c) show signals obtained in the optical recording and reproducing device 100 shown in FIG. 1 by reproducing signals recorded on the optical disc 60 as combinations of a space having a length of 3T and preceding marks having different lengths.

Figure 9:
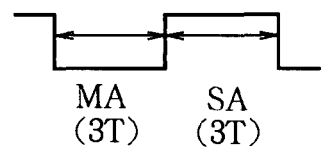
FIGS. 9(a) to 9(c) show another exemplary space level of the reproduced signal detected by the space level detector 270 in the first embodiment of the invention.
Figure 9:
Figure 9:
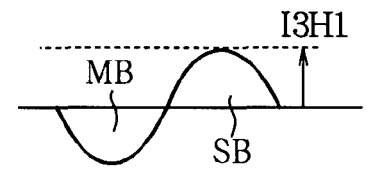

FIGS. 8(a) to 8(e) show a case in which the mark preceding the 3T space has a length nT (n>3) longer than 3T, where n is set to seven (n=7), and FIGS. 9(a) to 9(c) show a case in which the mark preceding the 3T space has a length of 3T.

FIG. 8(a) and FIG. 9(a) show recording data comprising a mark MA and a space SA. FIGS. 8(b) to 8(d) and FIG. 9(b) show write strategies for recording the recording data shown in FIG. 8(a) and FIG. 9(a). FIG. 8(b) shows a write strategy in which the multi-pulse has the optimal pulse width TM1, FIG. 8(c) shows a write strategy in which the pulse width TM2 of the multi-pulse is narrower than the optimal multi-pulse width TM1, and FIG. 8(d) shows a write strategy in which the pulse width TM3 of the multi-pulse is wider than the optimal multi-pulse width TM1. FIG. 8(e) and FIG. 9(c) show reproduced signals obtained by reading the marks and spaces positioned between the marks, generated on the optical disc by recording with the write strategies in FIGS. 8(b) to 8(d) and FIG. 9(b).

When the multi-pulse width has the optimal value (TM1) shown in FIG. 8(b), the portion (space signal) SB corresponding to the space in the reproduced signal is represented by curve RTM1 in FIG. 8(e).

If recording is performed with the multi-pulse pulse width TM2 in FIG. 8(c), narrower than the optimal multi-pulse pulse width TM1, then as indicated by curve RTM2 in FIG. 8(e), the rising edge of the mark portion MB in the reproduced signal is shifted forward compared to the case in which recording is performed with the optimal multi-pulse pulse width TM1, and the amplitude of the immediately following 3T space signal SB is increased by intersymbol interference.

If recording is performed with the multi-pulse pulse width TM3 in FIG. 8(d), wider than the optimal multi-pulse pulse width TM1, then as indicated by curve RTM3 in FIG. 8(e), the rising edge of the mark portion MB in the reproduced signal is shifted backward compared to the case in which recording is performed with the optimal multi-pulse pulse width TM1, and the amplitude of the immediately following 3T space signal SB is decreased by intersymbol interference.

As shown in FIGS. 9(a) to 9(c), when the preceding mark has a length of 3T, since the write strategy does not include a multi-pulse, there is no variation in the level of the space signal SB caused by variation of the multi-pulse, so signal level I3H1 is consistently obtained.

Accordingly, by performing control so that the space signal level I3H1 for a preceding mark length of 3T and the space signal level I3HA for preceding mark lengths other than 3T become equal, good signal quality is obtained.

In order to determine the relationship between the space signal level and signal quality, the inventors conducted experiments to find the values of the space signal level when the pulse width in the write strategy is varied. The relationship between the space signal level and the multi-pulse pulse width that minimizes reproducing jitter was also obtained.

Figure 10:
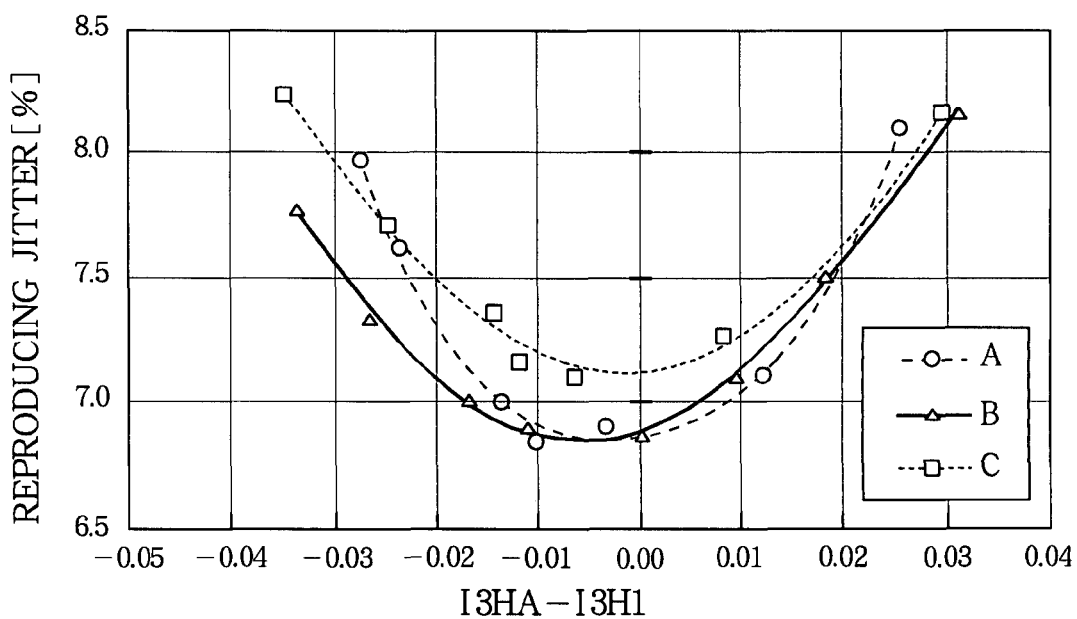
FIG. 10 illustrates relationships between a quantity I3HA-I3H1 for a 3T-space signal level and reproducing jitter in the optical recording and reproducing device in the first embodiment of the invention as the pulse width TM of the multi-pulses is varied.

FIG. 10 illustrates relationships between reproducing jitter and the quantity I3HA-I3H1 calculated from the mean value I3HA of the 3T-space signal levels I3H when the preceding mark has a length other than 3T and the 3T-space signal level I3H1 when the preceding mark has a length of 3T, as the pulse width TM of the multi-pulse is varied.

The above relationships were obtained for three types of optical discs with different characteristics; values for optical disc A are represented by circles, values for optical disc B are represented by triangles, and values for optical disc C are represented by squares.

As can be seen in the drawing, the regions where the quantity I3HA-I3H1 is near zero and where the reproducing jitter is optimal are approximately the same with all three types of optical discs; it is thus shown that by performing control so as to make the 3T-space signal level I3HA for preceding mark lengths other than 3T equal to the 3T-space signal level I3H1 for a preceding mark length of 3T, the pulse width of the multi-pulse can be optimally adjusted.

Figure 11:
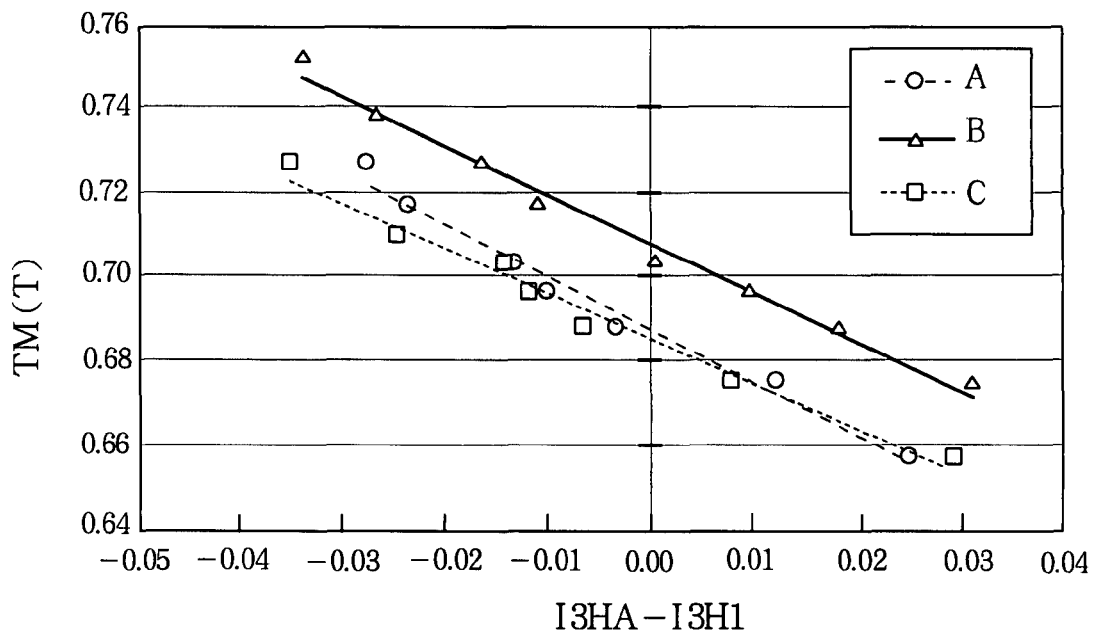
FIG. 11 illustrates relationships between the quantity I3HA-I3H1 for the 3T-space signal level and pulse width TM of the multi-pulses in the optical recording and reproducing device in the first embodiment of the invention as the pulse width TM of the multi-pulses is varied.

FIG. 11 illustrates relationships between the quantity I3HA-I3H1 obtained as described above and the multi-pulse width TM. As in FIG. 10, values for optical disc A are represented by circles, values for optical disc B are represented by triangles, and values for optical disc C are represented by squares.

As can be seen in the drawing, the quantity I3HA-I3H1 is proportional to the multi-pulse width TM, and the variation of the multi-pulse width TM relative to I3HA-I3H1 is approximately the same for the three types of optical discs. Modifications should therefore be performed so that when the quantity I3HA-I3H1 is greater than zero, the multi-pulse width TM is increased, and when the quantity I3HA-I3H1 is less than zero, the multi-pulse width TM is reduced.

It can also be seen that when the multi-pulse width TM is modified, the value of the modification of the multi-pulse width TM should be based on the variation of the multi-pulse width TM relative to the quantity I3HA-I3H1.

Next, the precision of the multi-pulse adjustment was examined.

Figure 12:
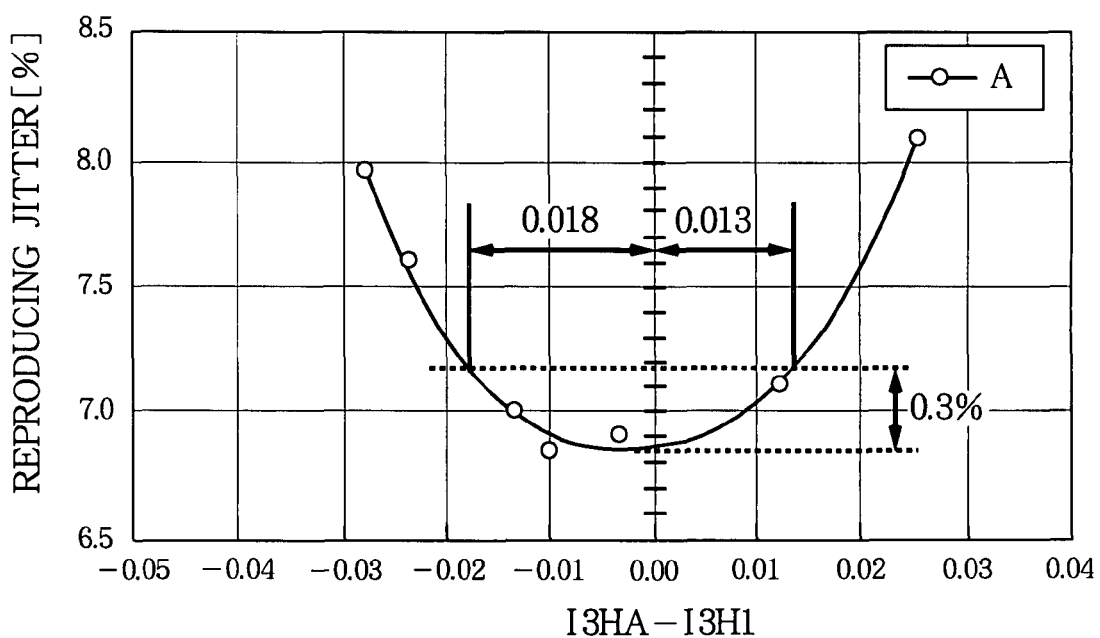
FIG. 12 illustrates the relationship between the quantity I3HA-I3H1 for the 3T-space signal level and reproducing jitter in the optical recording and reproducing device in the first embodiment of the invention as the pulse width TM of the multi-pulses is changed in optical disc A.

FIG. 12 illustrates the relationship between the quantity I3HA-I3H1 and reproducing jitter in FIG. 10 for the case of optical disc A. It can be seen that when the acceptable amount of jitter degradation is set to, for example, 0.3 percent from the optimal jitter, the tolerance range of the quantity I3HA-I3H1 is from −0.018 to 0.013.

Figure 13:
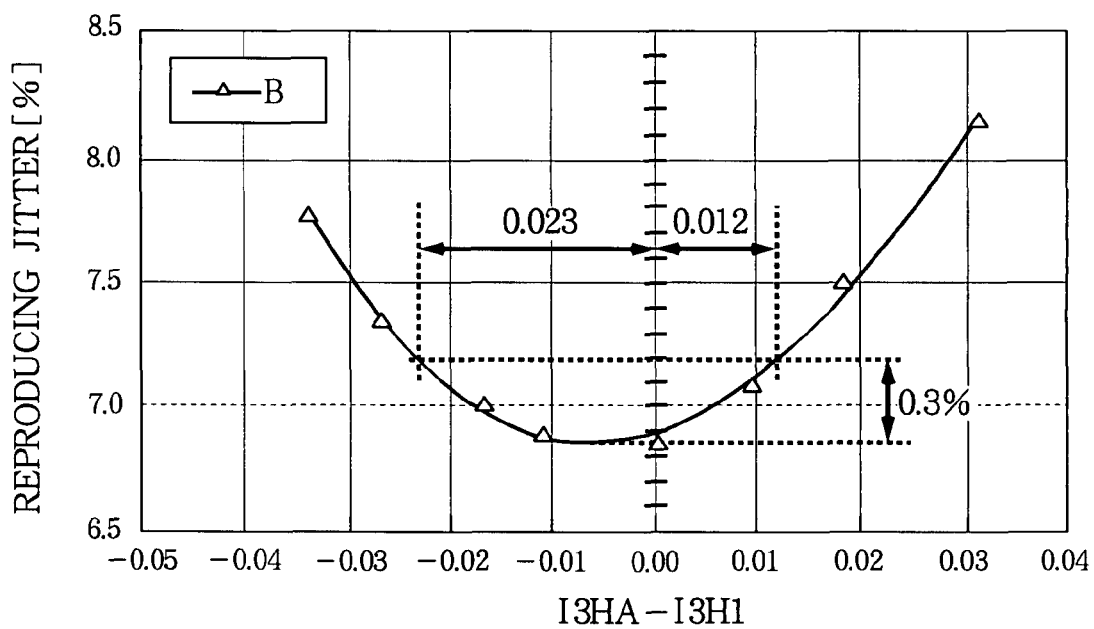
FIG. 13 illustrates the relationship between the quantity I3HA-I3H1 for the 3T-space signal level and reproducing jitter in the optical recording and reproducing device in the first embodiment of the invention as the pulse width TM of the multi-pulses is changed in optical disc B.

FIG. 13 illustrates the relationship between the quantity I3HA-I3H1 and reproducing jitter in FIG. 10 for the case of optical disc B. It can be seen that when the acceptable jitter degradation is set to, for example, 0.3 percent from the optimal jitter as in FIG. 12, the tolerance range of the quantity I3HA-I3H1 is from −0.023 to 0.012.

Figure 14:
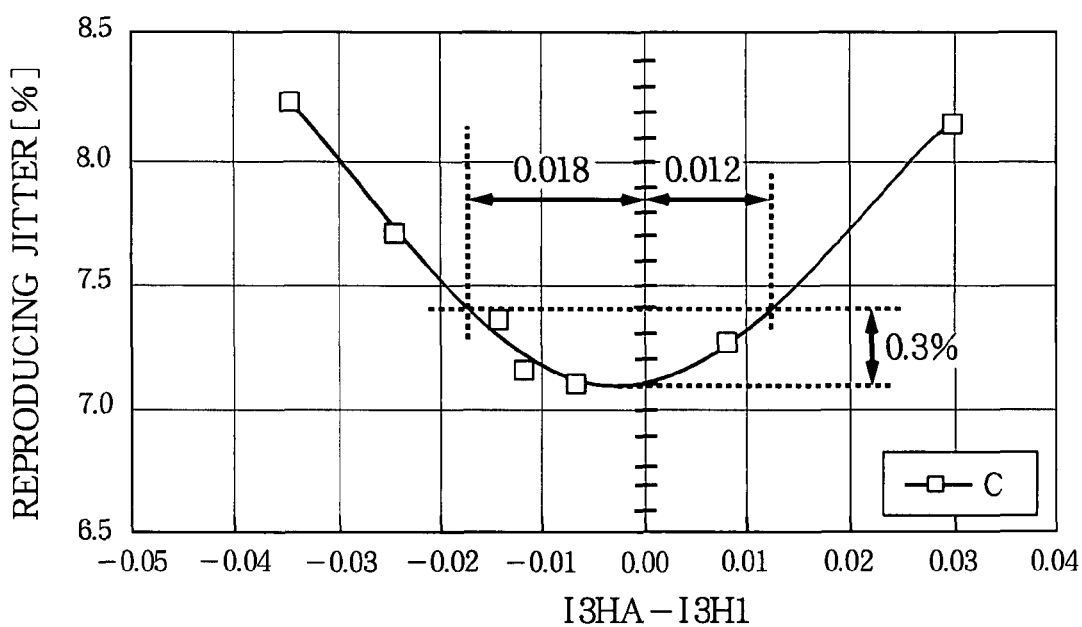
FIG. 14 illustrates the relationship between the quantity I3HA-I3H1 for the 3T-space signal level and reproducing jitter in the optical recording and reproducing device in the first embodiment of the invention as the pulse width TM of the multi-pulses is changed in optical disc C.

FIG. 14 illustrates the relationship between the quantity I3HA-I3H1 and reproducing jitter in FIG. 10 for the case of optical disc C. It can be seen that when the acceptable jitter degradation is set to, for example, 0.3 percent from the optimal jitter as in FIG. 12, the tolerance range of the quantity I3HA-I3H1 is from −0.018 to 0.012.

It follows that when the acceptable jitter degradation is set to, for example, 0.3 percent from the optimal jitter, the pulse width of the multi-pulse should be adjusted so that the value of the quantity I3HA-I3H1 is within ±0.01.

Different values may be set for the upper and lower limits of the quantity I3HA-I3H1; it is possible to set the lower limit to −0.018, and the upper limit to 0.01.

It is also possible to set the acceptable range of the quantity I3HA-I3H1 according to the minimum modification that can be made in the pulse width of the multi-pulses under control by the laser waveform controller 240, in which the pulse width of the multi-pulse is set, and the relationship between the quantity I3HA-I3H1 and the multi-pulse width TM in FIG. 11. The tolerance range of the quantity I3HA-I3H1 in this case should be wide enough to include the values to which the quantity I3HA-I3H1 changes in response to the minimum modification that can be made in the multi-pulse width TM.

In FIG. 11, when the minimum modification of the multi-pulse width TM is set to 0.02T, for example, the variation of the quantity I3HA-I3H1 is approximately 0.02; the tolerance range of the quantity I3HA-I3H1 should accordingly have a width of more than 0.02, that is, more than ±0.01.

In the above description, the mean value of the 3T-space signal levels I3H for preceding mark lengths other than 3T is used as the 3T-space signal level I3H for preceding mark lengths other than 3T, but it is possible to select only combinations in which the preceding mark has specific lengths and use the mean value of the 3T-space signal levels I3H for those combinations, or to use the value of the 3T-space signal level I3H for the case in which the preceding mark has a single specific length other than 3T.

Figure 15:
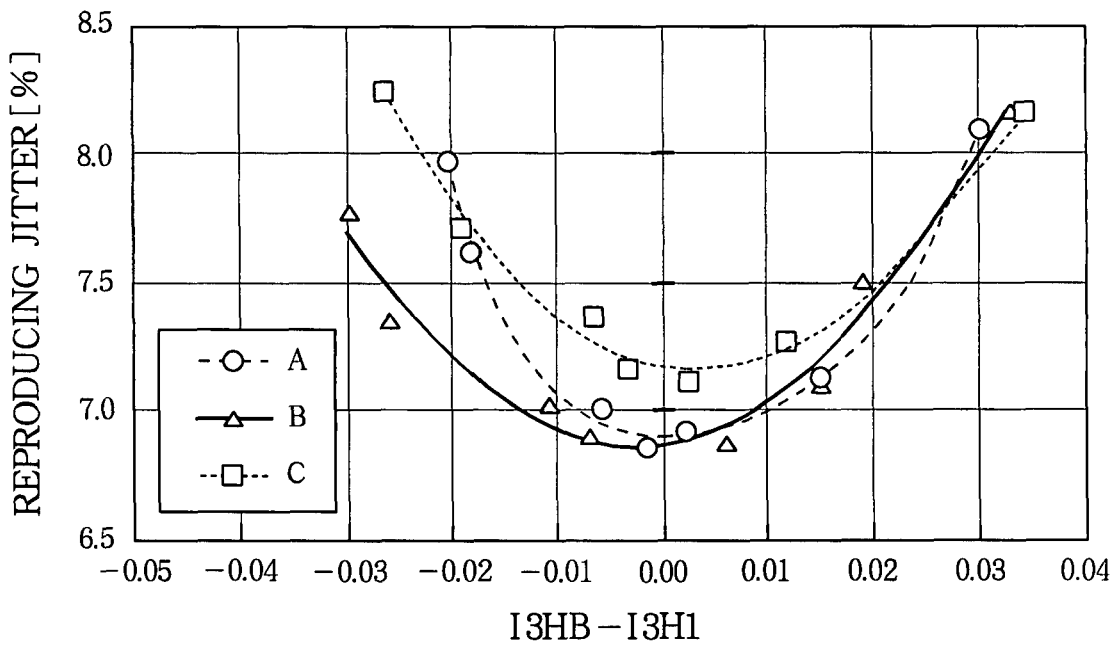
FIG. 15 illustrates the relationship between the quantity I3HB-I3H1 for the 3T-space signal level and reproducing jitter in the optical recording and reproducing device in the first embodiment of the invention as the pulse width TM of the multi-pulses is changed.

FIG. 15 illustrates relationships between reproducing jitter and the quantity I3HB-I3H1 obtained from the mean value I3HB of the 3T-space signal levels I3H when the preceding mark has a length of either 5T or 6T and the 3T-space signal level I3H1 when the preceding mark has a length of 3T as the pulse width TM of the multi-pulse is varied.

As can be seen in the drawing, reproducing jitter is optimal when the quantity I3HB-I3H1 is near zero; it is thus shown that the mean value I3HB of the 3T-space signal levels I3H for preceding mark lengths of either 5T or 6T may be used to adjust the pulse width TM of the multi-pulses.

Figure 16:
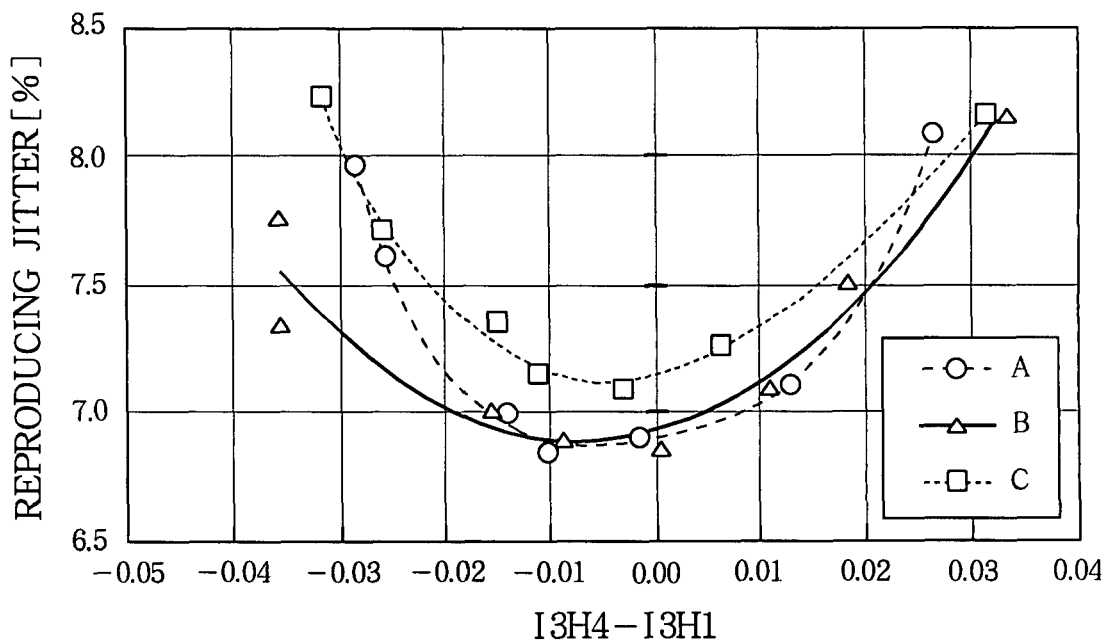
FIG. 16 illustrates the relationship between the quantity I3H4-I3H1 for the 3T-space signal level and reproducing jitter in the optical recording and reproducing device in the first embodiment of the invention as the pulse width TM of the multi-pulses is changed.

FIG. 16 illustrates relationships between reproducing jitter and the quantity I3H4-I3H1 obtained from the 3T-space signal level I3H4 when the preceding mark has a length of 6T and the 3T-space signal level I3H1 when the preceding mark has a length of 3T, as the pulse width TM of the multi-pulses is varied.

As can be seen in the drawing, reproducing jitter is optimal when the quantity I3H4-I3H1 is near zero; it is thus shown that the 3T-space signal level I3H4 for a preceding mark length of 6T may be used to adjust the pulse width TM of the multi-pulses.

Likewise, in the adjustment of the pulse width TM of the multi-pulses, the mean value of the 3T-space signal levels I3H for combinations of cases in which the preceding mark has a length other than the lengths described above or the 3T-space signal level for the case in which the preceding mark has a specific length other than the lengths described above may be used as the 3T-space signal level for preceding mark lengths other than 3T.

As described above, according to the present embodiment, the pulse width TM of the multi-pulse is easily adjusted to the optimal value by comparing the 3T-space signal level for cases in which the preceding mark has a length other than 3T and the 3T-space signal level for a preceding mark length of 3T.

It is also possible to determine the direction of change of the pulse width TM of the multi-pulse (whether it should be increased or decreased) by comparing whether the 3T-space signal level for preceding mark lengths other than 3T is greater than the 3T-space signal level for a preceding mark length of 3T.

Second Embodiment

In the first embodiment described above, as shown in FIG. 5, in steps S157 to S159, the space signal level I3H1 for a preceding mark length of 3T and the space signal level I3HA for preceding mark lengths other than 3T are compared, and a modification is performed so that when the space signal level I3H1 for a preceding mark length of 3T is greater, the pulse width of the multi-pulse is reduced, and when the space signal level I3H1 for a preceding mark length of 3T is less, the pulse width of the multi-pulse is increased. An alternative possibility is to determine the relationship between the variation of the pulse width of the multi-pulse and the difference between the 3T-space signal level for preceding mark lengths other than 3T and the 3T-space signal level for a preceding mark length of 3T in advance, and by changing the pulse width of the multi-pulse according to difference, to adjust the pulse width of the multi-pulse to the optimal value in relatively few modifications, even when the pulse width of the multi-pulse differs greatly from the optimal value.

Figure 17:
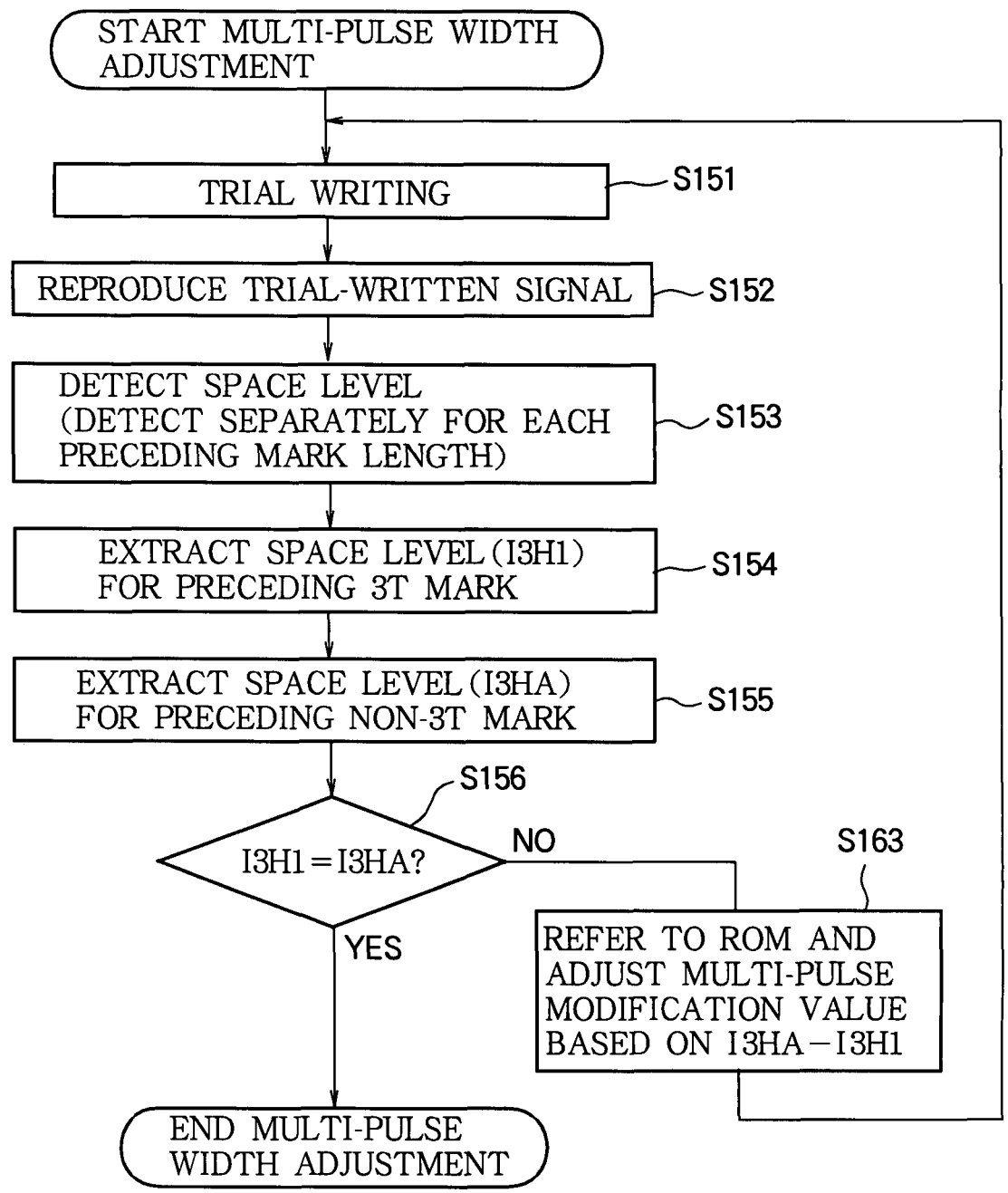
FIG. 17 is a flowchart illustrating an exemplary multi-pulse adjustment procedure for the optical recording and reproducing device in a second embodiment of the invention.

For example, the relationship between the variation of the pulse width of the multi-pulse and the difference between the 3T-space signal level for preceding mark lengths other than 3T and the 3T-space signal level for a preceding mark length of 3T may be experimentally determined for each optical recording and reproducing device 100, the result may be stored in the optical recording and reproducing device 100, in the ROM 250$b$ in the central controller 250, for example, and in the modification of the pulse width of the multi-pulses, the pulse width of the multi-pulse may be adjusted according to the magnitude of the difference between the 3T-space signal level for preceding mark lengths other than 3T and the 3T-space signal level for a preceding mark length of 3T. That is, when the result of the decision in step S156 is negative, the process proceeds to step S163 as shown in FIG. 17, and based on the difference between the 3T-space signal level I3HA for preceding mark lengths other than 3T and the 3T-space signal level I3H1 for a preceding mark length of 3T, the modification value (including whether to increase or decrease the value) of the pulse width of the multi-pulse is read from the ROM 250$b$, and the pulse width of the multi-pulse is changed according to the modification value that is read; then the process returns to step S151, and trial writing is again performed using multi-pulses with the modified pulse width. In this way, the pulse width of the multi-pulse can be adjusted to the optimal value with comparatively few modifications.

The above relationship only needs to be determined once for each type of optical recording and reproducing device; the same relationship may be used for a plurality of optical recording and reproducing devices of the same type. That is, once the above relationship has been obtained for an optical recording and reproducing device of a certain type, other optical recording and reproducing devices of the same type may be shipped with the same relationship set therein.

Figure 6:
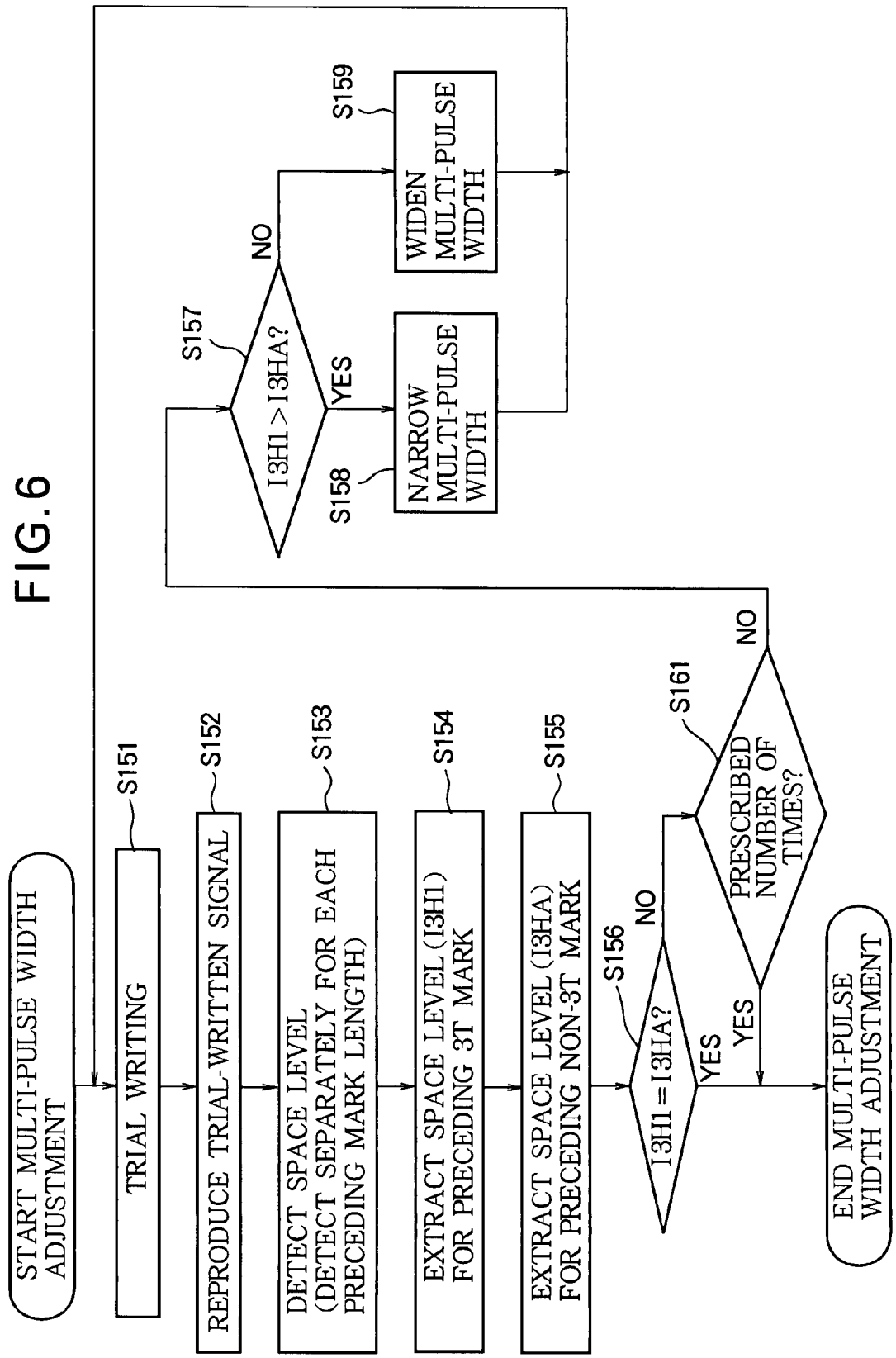
FIG. 6 is a flowchart illustrating another exemplary multi-pulse adjustment procedure for the optical recording and reproducing device in the first embodiment of the invention.

The variations described with reference to FIG. 6 and FIG. 7 are also possible in the second embodiment.

In the above first and second embodiments, the signal levels for a space having a length of 3T are compared, but it is also possible to compare the signal levels for a space having a length of 4T (the space having the second shortest length).

Third Embodiment

The optical recording method in the third and fourth embodiments below performs mark-edge recording (PWM recording). To record information, it causes a semiconductor laser to emit multiple pulses according to a write strategy (laser emission waveform rule used in recording) to form recording marks, based on the data to be recorded on the optical disc. In other words, the write strategy used in the third and fourth embodiments is a strategy of the multi-pulse type, having one or more pulses in the mark period. As described below, in a write pulse strategy of this multi-pulse type, the front edge positions of the leading pulse in the third and fourth embodiments are adjusted according to the bottom levels of signals corresponding to marks read from a test-written signal.

In addition, in the third and fourth embodiments described below, lengths of marks and lengths of spaces between the marks are the lengths of the signal portions corresponding to the marks and spaces, expressed in units of the period T of the channel clock used in recording and reproducing, and the recording of information onto the optical disc is carried out by illuminating the optical disc with optical pulses in EFM (8-16) modulation patterns with 3T to 11T and 14T marks, that is, mark lengths of n clock periods, where n is 3 to 11 or 14. The longest mark (the mark with length 14T) is a sync pattern.

Figure 18:
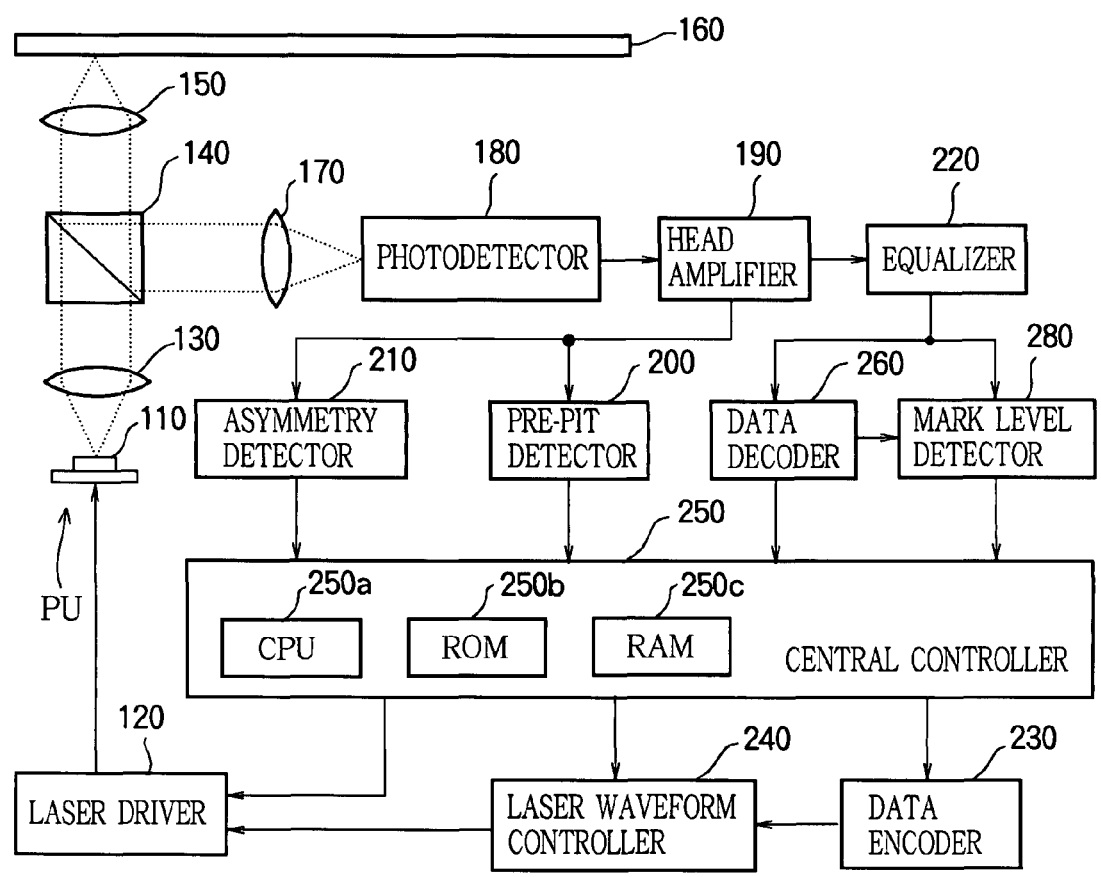
FIG. 18 is a block diagram showing an optical recording and reproducing device in a third embodiment of the invention.

FIG. 18 shows an example of the basic structure of an optical recording and reproducing device 100 according to the third embodiment of the invention. The optical recording and reproducing device 100 shown in FIG. 18 is generally the same as the optical recording and reproducing device 100 in FIG. 1, except that it lacks the space level detector 270 in FIG. 1 and instead has a mark level detector 280. The elements in FIG. 18 have generally the same functions as the elements indicated by the same reference characters in FIG. 1, and the basic operations in the reproducing and recording of data are generally the same. The description below will focus on points of difference from the operation of the apparatus in FIG. 1.

The electrical signal input from the head amplifier 190 to the equalizer 220 is reshaped and input to a data decoder 260 and a mark level detector 280.

The mark level detector 280 detects the bottom level of the mark portions of the reproduced signal. Bottom levels of marks of each number of clock periods are detected separately for each length of the space immediately preceding the mark (for each length of the space portions of the reproduced signal expressed as a number of clock periods). For example, the bottom levels of a 3T mark are detected separately for the case of a preceding 3T space and for the cases in which the preceding space has a length other than 3T.

FIGS. 3(a) to 3(e) show an example of a write strategy generated in the laser waveform controller 240 in the optical recording and reproducing apparatus 100 shown in FIG. 18 when the optical disc 160 is a medium of the dye type.

During reproducing and writing operations by the optical recording and reproducing device 100, the central controller 250 controls the device as a whole. The central controller 250 receives pre-pit information from the pre-pit detector 200, an asymmetry value from the asymmetry detector 210, reproduced data from the data decoder 260, and a mark level value from the mark level detector 280, and provides control signals to the data encoder 230, the laser waveform controller 240, and the laser driver 120.

In addition, the central controller 250 controls the determination of the write strategy, especially the calculation of pulse widths and the asymmetry value, and controls trial writing performed by use of the modified write strategy and asymmetry value, as will be described later with reference to FIGS. 19 and 20, 21, or 22.

The central controller 250 comprises, for example, a CPU 250a, a ROM 250b storing programs for the operation of the CPU 250a, and a RAM 250c for storing data. The programs stored in the ROM 250b include calculations for adjusting the front edge position of the leading pulse and a section defining modification of the front edge position of the leading pulse, as described later with reference to FIG. 20, 21 or 22, FIGS. 23(a) to 23(c), and FIGS. 24(a) to 24(e). The ROM 250b stores various constants such as coefficients for determining modification values of the front edge position and tolerances for determining modification precision in the modification of the front edge position of the leading pulse, as described later.

It is a general practice to optimize the recording power by performing trial writing before recording information. The procedure will be described below.

First, trial writing on the optical disc 160 is performed by use of a test pattern comprising 3T-11T marks and spaces corresponding to random recording data, for example, under varied recording power; next, the area on the optical disc 160 on which this test pattern has been recorded is reproduced, the asymmetry value is detected by the asymmetry detector 210, and the detected asymmetry value is compared with a target asymmetry value in the central controller 250 to obtain the optimal recording power.

In general, the higher the recording power is, the higher the asymmetry value becomes, and the lower the recording power is, the lower the asymmetry value becomes.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disc 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

In the basic optical recording method in this embodiment, when a signal is reproduced by reading the marks MK and spaces SP generated by trial writing, the bottom levels of the signal portions MB corresponding to the marks MK are detected by the mark level detector 280 separately for each length of the space SP immediately preceding the mark (the length, expressed in clock periods, of the reproduced signal portions corresponding to the space SP), the bottom levels are mutually compared, and the front edge position of the leading pulse in the optical write strategy for recording is adjusted according to the results of the comparisons.

The procedure followed in the optical recording method of this embodiment will now be described with reference to FIG. 19.

First, when the optical disc 160 to be used in recording is inserted in the optical recording device 100, a sensor (not shown) detects this (step S20) and notifies the central controller 250, and the central controller 250 drives the optical pickup PU, thereby reading from the optical disc 160 the disc-specific information prerecorded by the disc manufacturer, such as the recommended write strategy values and the recommended value of the asymmetry value β (step S21).

Next, in step S22, the recommended write strategy value read from the optical disc 160 is set in the central controller 250 (in the RAM 250c, for example) as the initial write strategy for adjusting the front edge position of the leading pulse. It is possible to use a specific write strategy preset in the optical recording device 100 instead of values read from the optical disc 160 as the initial write strategy.

Next, in step S23, the recommended value of the asymmetry value β read from the optical disc 160 is set in the central controller 250 (in the RAM 250c, for example) as the target value to be used for optimizing the recording power. It is possible to use a specific value preset in the optical recording device 100 instead of a value read from the optical disc 160 as the target asymmetry value β.

Then, when a record command is given by a means not shown in the drawings (S24), in step S25, trial writing on the optical disc 60 is performed by use of the initial write strategy and target asymmetry value set as described above. That is, the write strategy (the strategy for each nT) set in the central controller 250 in step S22 is set in the laser waveform controller 240, a write strategy based on a test pattern is generated in the laser waveform controller 240, and trial writing on the optical disc 60 is performed using the optical pickup. The area on the optical disc 160 on which the test pattern has been recorded is then reproduced using the optical pickup, the asymmetry value detected by the asymmetry detector 210 is compared with the target asymmetry value set in step S23 in the central controller 250, and control is performed to make the two values match, whereby the optimal recording power is determined.

When this trial writing has been performed and the power has been adjusted, in step S26, the front edge position of the leading pulse is adjusted. The power may be readjusted when the front edge position of the leading pulse is adjusted in step S26.

Finally, in step S27, the leading pulse with the front edge position adjusted in step S26 is set in the laser waveform controller 240, a write strategy based on the recording data is generated in the laser waveform controller 240, and using the recording power determined in step S24, original data are written (original writing) on the optical disc 60. If the recording power has been readjusted in step S26, the recording power determined in step S26 may be used instead of the value determined in step S24.

Of the above processes, the process in step S20 is performed by the central controller 250 and a sensor (not shown) for detecting the insertion of an optical disc, the process in step S21 is performed by the optical pickup PU, head amplifier 190, equalizer 220, data decoder 260, and central controller 250, the processes in steps S22 and S23 are performed by the central controller 250, the process in step S24 is performed by the central controller 250 and a means (interface) for receiving record commands (not shown), the process in step S25 is performed by the head amplifier 190, asymmetry detector 210, central controller 250, laser waveform controller 240, and optical pickup PU, the process in step S26 is performed by the head amplifier 190, equalizer 220, mark level detector 280, central controller 250, laser waveform controller 240, and optical pickup PU, and the process in step S27 is performed by the central controller 250, laser waveform controller 240, and optical pickup PU.

Figure 19:
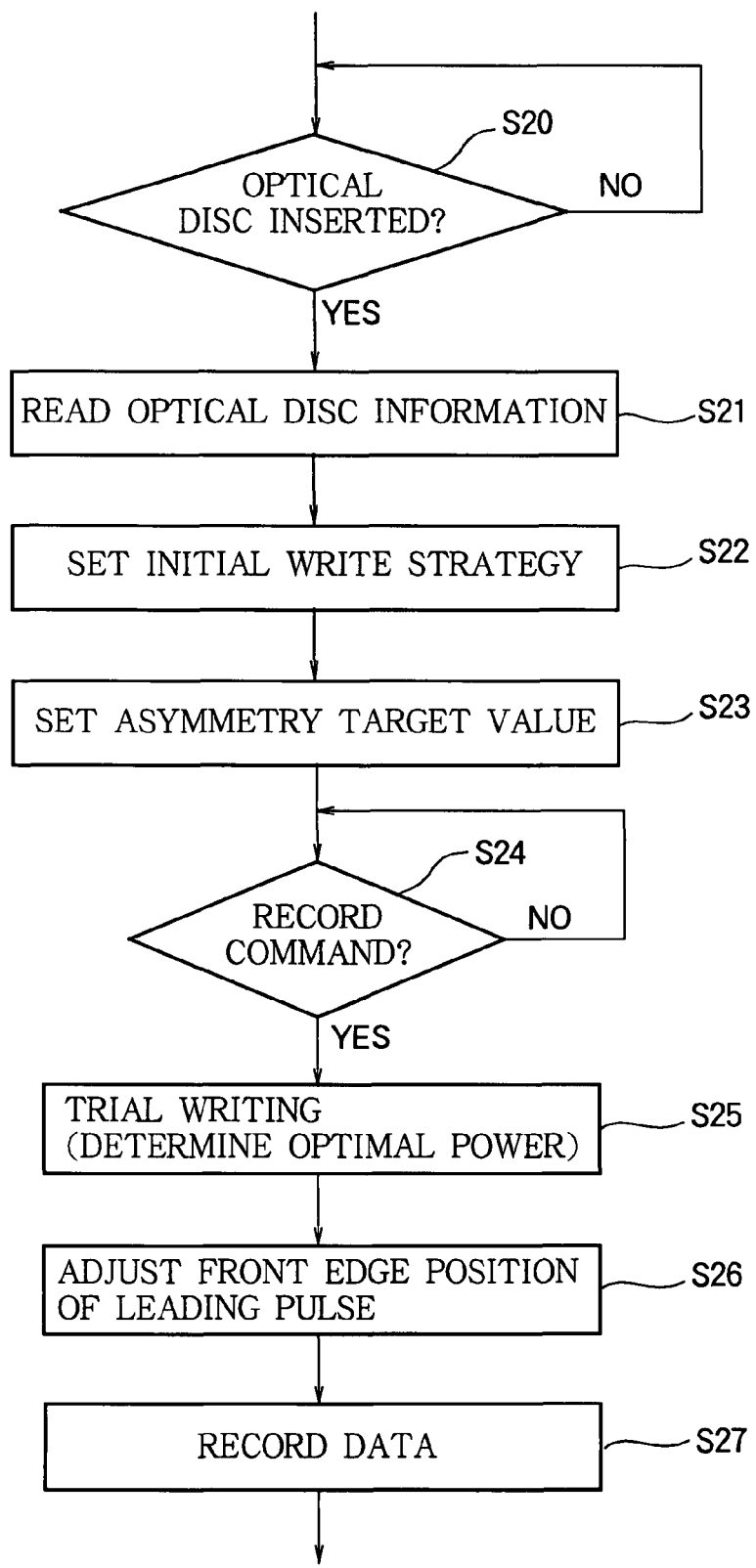
FIG. 19 is a flowchart illustrating an exemplary recording procedure in an optical recording and reproducing device in the third embodiment of this invention.
Figure 20:
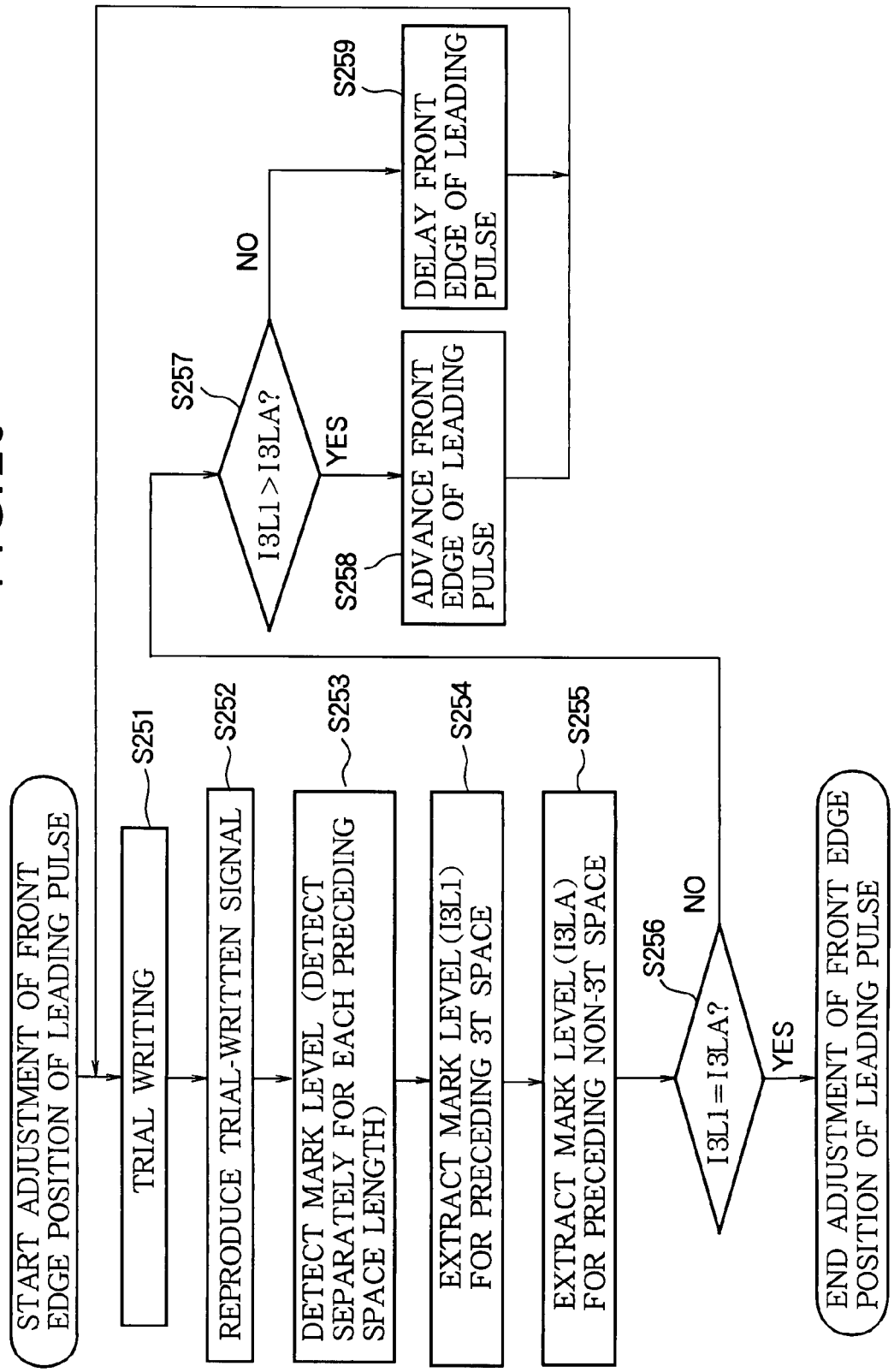
FIG. 20 is a flowchart illustrating an exemplary multi-pulse adjustment procedure in the optical recording and reproducing device in the third embodiment of the invention.

FIG. 20 shows the process performed in step S26 in FIG. 19 in more detail.

In step S251, the initial write strategy set in step S22 and the recording power determined in step S24 are used to perform trial writing on the optical disc 60, and in step S252, the signal written in step S251 is reproduced.

The process in step S251 is performed by the central controller 250, the laser waveform controller 240 and the optical pickup PU, and the process in step S252 is performed by the optical pickup PU, the head amplifier 190 and the equalizer 220.

Next, in step S253, the mark level detector 280 detects signal levels of a mark having a length of 3T in the signal reproduced in step S252; the signal levels are detected separately for each length of the space preceding the mark.

Next, in step S254, from the signal levels detected in step S253 for the mark of length 3T, the mark signal level I3L1 for the case in which the space preceding the mark has a length of 3T is extracted.

The processes in steps S253 and S254 are performed by the mark level detector 280 and the central controller 250.

Next, in step S255, from the signal levels detected in step S253 for the mark of length 3T, the mark signal levels (the level of signal MB corresponding to mark MK) for all cases in which the space preceding the mark has a length other than 3T are extracted, and their mean value I3LA is calculated.

As the mark signal levels for the cases in which the space preceding the mark has a length other than 3T, the mean value of the mark signal levels for all cases in which the preceding space has a length other than 3T was used here, but it is possible to use the mark signal level for the case in which the preceding space has a specific length nT other than 3T, or the mean value of the mark signal levels for a plurality of cases in which the preceding space has a length other than 3T (a plurality of differing values of nT).

Next, in step S256, the mark signal level I3L1 extracted in step S254 for a preceding space length of 3T and the mark signal level I3LA extracted in step S255 for preceding space lengths other than 3T are compared, and if the two values are equal, the leading pulse adjustment is terminated.

It is not necessary for the mark signal level I3L1 for a preceding space length of 3T and the average mark signal level I3LA for preceding space lengths other than 3T to match exactly; if they match within a preset tolerance, the mark signal level I3L1 for a preceding space length of 3T and the average mark signal level I3LA for preceding space lengths other than 3T are taken to be equal, and the leading pulse adjustment is terminated.

When the mark signal level I3L1 for a preceding space length of 3T and the average mark signal level I3LA for preceding space lengths other than 3T are not equal, step S257 is carried out.

In step S257, the mark signal level I3L1 for a preceding space length of 3T and the mark signal level I3LA for preceding space lengths other than 3T are compared to determine which has the higher value.

When the mark signal level I3L1 for a preceding space length of 3T has the higher value, in step S258, modification is performed so that the front edge position of the leading pulse is advanced from the front edge position of the leading pulse used in trial writing in step S251.

When the mark signal level I3L1 for a preceding space length of 3T has the lower value, in step S259, modification is performed so that the front edge position of the leading pulse is delayed from the front edge position of the leading pulse used in trial writing in step S251.

In the modification of the front edge position of the leading pulse, the modification value of the front edge position of the leading pulse corresponding to the difference between the mark signal level I3L1 for a preceding space length of 3T and the mark signal level I3LA for preceding space lengths other than 3T is calculated in advance, and the front edge position of the leading pulse is modified according to the modification value corresponding to the difference between the mark signal level I3L1 for a preceding space length of 3T and the mark signal level I3LA for preceding space lengths other than 3T. Alternatively, a preset fixed value or a minimum value that can be changed in the laser waveform controller 240 may be used.

The processes in steps S255 to S259 are performed in the central controller 250.

After the front edge position of the leading pulse is modified in step S258 or in step S259, the modified front edge position of the leading pulse is used to perform trial writing in step S251 and the subsequent steps are repeated so as to perform the leading pulse adjustment until, in step S256, the mark signal level I3L1 for a preceding space length of 3T and the average mark signal level I3LA for preceding space lengths other than 3T become equal.

Prior to the trial writing in step S251, the optimal power may be readjusted.

Figure 21:
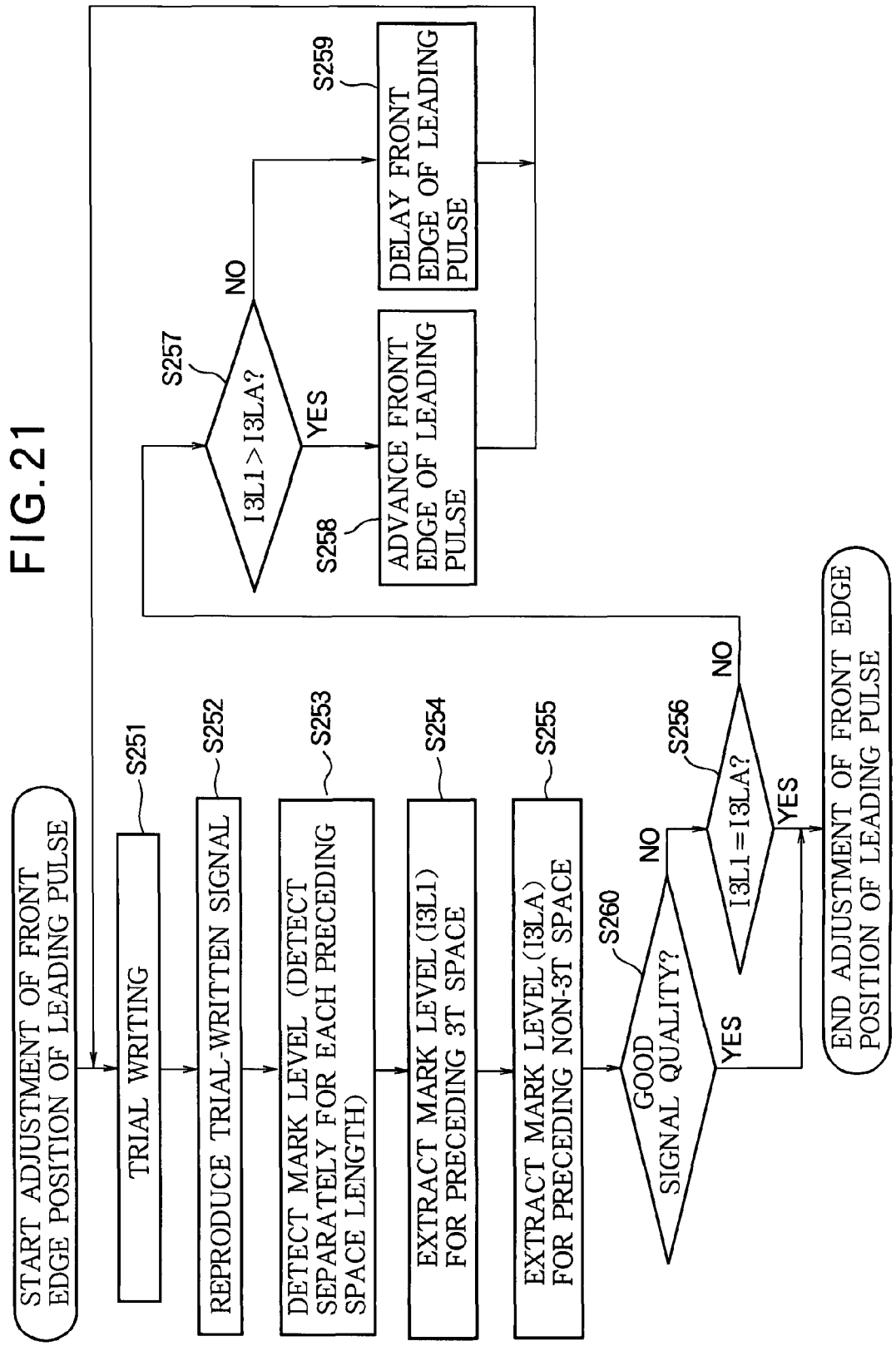
FIG. 21 is a flowchart illustrating another exemplary multi-pulse adjustment procedure in the optical recording and reproducing device in the third embodiment of the invention.

The leading pulse adjustment may be terminated prior to the process in step S256 if the signal quality is better than a predetermined reference standard in terms of jitter etc. For example, signal quality, such as jitter, may be checked following step S255, as shown in FIG. 21 (step S260); if the signal quality, e.g., jitter value, is better than the predetermined reference standard, the leading pulse adjustment is terminated; if the signal quality is inferior, the procedure proceeds to step S256. The process in step S260 is performed in the central controller 250.

The leading pulse adjustment is performed until the mark signal level I3L1 for a preceding space length of 3T and the average mark signal level I3LA for preceding space lengths other than 3T become equal, but it is possible to preset a limit value for the leading pulse adjustment, and to terminate the leading pulse adjustment when the number of times the leading pulse has been modified exceeds the limit value.

Figure 22:
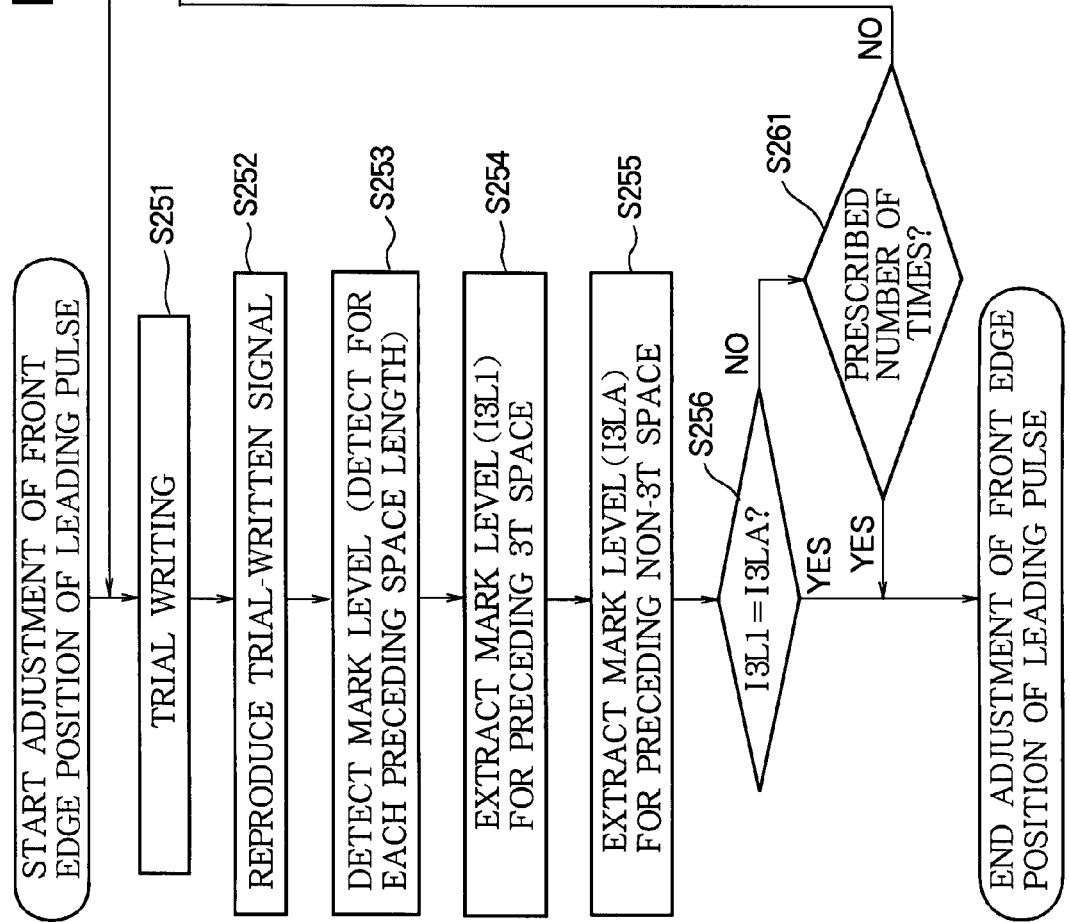
FIG. 22 is a flowchart illustrating yet another exemplary multi-pulse adjustment procedure in the optical recording and reproducing device in the third embodiment of the invention.

For example, when the result in step S256 is negative, the procedure may proceed to step S260 in FIG. 22, in which it is determined whether the number of modifications has exceeded a prescribed value. If the value is exceeded (Yes in step S261), the leading pulse adjustment is terminated. If the value is not exceeded (No in step S261), the procedure proceeds to step S257. The process in step S261 is performed in the central controller 250.

As described above, in step S26, using the reproduced signal of the test-written trial signal, the mark signal levels of a mark having a length of 3T are compared, the comparison being between the case in which the preceding space has a length of 3T and the cases in which the preceding space has a length other than 3T, and the front edge position of the leading pulse in the write strategy used for recording is modified accordingly. The reason will be explained with reference to FIGS. 23(a) to 23(c) and FIGS. 24(a) to 24(e).

FIGS. 23(a) to 23(c) and FIGS. 24(a) to 24(e) show signals obtained in the optical recording and reproducing device 100 shown in FIG. 18 by reproducing signals recorded on the optical disc 60 as combinations of a mark having a length of 3T and preceding spaces having different lengths.

Figure 23A:
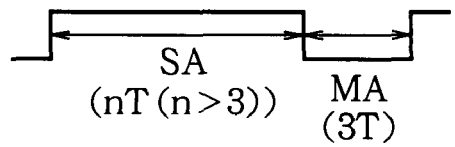
FIGS. 23(a) to 23(c) show an exemplary space level of the reproduced signal detected by the mark level detector in the third embodiment of the invention.
Figure 23B:
Figure 23C:
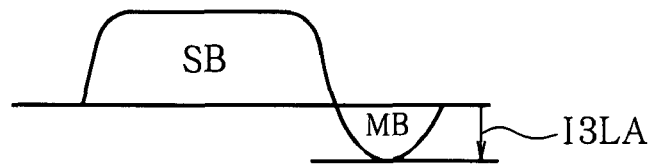

FIGS. 23(a) to 23(c) show a case in which the space SP preceding the 3T mark MK has a length nT (n>3) longer than 3T, where n is set to six (n=6), for example, and FIGS. 24(a) to 24(e) show a case in which the space SP preceding the 3T mark MT has a length of 3T.

Figure 24A:
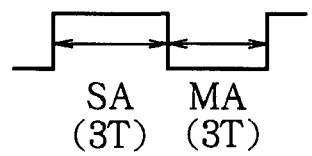
FIGS. 24(a) to 24(e) show examples of space levels of reproduced signals detected by the mark level detector in the third embodiment of the invention.
Figure 24B:
Figure 24C:
Figure 24D:
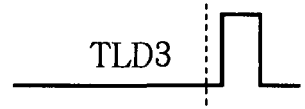

FIG. 23(a) and FIG. 24(a) show recording data comprising a mark MA and a space SA. FIG. 23(b) and FIGS. 24(b) to 24(d) show write strategies for recording the recording data shown in FIG. 23(a) and FIG. 24(a). FIG. 24(b) shows a write strategy in which the leading pulse has the optimal front edge position TLD1, FIG. 24(c) shows a write strategy in which the leading pulse has a front edge position TLD2 that is advanced from the optimal front edge position TLD1, and FIG. 24(d) shows a write strategy in which the leading pulse has a front edge position TLD3 that is delayed from the optimal front edge position TLD1.

FIG. 23(c) shows reproduced signals obtained by reading the marks and spaces positioned between the marks, generated on the optical disc by recording with the write strategy in FIG. 23(b).

Figure 24E:
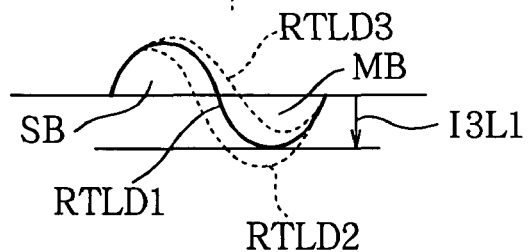

FIG. 24(e) shows reproduced signals obtained by reading the marks and spaces positioned between the marks, generated on the optical disc by recording with the write strategies in FIGS. 24(b) to 24(d).

When the leading pulse has the optimal front edge position (TLD1) shown in FIG. 24(b), the reproduced signal is represented by curve RTLD1 in FIG. 24(e).

When recording is performed with the leading pulse having the front edge position TLD2 in FIG. 24(c) that is advanced from the optimal front edge position TLD1, as represented by curve RTLD2 in FIG. 24(e), the rising edge of the portion SB corresponding to the space in the reproduced signal is shifted forward compared to the case in which recording is performed with the optimal front edge position TLD1, and the amplitude of the immediately following 3T mark signal MB is increased by intersymbol interference.

When recording is performed with the leading pulse having the front edge position TLD3 in FIG. 24(d) that is delayed from the optimal front edge position TLD1, as represented by curve RTLD3 in FIG. 24(e), the rising edge of the portion SB corresponding to the space in the reproduced signal is shifted backward compared to the case in which recording is performed with the optimal front edge position TLD1, and the amplitude of the immediately following 3T mark signal MB is decreased by intersymbol interference.

When the preceding space has a length longer than 3T, as shown in FIGS. 23(a) to 23(c), compared to the case in which the preceding space has a length of 3T, since the influence of the heat generated in forming the mark preceding the preceding space is less, the influence of the front edge position of the leading pulse is less.

Accordingly, good signal quality is obtained by performing control to equalize the mark signal level I3L1 when the preceding space has a length of 3T and the mark signal level I3LA when the preceding space has a length other than 3T.

In order to determine the relationship between the mark signal level and signal quality, the inventors conducted experiments to find values of the mark signal level when the front edge position of the leading pulse in the write strategy is varied. The relationship between the front edge position of the leading pulse that minimizes reproducing jitter and the mark signal level was also obtained.

Figure 25:
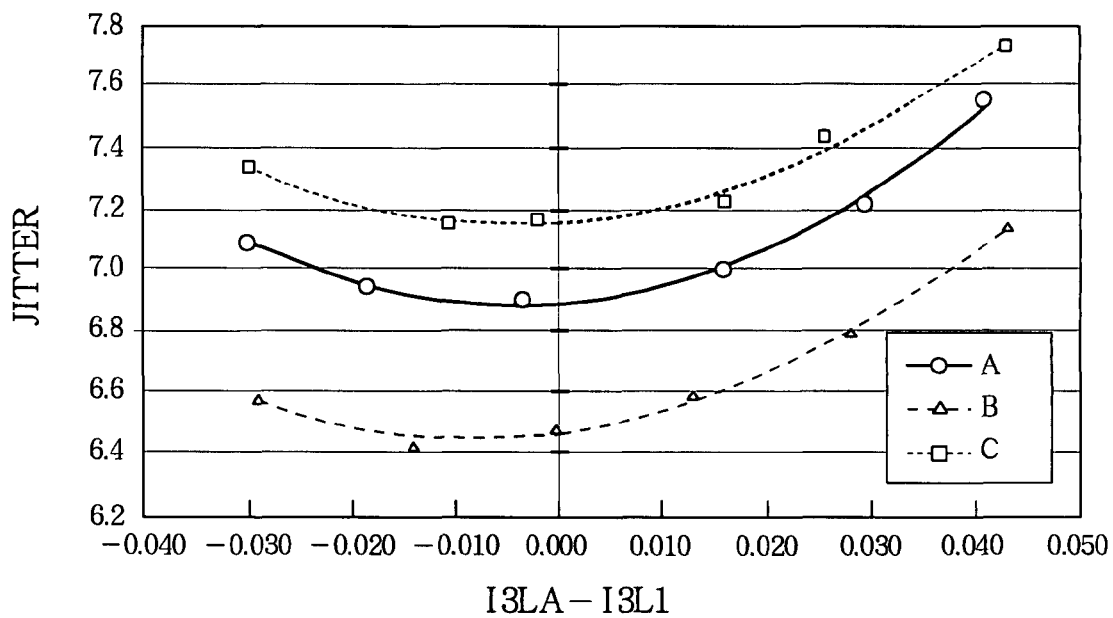
FIG. 25 shows relationships between the 3T mark signal level difference I3LA-I3L1 and reproducing jitter in the optical recording and reproduction device in the third embodiment of the invention when the position TLD of the leading edge of the leading pulse is changed.

FIG. 25 illustrates relationships between reproducing jitter and the quantity I3LA-I3L1 calculated from the mean value I3LA of the 3T-mark signal levels I3L when the preceding space has a length other than 3T and the 3T-mark signal level I3L1 when the preceding space has a length of 3T, as the front edge position TLD of the leading pulse is varied.

The above relationships were obtained for three types of optical discs with different characteristics; values for optical disc A are represented by circles, values for optical disc B are represented by triangles, and values for optical disc C are represented by squares.

As can be seen in the drawing, the regions where the quantity I3LA-I3L1 is near zero and where the reproducing jitter is optimal are approximately the same with all three types of optical discs; it is thus shown that by performing control so as to make the 3T-mark signal level I3LA for preceding space lengths other than 3T equal to the 3T-mark signal level I3L1 for a preceding space length of 3T, the front edge position of the leading pulse can be optimally adjusted.

Figure 26:
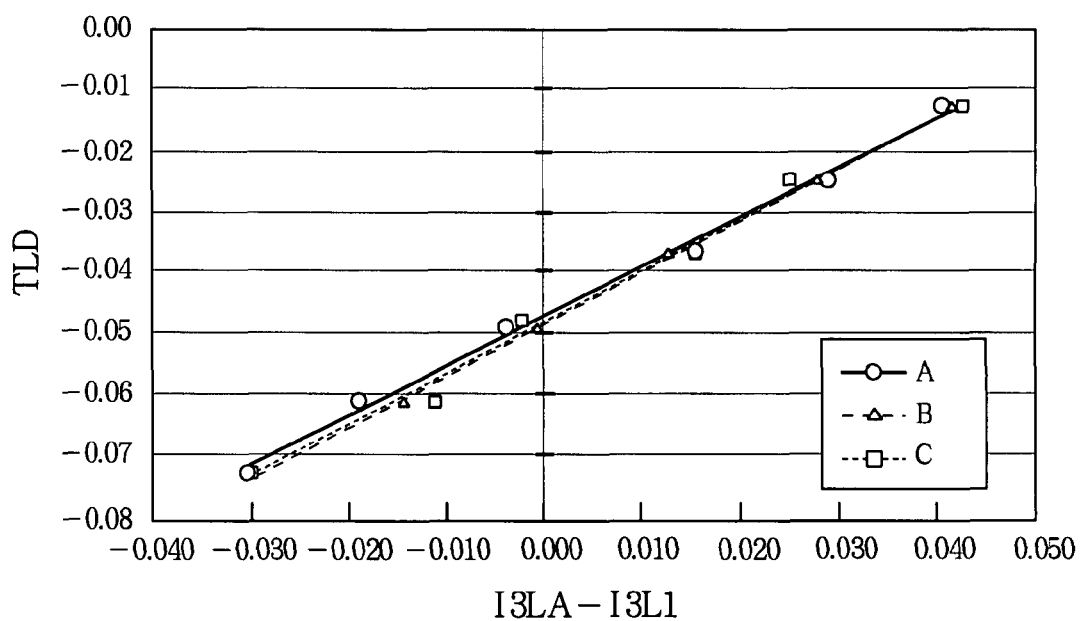
FIG. 26 shows relationships between the 3T mark signal level difference I3LA-I3L1 and position TLD of the leading edge of the leading pulse in the optical recording and reproduction device in the third embodiment of the invention when the position TLD of the leading edge of the leading pulse is changed.

FIG. 26 illustrates relationships between the quantity I3LA-I3L1 obtained as described above and the front edge position TLD of the leading pulse. As in FIG. 25, values for optical disc A are represented by circles, values for optical disc B are represented by triangles, and values for optical disc C are represented by squares.

As can be seen in the drawing, the quantity I3LA-I3L1 is proportional to the front edge position TLD of the leading pulse, and the variation of the front edge position TLD of the leading pulse relative to the quantity I3LA-I3L1 is approximately the same for the three types of optical discs. Modifications should therefore be performed so that when the quantity I3LA-I3L1 is greater than zero, the front edge position TLD of the leading pulse is advanced, and when the quantity I3LA-I3L1 is less than zero, the front edge position TLD of the leading pulse is delayed.

It can also be seen that when the front edge position TLD of the leading pulse is modified, the value of the modification of the front edge position TLD of the leading pulse should be based on the variation of the front edge position TLD of the leading pulse relative to the quantity I3LA-I3L1.

Likewise, in the adjustment of the front edge position of the leading pulse, the mean value of the 3T-mark signal levels 3L for combinations of cases in which the preceding space has a length other than the lengths described above or the 3T-mark signal level for the case in which the preceding space has a specific length other than the lengths described above may be used as the 3T-mark signal level for preceding space lengths other than 3T.

As described above, according to the present embodiment, the front edge position of the leading pulse is easily adjusted to the optimal position by comparing the 3T-mark signal level for preceding space lengths other than 3T and the 3T-mark signal level for a preceding space length of 3T.

It is also possible to determine the direction of change of the front edge position of the leading pulse (whether it should be advanced or delayed) by comparing the magnitudes of the 3T-mark signal level for preceding space lengths other than 3T and the 3T-mark signal level for a preceding space length of 3T.

Fourth Embodiment

In the third embodiment described above, as shown in FIG. 20, in steps S257 to S259, the mark signal level I3L1 for a preceding space length of 3T and the mark signal level I3LA for preceding space lengths other than 3T are compared, and a modification is performed so that when the mark signal level I3L1 for a preceding space length of 3T is greater, the front edge position of the leading pulse is advanced, and when the space signal level I3L1 for a preceding mark length of 3T is less, the front edge position of the leading pulse is delayed. Alternatively, the relationship between the variation of the front edge position of the leading pulse and the difference between the 3T-mark signal level for preceding space lengths other than 3T and the 3T-mark signal level for a preceding space length of 3T may be determined in advance, and by changing the front edge position of the leading pulse according to the difference, the front edge position of the leading pulse may be adjusted to the optimal position in relatively few modifications even when the front edge position of the leading pulse differs greatly from the optimal position.

Figure 27:
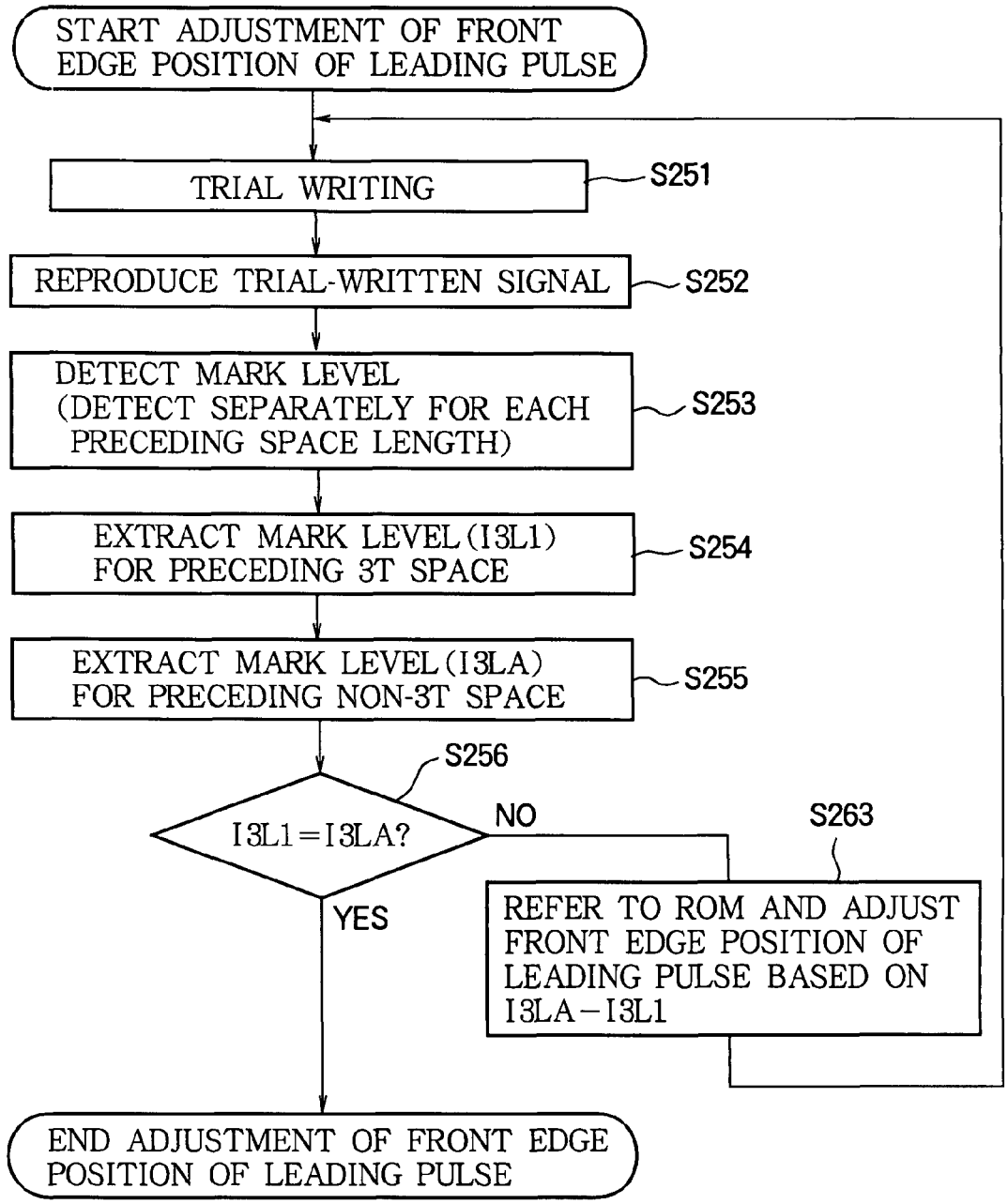
FIG. 27 is a flowchart illustrating an exemplary multi-pulse adjustment procedure in the optical recording and reproducing device in a fourth embodiment of this invention.

For example, the relationship between the variation of the front edge position of the leading pulse and the difference between the 3T-mark signal level for preceding space lengths other than 3T and the 3T-mark signal level for a preceding space length of 3T may be experimentally determined for each optical recording and reproducing device 100, the result may be stored in the optical recording and reproducing device 100, in the ROM 250b in the central controller 250, for example, and in the modification of the front edge position of the leading pulse, the front edge position of the leading pulse may be adjusted according to the magnitude of the difference between the 3T-mark signal level for preceding space lengths other than 3T and the 3T-mark signal level for a preceding space length of 3T. That is, when the result of the decision in step S256 is negative, the process proceeds to step S263 as shown in FIG. 27, and based on the difference between the 3T-mark signal level I3LA for preceding space lengths other than 3T and the 3T-mark signal level I3L1 for a preceding space length of 3T, the modification value (including whether to increase or decrease the value) of the front edge position of the leading pulse is read from the ROM 250b, and the front edge position of the leading pulse is changed according to the modification value that is read; then the process returns to step S251, and trial writing is performed again, using leading pulses with the modified front edge position. In this way, the front edge position of the leading pulse can be adjusted to the optimal position with comparatively few modifications.

The above relationship only needs to be determined once for each type of optical recording and reproducing device; the same relationship may be used for a plurality of optical recording and reproducing devices of the same type. That is, once the above relationship has been obtained for a optical recording and reproducing device of a certain type, other optical recording and reproducing devices of the same type may be shipped with the same relationship set therein.

The variations described with reference to FIGS. 21 and 22 are also possible in the fourth embodiment.

The signal levels of 3T marks are compared in the above third and fourth embodiments, but the signal levels of 4T marks (the second shortest mark length) may be compared, or the signal levels of marks having lengths corresponding to another number of clock periods may be compared instead.

Fifth Embodiment

The optical recording method in the fifth embodiment below performs mark-edge recording. To record information, it drives a semiconductor laser to emit multiple pulses according to a write strategy to form recording marks, based on the data to be recorded on the optical disc. In other words, the write strategy used in the fifth embodiment is a strategy of the multi-pulse type, having one or more pulses in the mark period. As described below, in a write pulse strategy of this multi-pulse type, the width of the leading pulse in the write strategy in the fifth embodiment is adjusted so as to equalize the widths of the mark portions and space portions corresponding to the same number of clock periods (which may simply be referred to as periods below) in the reproduced signal obtained by reading marks and spaces generated by trial writing (portions corresponding to marks and spaces written with the same number of clock periods). The lengths of marks and lengths of spaces between the marks are the lengths of the signal portions corresponding to the marks and spaces, expressed in units of the period T of the channel clock used in recording and reproducing.

In addition, in the fifth embodiment described below, the recording of information onto the optical disc is carried out by illuminating the optical disc with pulses in EFM (8-16) modulation patterns with 3T to 11T and 14T marks, that is, mark lengths of n periods, where n is 3 to 11 or 14. The longest mark (the mark with length 14T) is a sync pattern. In other words, the emitted optical pulse pattern generated according to the modulation rule for recording is used for forming marks having lengths of n periods, where n is 3 to 11 or 14.

Figure 28:
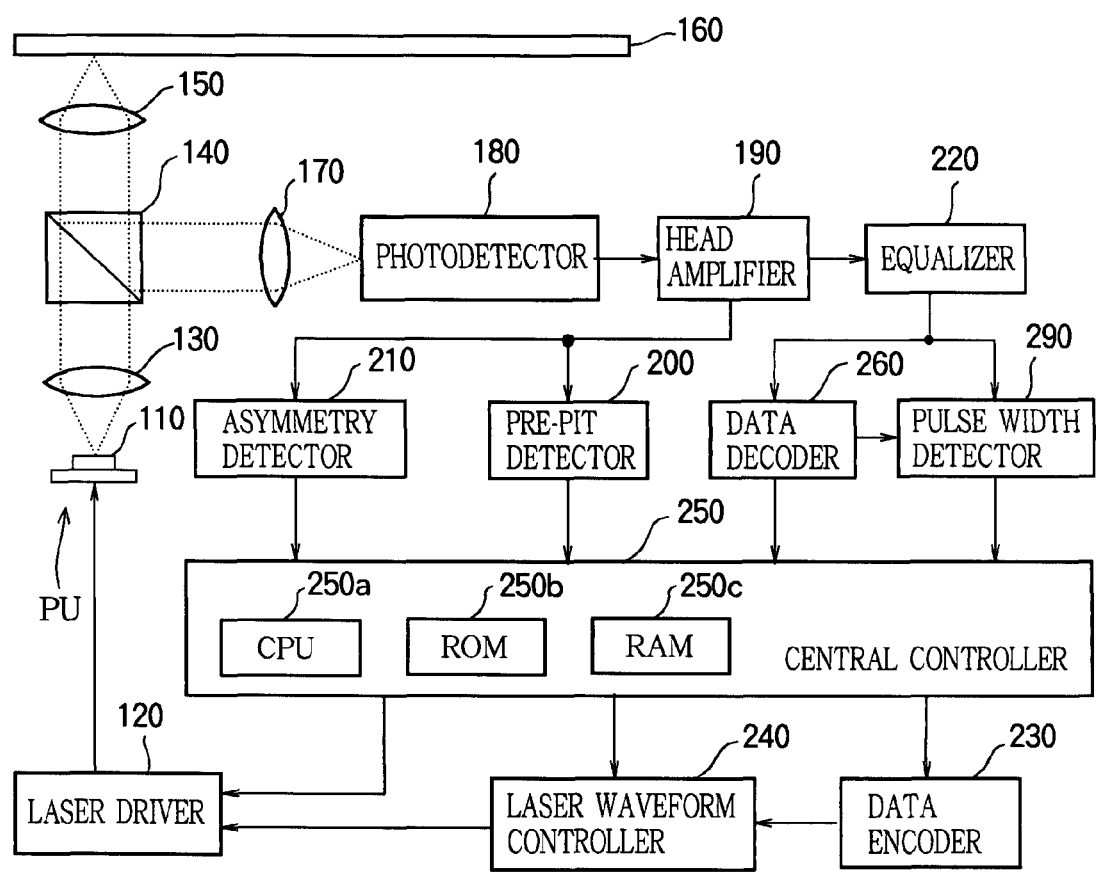
FIG. 28 is a block diagram showing an optical recording device in a fifth embodiment of the invention.

FIG. 28 shows an example of the basic structure of an optical recording and reproducing device 100 according to the fifth embodiment of the invention. The optical recording and reproducing device 100 shown in FIG. 28 is generally the same as the optical recording and reproducing device 100 in FIG. 1, except that it lacks the space level detector 270 in FIG. 1 and instead has a pulse width detector 290. The elements in FIG. 28 have generally the same functions as the elements indicated by the same reference characters in FIG. 1, and the basic operations in the reproducing and recording of data are generally the same. The description below will focus on points of difference from the operation of the apparatus in FIG. 1.

The electrical signal input from the head amplifier 190 to the equalizer 220 is reshaped and input to a data decoder 260.

The pulse width detector 290 receives a binarized signal from the data decoder 260, averages and extracts the widths of the mark portions corresponding to each number of periods, and averages and extracts the widths of the space portions corresponding to each number of periods.

FIGS. 29(a) to 29(f) show an example of a write strategy generated in the laser waveform controller 240 in the optical recording and reproducing apparatus 100 shown in FIG. 28 when the optical disc 160 is a medium of the dye type. FIG. 29(a) shows a channel clock having a period T used for recording (a recording channel clock). FIG. 29 (b) shows exemplary data to be recorded comprising marks MA and spaces SA. FIG. 29(c) shows the write strategy signal, i.e., the emitted optical pulse pattern, for recording the data in FIG. 29(b). In the emitted optical pulse pattern, the level is changed between the recording power level WP and reproducing power level RP, and the width of each pulse is defined as the period spent at the recording power level WP.

FIG. 29(d) shows marks MK and spaces SP positioned between the marks MK, generated on the optical disc by recording with the write strategy in FIG. 29(c). The horizontal axis in FIG. 29(d) indicates length (position) along the tracks on the optical disc, but for convenience, this axis is shown here as corresponding to the emitted optical pulse pattern in FIG. 29(c).

FIG. 29(e) shows a binarized reproduced signal obtained by reading and binarizing the marks MK and the spaces SP in FIG. 29(d). FIG. 29(f) shows a channel clock used for reproduction (a reproduction channel clock). The reproduced signal in FIG. 29(e) has been generated using the reproduction channel clock in FIG. 29(f). As in FIGS. 29(a) to 29(c), the horizontal axis in FIGS. 29(e) and 29(f) indicates time, which differs from FIG. 29(d), but for convenience, this axis is shown here as corresponding to the marks MK and the spaces SP in FIG. 29(d). The reproduction channel clock in FIG. 29(f) is shown as having the same period T as the recording channel clock in FIG. 29(a). The reproduced signal in FIG. 29(e) has portions MB corresponding to the marks MK and portions SB corresponding to the spaces SP.

In the exemplary reproduced signal in the drawing, the width (3WM) of the portion MB corresponding to the 3T mark MK is narrower than the reference width 3T, and the width (3WS) of the portion SB corresponding to the 3T space SP is wider than the reference width 3T; the width (6WM of the portion MB corresponding to the 6T mark MK is narrower than the reference width 6T, and the width (6WS) of the portion SB corresponding to the 6T space SP is wider than the reference width 6T. This will be explained later.

The shortest mark has a length of n=3 periods, corresponding to 3T, while the longest mark has a length of n=14 periods, corresponding to 14T.

FIGS. 29(b) and 29(c) show a case in which the shortest mark, namely the 3T mark, is recorded, and then the fourth shortest mark, namely the 6T mark, is recorded.

As shown at the left in FIG. 29(c), the write strategy for recording the shortest mark consists only of a leading pulse F having pulse width 1F.

As shown at the right in FIG. 29(c), the write strategy for recording the fourth shortest mark consists of a leading pulse F having pulse width LF followed by three multi-pulses M.

The write strategy for recording the p-th shortest mark (4<p<10, having a length corresponding to (p+2)T=nT), consists of a leading pulse F having pulse width LF, followed by (p−1) multi-pulses M.

The write strategy for recording the longest mark (a mark having length 14T) consists of a leading pulse F having pulse width LF, followed by eleven multi-pulses M.

As shown, the marks from the fourth shortest mark to the longest mark have the same leading pulse width LF.

The write strategy for recording the second shortest mark consists of a leading pulse F having pulse width 2F, followed by one multi-pulse M.

The write strategy for recording the third shortest mark consists of a leading pulse having pulse width 3F, followed by two multi-pulses M.

The width of the multi-pulses M is the same in all of the cases above.

During recording and reproducing operations by the optical recording and reproducing device 100, the central controller 250 controls the device as a whole. The central controller 250 receives pre-pit information from the pre-pit detector 200, an asymmetry value from the asymmetry detector 210, reproduced data from the data decoder 260, and width values of mark portions and space portions from the pulse width detector 290, and provides control signals to the data encoder 230, the laser waveform controller 240, and the laser driver 120.

In addition, the central controller 250 controls the determination of the write strategy, especially the calculation of pulse widths and the asymmetry value, and performs trial writing by use of a modified write strategy and asymmetry value, as will be described later with reference to FIGS. 30 and 31.

The central controller 250 comprises, for example, a CPU 250a, a ROM 250b storing programs for the operation of the CPU 250a, and a RAM 250c for storing data. The programs stored in the ROM 250b include calculations for adjusting the pulse width of the leading pulse and a section defining modifications of the pulse width of the leading pulse, as described later with reference to FIGS. 31 and 34. The ROM 250b stores various constants such as coefficients for determining modification values of the pulse widths and tolerances for determining modification precision in the modification of the pulse width of the leading pulse, as described later.

It is a general practice to optimize the recording power by performing trial writing before recording information. The procedure will be described below.

First, trial writing on the optical disc 160 is performed by use of a test pattern comprising 3T-11T marks and spaces corresponding to random recording data, for example, under varied recording power; next, the area on the optical disc 160 on which this test pattern has been recorded is reproduced, the asymmetry value is detected by the asymmetry detector 210, and the detected asymmetry value is compared with a target asymmetry value in the central controller 250 to obtain the optimal recording power.

In general, the higher the recording power is, the higher the asymmetry value becomes, and the lower the recording power is, the lower the asymmetry value becomes.

The central controller 250 compares the detected asymmetry values corresponding to a plurality of mutually differing recording powers with the target asymmetry value, and sets the optimal recording power as the recording power that generated a detected value nearest to the target value.

Alternatively, the trial writing on the optical disc 160 may be performed at one recording power, the data may be reproduced, the asymmetry value may be detected from the reproduced data, the detected asymmetry value may be compared with the target asymmetry value, and the recording power may be increased or decreased responsive to the comparison result to find the optimal value.

In this basic optical recording method, in the fifth embodiment, when a signal is reproduced by reading the marks and spaces generated by trial writing, the leading pulse width for forming marks is adjusted so that the widths of the mark portions MB and space portions SB corresponding to the same number of periods which were detected by the pulse width detector 290, that is, the widths of the portions MB and SB corresponding to the marks and spaces of lengths corresponding to the same n periods in the reproduced signal (3WM and 3WS, or 6WM and 6WS in FIG. 29, for example) become equal, and data are recorded using the modified leading pulse width. In practice, instead of comparing each of the above portions (the portions corresponding to n-period marks in the reproduced signal and the portions corresponding to n-period spaces in the reproduced signal) separately and adjusting the pulse widths to make the two values equal, the mean values of a plurality of portions corresponding to the marks and spaces are obtained, the mean values are compared, and the pulse widths are adjusted to make the mean values equal.

The procedure followed in the optical recording method of the fifth embodiment will now be described with reference to FIG. 30.

First, when the optical disc to be used in recording is inserted in the optical recording device, a sensor (not shown) detects this (step S30) and notifies the central controller 250, and the central controller 250 drives the optical pickup PU, thereby reading from the optical disc 160 the disc-specific information prerecorded by the disc manufacturer, such as the recommended write strategy values and the recommended value of the asymmetry value β (step S31).

Next, in step S32, the recommended write strategy value read from the optical disc 160 is set in the central controller 250 (in the RAM 250c, for example) as the initial write strategy for adjusting the pulse width of the leading pulse. It is possible to use a specific write strategy preset in the optical recording device 100 instead of values read from the optical disc 160 as the initial write strategy.

Next, in step S33, the recommended value of the asymmetry value β read from the optical disc 160 is set in the central controller 250 (in the RAM 250c, for example) as the target value to be used for optimizing the recording power. It is possible to use a specific value preset in the optical recording device 100 instead of a value read from the optical disc 160 as the target asymmetry value β.

Then, when a record command is given by a means not shown in the drawings (S34), in step S35, trial writing on the optical disc 60 is performed by use of the initial write strategy and target asymmetry value set as described above. That is, the write strategy (the strategy for each nT) set in the central controller 250 in step S32 is set in the laser waveform controller 240, a write strategy based on a test pattern is generated in the laser waveform controller 240, and trial writing on the optical disc 60 is performed using the optical pickup. Then the area on the optical disc 160 on which the test pattern has been recorded is reproduced using the optical pickup, the asymmetry value detected by the asymmetry detector 210 is compared with the target asymmetry value set in step S33 in the central controller 250, and control is performed to make the two values match, whereby the optimal recording power is determined.

When this trial writing has been performed and the power has been adjusted, in step S36, the pulse width of the leading pulse is adjusted. The power may be readjusted when the pulse width of the leading pulse is adjusted in step S36.

Finally, in step S37, the leading pulse width adjusted in step S36 is set in the laser waveform controller 240, a write strategy based on the recording data is generated in the laser waveform controller 240, and using the recording power determined in step S35, original data are written (original writing) on the optical disc 60. If the recording power has been readjusted in step S36, the recording power determined in step S36 may be used instead of the value determined in step S35.

Of the above processes, the process in step S30 is performed by the central controller 250 and a sensor (not shown) for detecting the insertion of an optical disc, the process in step S31 is performed by the optical pickup PU, head amplifier 190, equalizer 220, data decoder 260, and central controller 250, the processes in steps S32 and S33 are performed by the central controller 250, the process in step S34 is performed by the central controller 250 and a means (interface) for receiving record commands (not shown), the process in step S35 is performed by the head amplifier 190, asymmetry detector 210, central controller 250, laser waveform controller 240, and optical pickup PU, the process in step S36 is performed by the head amplifier 190, equalizer 220, data decoder 260, pulse width detector 290, central controller 250, laser waveform controller 240, and optical pickup PU, and the process in step S37 is performed by the central controller 250, laser waveform controller 240, and optical pickup PU.

Figure 30:
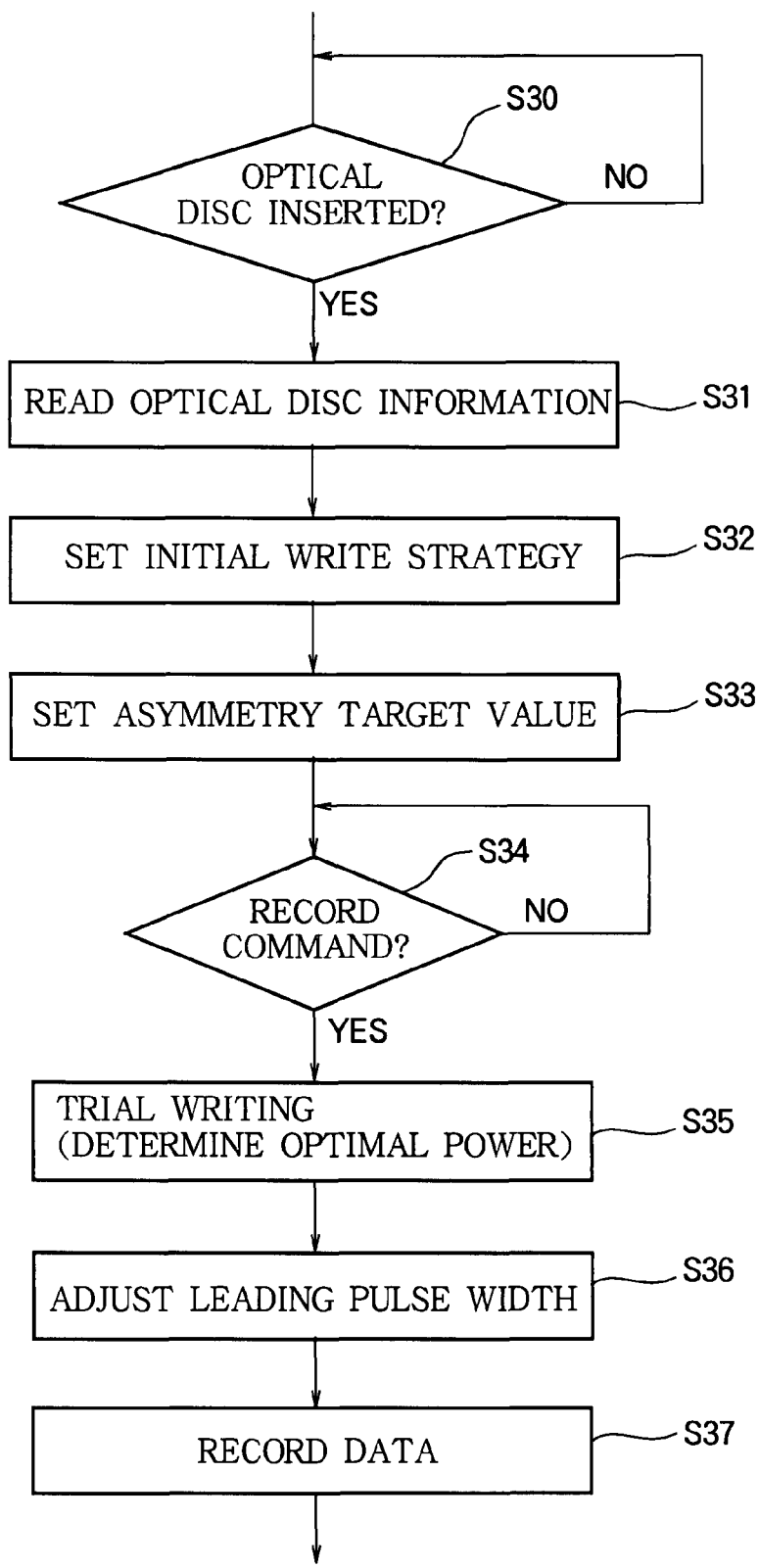
FIG. 30 is a flowchart illustrating a recording procedure in the optical recording and reproducing device in the fifth embodiment of this invention.
Figure 31:
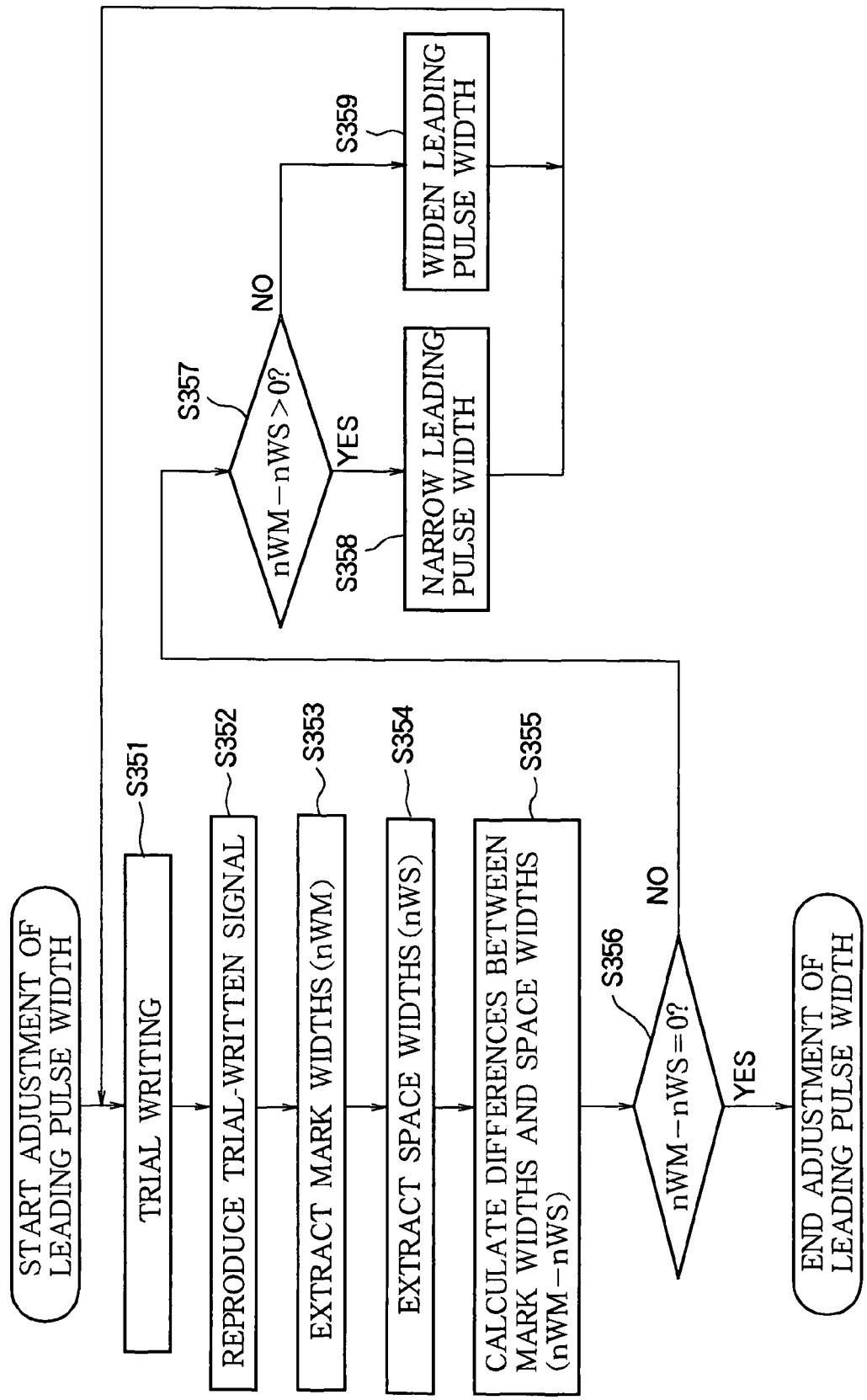
FIG. 31 is a flowchart illustrating an exemplary leading pulse adjustment procedure for forming marks in an optical recording and reproducing device in the fifth embodiment of this invention.

FIG. 31 shows the process performed in step S36 in FIG. 30 in more detail.

In step S351, the initial write strategy set in step S32 and the recording power determined in step S35 are used to perform trial writing on the optical disc 60, and in step S352, the signal written in step S351 is reproduced.

The process in step S351 is performed by the central controller 250, laser waveform controller 240, and optical pickup PU, and the process in step S352 is performed by the optical pickup PU, head amplifier 190, and equalizer 220.

Next, in step S353, the pulse width detector 290 extracts averaged widths of the mark portions MB in the signal reproduced in step S352. That is, in a signal obtained by reproducing a plurality of marks, the widths of the portions corresponding to each number of periods n, where n is 3 to 6, are averaged, and the mean values are stored as the widths of the mark portions MB corresponding to each number of periods n (where n is 3 to 6).

Next, in step S354, the pulse width detector 290 extracts averaged widths of the space portions SB in the signal reproduced in step S352. That is, in a signal obtained by reproducing a plurality of spaces, the widths of the portions corresponding to each number of periods n, where n is 3 to 6, are averaged, and the mean values are stored as the widths of the space portions SB corresponding to each number of periods n (where n is 3 to 6).

The processes in steps S353 and S354 are performed by the data decoder 260, the pulse width detector 290, and the central controller 250.

Next, in step S355, from the widths of the mark portions MB extracted and averaged in step S353 and the widths of the space portions SB extracted and averaged in step S354, the difference between the widths corresponding to the same number of periods is calculated.

Next, in step S356, it is determined whether the difference nWM-nWS (where n is 3 to 11 or 14) calculated in step S355 between the width of the mark portion MB and the width of the space portion SB corresponding to the same number of periods is zero.

If the value of nWM-nWS is zero, the leading pulse adjustment is terminated. If the value of nWM-nWS is not zero, the leading pulse adjustment is carried out.

In step S357, the magnitudes of the values of nWM and nWS are compared to carry out the leading pulse adjustment.

If the width of the mark portion MB is wider than the width of the space portion SB (nWM-nWS>0), the leading pulse width is reduced (step S358). If the width of the mark portion MB is not wider than the width of the space portion SB, the leading pulse width is increased (step S359).

The processes in steps S355 to S359 are performed in the central controller 250.

After the pulse width of the leading pulse has been modified in step S358 or in step S359, the modified leading pulse width is used to perform trial writing in step S351 and the subsequent steps are repeated so as to perform the leading pulse adjustment until, in step S356, the difference nWM-nWS between the width of the mark portion MB and the width of the space portion SB corresponding to the same number of periods becomes zero.

Prior to the trial writing in step S351, the optimal power may be readjusted.

Figure 32:
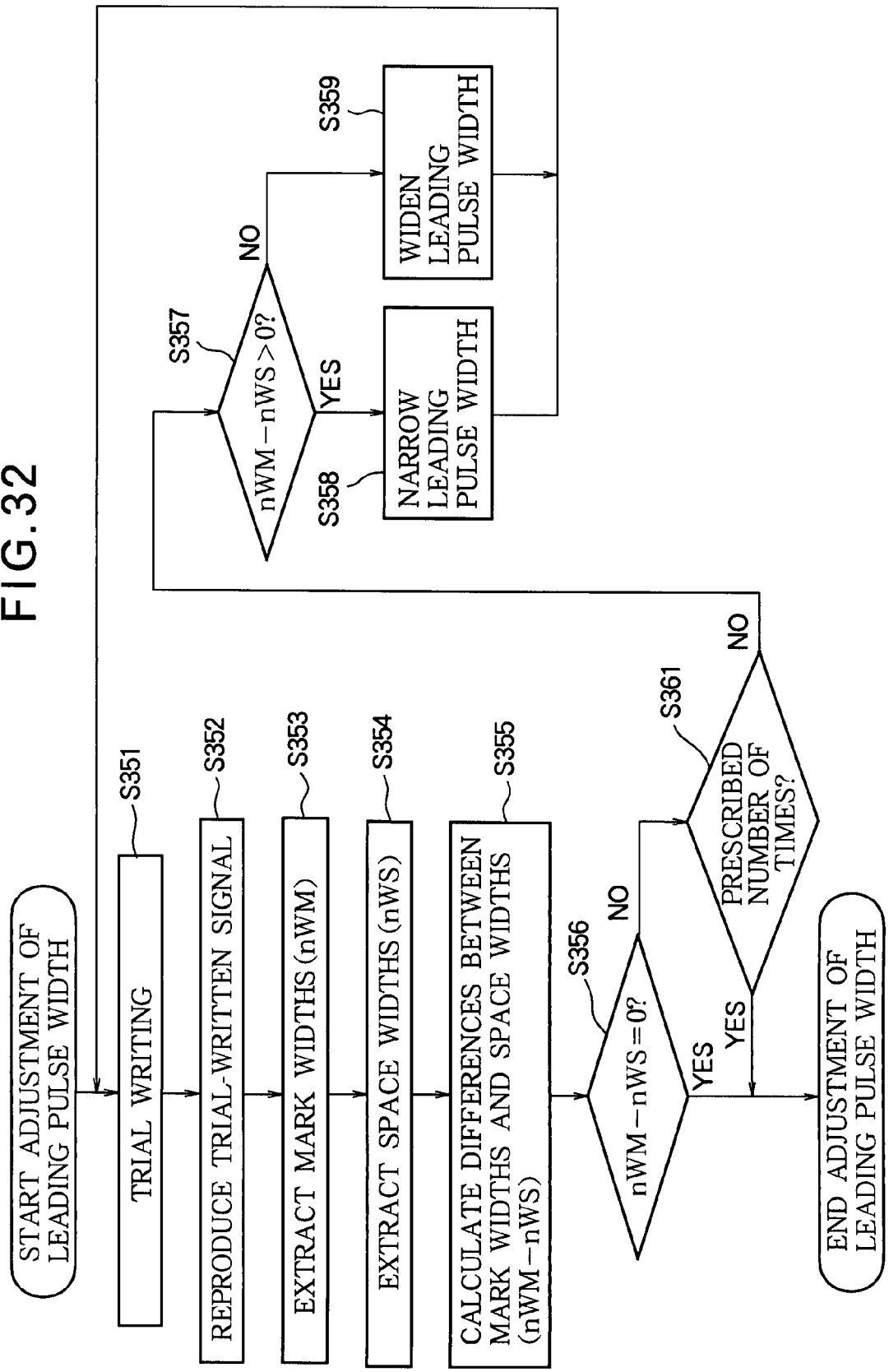
FIG. 32 is a flowchart illustrating another exemplary leading pulse adjustment procedure for forming marks in an optical recording and reproducing device in the fifth embodiment of this invention.

The leading pulse adjustment is performed until the difference between the width of the mark portion MB and the width of the space portion SB corresponding to the same number of periods becomes zero, but it is also possible to preset a limit value for the leading pulse adjustment, and to terminate the leading pulse adjustment when the number of times the leading pulse has been modified exceeds the limit value. For example, when the result in step S356 is negative, the procedure may proceed to step S361 in FIG. 32, in which it is determined whether the number of modifications has exceeded a prescribed value. If the value is exceeded (Yes in step S361), the leading pulse adjustment is terminated. If the value is not exceeded (No in step S361), the procedure proceeds to step S357. The process in step S361 is performed in the central controller 250.

Figure 33:
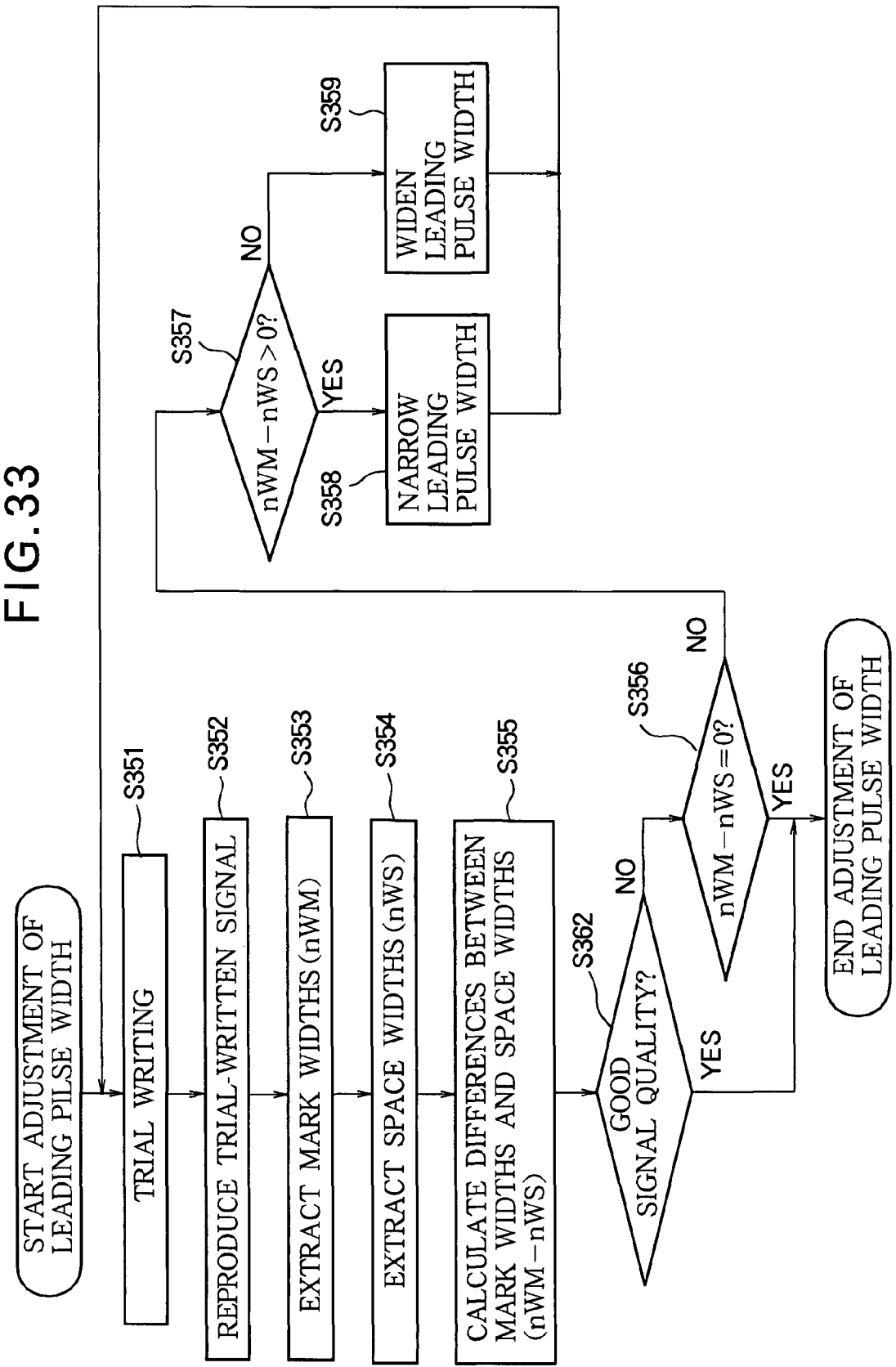
FIG. 33 is a flowchart illustrating yet another exemplary leading pulse adjustment procedure for forming marks in an optical recording and reproducing device in the fifth embodiment of this invention.

It is also possible to check the signal quality, e.g., jitter, prior to step S356, to terminate the leading pulse adjustment if the signal quality, e.g., jitter value, is better than a predetermined reference standard, and to proceed to step S356 only if the signal quality is inferior to the reference standard. For example, signal quality, such as jitter, may be checked following step S355, as shown in FIG. 33 (step S362); if the signal quality, e.g., jitter value, is better than the predetermined reference standard, the leading pulse adjustment is terminated; if the signal quality is inferior, the procedure proceeds to step S356. The process in step S362 is performed in the central controller 250.

In order to determine the relationship between signal quality and the difference between the widths of mark portions MB and space portions SB corresponding to the same number of periods, the inventors conducted experiments to find the width of the mark portion MB and the width of the space portion SB when the leading pulse width for forming marks is varied. The relationship between the widths of mark portions MB that minimize reproducing jitter and space portions SB corresponding to the same number of periods was also obtained.

Figure 34:
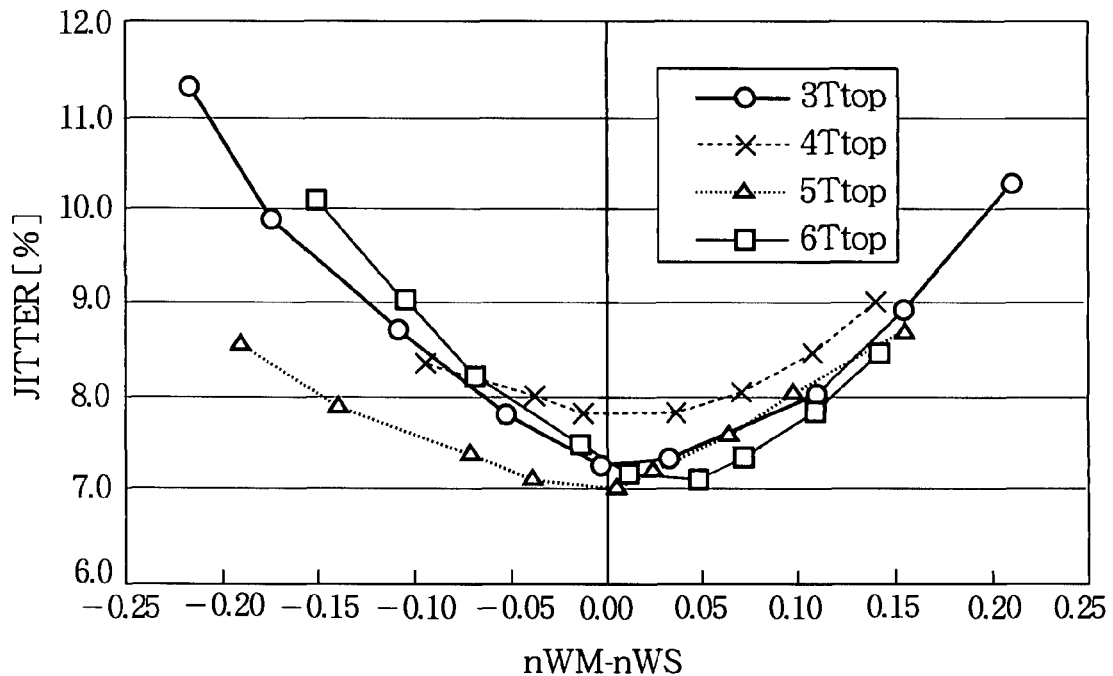
FIG. 34 illustrates the relationship between reproducing jitter and the difference between the width of the mark portion and the width of the space portion in the optical recording and reproducing device in the fifth embodiment of the invention as the leading pulse width for forming marks consisting of different numbers of periods is varied when the data are recorded.

FIG. 34 illustrates relationships between reproducing jitter and the difference nWM-nWS between the width of a mark portion MB and a space portion SB corresponding to the same number of periods, calculated from the width nWM of the mark portion MB, the width nWS of the space portion SB and the reproducing jitter obtained in reproduction, as the leading pulse widths for forming marks of lengths corresponding to each number of periods are varied when the data are recorded.

In the drawing, the horizontal axis indicates the difference between the width of the mark portion MB and the width of the space portion SB normalized by the channel clock period T, and the vertical axis indicates reproducing jitter after recording. The circles, crosses, triangles, and squares in the drawing represent reproducing jitter for 3T, 4T, 5T, and 6T and longer marks, respectively, (indicated as 3Ttop, 4Ttop, 5Ttop and 6Ttop in the legend in the drawing) when the difference between the width of the mark portion MB and the width of the space portion SB is varied.

In the above experiment, the leading pulse width for recording marks of length 7T and longer is set equal to the leading pulse width for recording the 6T mark.

Fixed values are used to form marks with numbers of periods for which the leading pulse width is not varied. The fixed values of the leading pulse width are, for example, 1.38T for a 3T mark, 1.38T for a 4T mark, 1.42T for a 5T mark, and 1.46T for marks of length 6T and longer.

The multi-pulse width is also set to a fixed value: for example, 0.66T.

From FIG. 34 it can be seen that for the frequently-occurring 3T, 4T, and 5T patterns, reproducing jitter is minimum at the point where nWM-nWS is zero, that is, when the width of the mark portion MB and the width of the space portion SB corresponding to the same number of periods are equal, and that good recording characteristics with near-minimum reproducing jitter are also obtained for lengths of 6T and longer.

Figure 35:
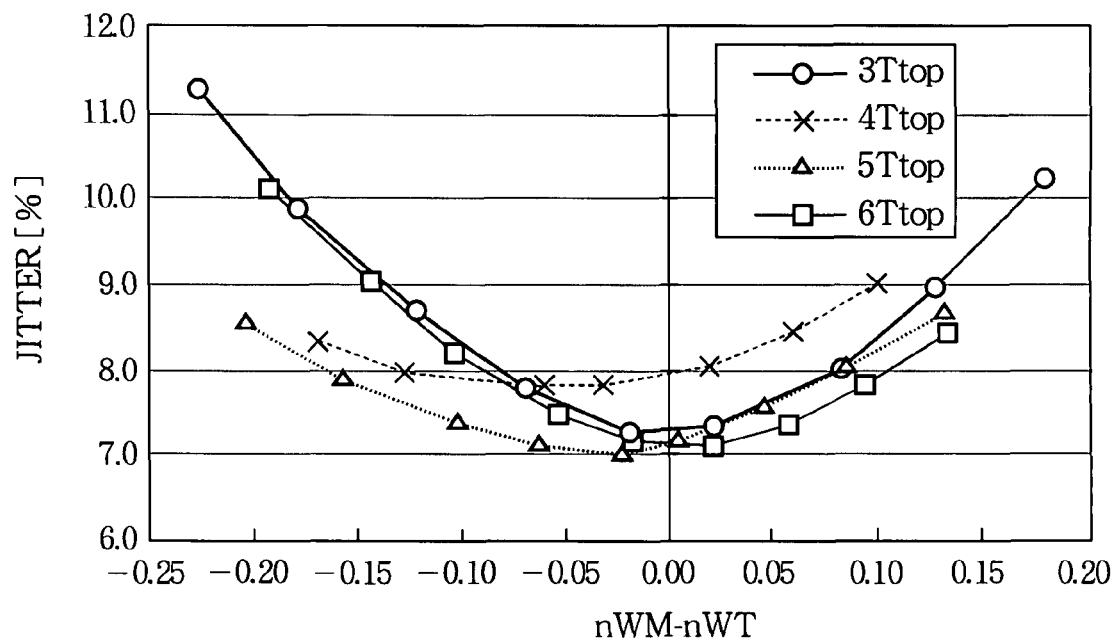
FIG. 35 illustrates the relationship between reproducing jitter and the difference between the width of the mark portion and the width of the reference mark portion in the optical recording and reproducing device in the fifth embodiment of this invention as the leading pulse width for forming marks consisting of different numbers of periods is varied when the data are recorded.

FIG. 35 illustrates relationships between reproducing jitter and the difference nWM-nT between the width of the mark portion MB and the width nT of a reference mark portion (e.g., the product of the number of periods and the clock period), calculated from the width nWM of the mark portion MB and the reproducing jitter obtained in reproduction, as the leading pulse widths for forming marks having lengths corresponding to each number of periods are varied when the data are recorded.

In the drawing, the horizontal axis indicates the difference between the width of the mark portions MB and the width of the reference portion normalized by the channel clock period T, and the vertical axis indicates reproducing jitter after recording. The circles, crosses, triangles, and squares in the drawing represent reproducing jitter when the difference between the width of the mark portion MB and the width of the reference portion corresponding to periods of 3T, 4T, 5T, 6T and longer, respectively, is changed (indicated as 3Ttop, 4Ttop, 5Ttop and 6Ttop in the legends in the drawing).

As in the experiment in FIG. 34, the leading pulse width for recording marks of length 7T and longer is set equal to the leading pulse width for recording the 6T mark.

Fixed values are used to form marks with numbers of periods for which the leading pulse width is not varied. The fixed values of the leading pulse width are, for example, 1.38T for a 3T mark, 1.38T for a 4T mark, 1.42T for a 5T mark, and 1.46T for marks of length 6T and longer.

The multi-pulse width is also set to a fixed value, for example, 0.66T.

From FIG. 35 it can be seen that for the frequently-occurring 4T and 5T patterns, reproducing jitter is minimum at a point approximately −0.05T from the minimum point of the reference mark pattern. It can thus been seen that recording characteristics are not always optimal when marks are recorded with the reference mark width.

Figure 36:
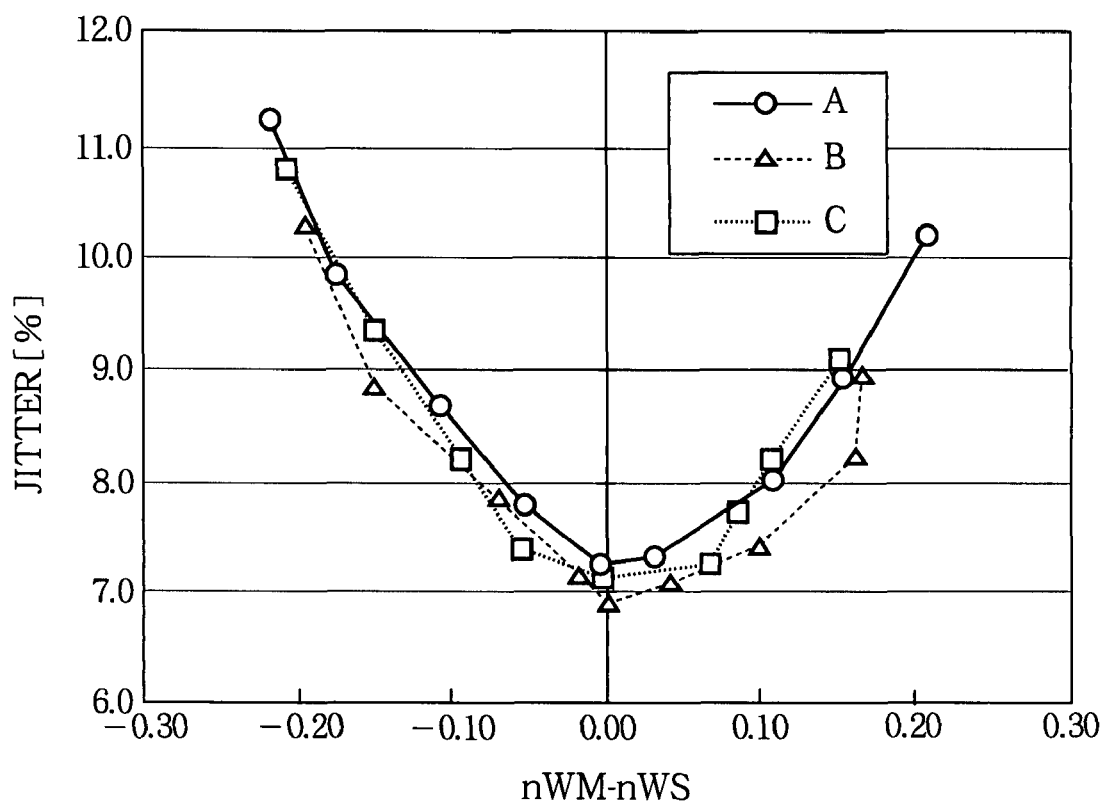
FIG. 36 illustrates the relationship between reproducing jitter and the difference between the widths of 3T mark and space portions in the optical recording and reproducing device in the fifth embodiment of the invention as the leading pulse width for forming 3T marks is varied when data are recorded on the different types of optical discs (A, B, C).

FIG. 36 illustrates relationships between reproducing jitter and the difference nWM-nWS between the width of the mark portion MB and the space portion SB corresponding to the same number of periods, calculated from the width nWM of the mark portion MB, the width nWS of the space portion SB, and the reproducing jitter obtained in reproduction, as the leading pulse width for forming 3T marks is varied when data are recorded on three types of optical discs with different characteristics. The circles, triangles, and squares correspond to optical discs A, B, and C, respectively. Fixed values are used to form marks with numbers of periods for which the leading pulse width is not varied.

In the drawing, the horizontal axis indicates the difference between the width of the 3T mark portion MB and the width of the 3T space portion SB normalized by the channel clock period T, and the vertical axis indicates reproducing jitter after recording.

FIG. 36 shows that reproducing jitter is minimum and good recording characteristics are obtained at the point where nWM-nWS is zero, that is, when the width of the mark portion MB is equal to the width of the space portion SB.

As described above, according to the fifth embodiment, optimal recording can be carried out by adjusting the leading pulse width for forming marks so that the width of the mark portion MB and the width of the space portion SB corresponding to the same number of periods become equal.

In addition, whether to reduce or increase the leading pulse width for forming marks in recording can be easily determined from the comparison result of the magnitude of the width of the mark portion MB and the width of the space portion SB corresponding to the same number of periods.

In other words, the leading pulse width for forming marks in recording is obtained for each optical recording and reproducing device 100 so that the width of the mark portion MB and the width of the space portion SB corresponding to the same number of periods become equal, the result is stored in the optical recording and reproducing device 100, in the memory in the central controller 250 together with information specifying the optical discs, for example, and when recording is performed on an optical disc for which information specifying the optical disc are stored, the leading pulse width for forming marks can be optimally adjusted without any modification or with relatively few modifications.

In the fifth embodiment described above, the leading pulse width for forming marks in recording is adjusted so that the width of the mark portion MB and the width of the space portion SB corresponding to the same number of periods become equal, but when the absolute value of the difference between the width of the mark portion MB and the width of the space portion SB corresponding to the same number of periods is lower than a predetermined threshold, it may be considered to be the same as the case in which the difference is zero, and the adjustment of the leading pulse width for forming marks in recording may be terminated.

The leading pulse width is adjusted in the fifth embodiment described above, but a laser illumination duration other than the leading pulse width may be adjusted instead.

In the fifth embodiment described above, the leading pulse width for forming (recording) marks of length 7T and longer is set equal to the leading pulse width for recording the 6T mark, but the present invention is not limited to this practice; more generally, a laser optical illumination duration such as the width of the leading pulse for forming (recording) k-period marks may also be used as the laser optical illumination duration, e.g., the leading pulse width, for forming (recording) j-period marks (where j is different from k; for example, j is larger than k). In other words, in the present invention, of the plurality of marks corresponding to mutually differing numbers of periods generated according to a modulation rule, the laser optical illumination duration may be adjusted only for marks corresponding to certain numbers of periods (3T to 6T marks, for example), and the laser optical illumination duration determined for marks corresponding to a certain number of periods may be used for forming marks corresponding to other numbers of periods (marks of length 7T and longer).

Sixth Embodiment

Figure 37:
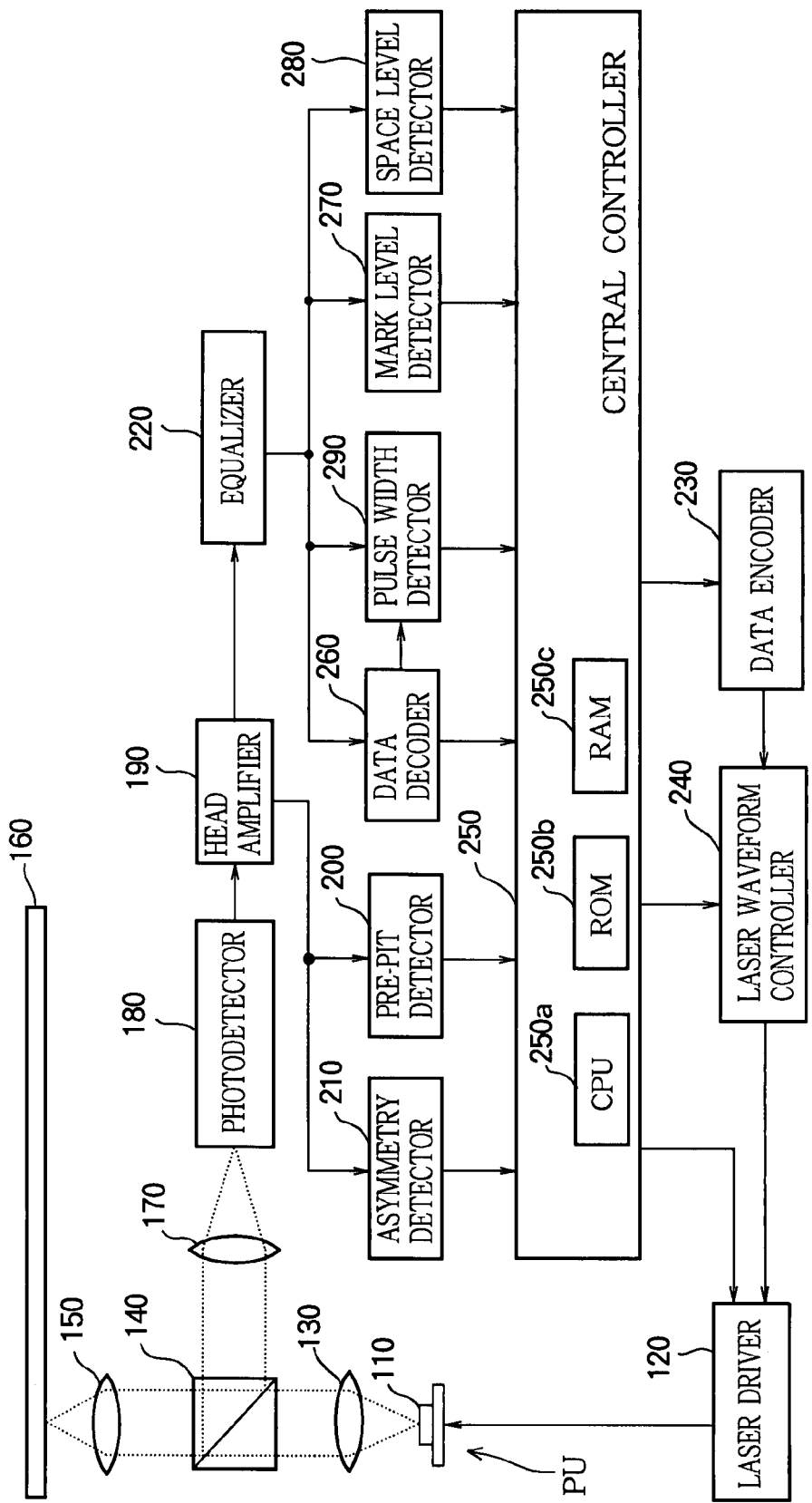
FIG. 37 is a block diagram showing an optical recording device in a sixth embodiment of the invention.

FIG. 37 shows an example of the basic structure of an optical recording and reproducing device 100 according to the sixth embodiment of the invention. The optical recording and reproducing device 100 shown in FIG. 37 is generally the same as the optical recording and reproducing device 100 in FIG. 1, except that it includes the mark level detector 280 in FIG. 18 and the pulse width detector 290 in FIG. 28. The elements in FIG. 37 have generally the same functions as the elements indicated by the same reference characters in FIGS. 1, 18, and 28, and the basic operations in the reproducing and recording of data are generally the same. The description below will focus on points of difference from the operation of the apparatuses in FIGS. 1, 18 and 28.

Figure 38:
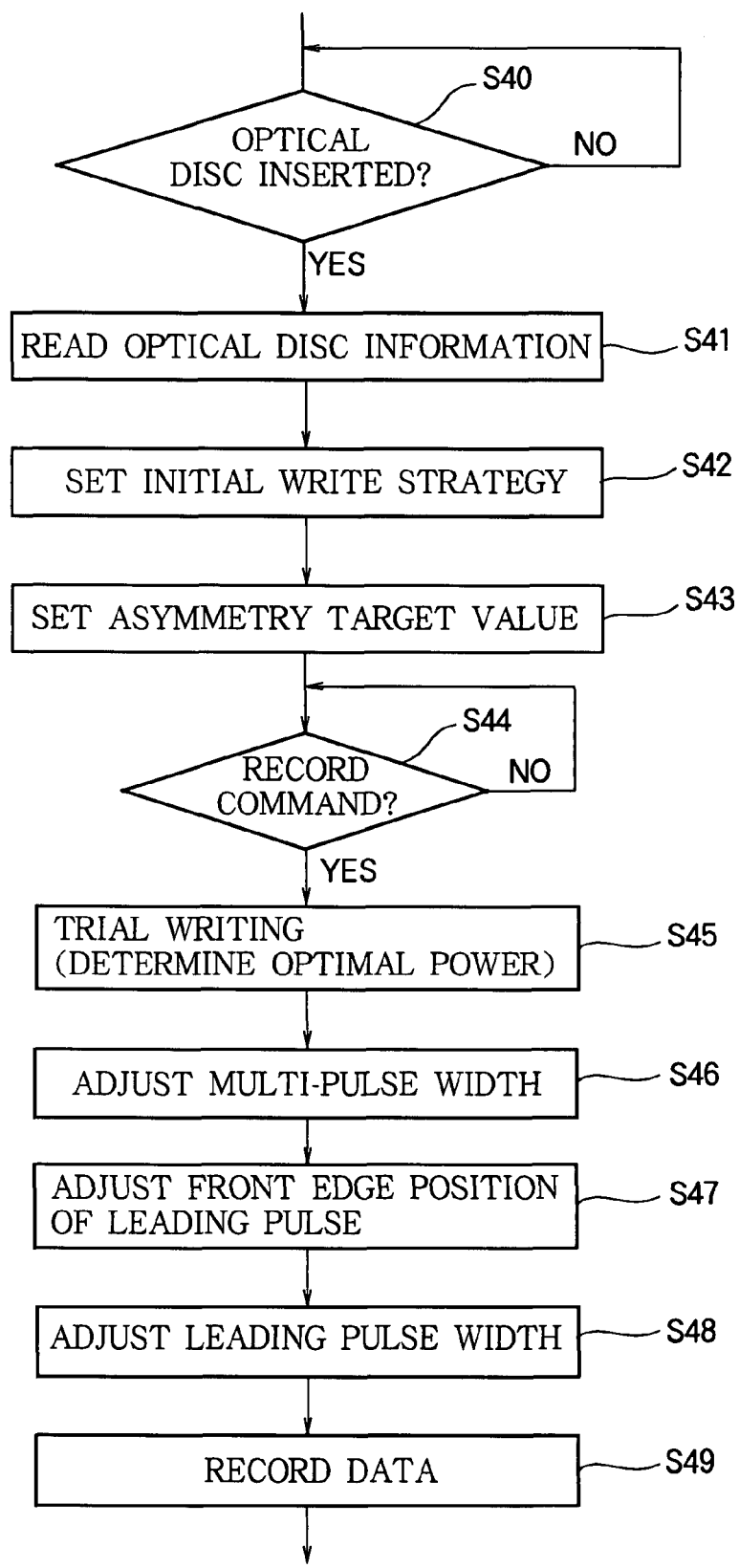
FIG. 38 is a flowchart illustrating a recording procedure in the optical recording and reproducing device in the sixth embodiment of the invention.

The procedure followed in the optical recording method of the sixth embodiment will now be described with reference to FIG. 38.

First, when the optical disc 160 to be used in recording is inserted in the optical recording device 100, a sensor (not shown) detects this (step S40) and notifies the central controller 250, and the central controller 250 drives the optical pickup PU, thereby reading from the optical disc 160 the disc-specific information prerecorded by the disc manufacturer, such as the recommended write strategy values and the recommended value of the asymmetry value β (step S41).

Next, in step S42, the recommended write strategy value read from the optical disc 160 is set in the central controller 250 (in the RAM 250c, for example) as the initial write strategy for adjusting the pulse width of the multi-pulses. It is possible, to use a specific write strategy preset in the optical recording device 100 instead of values read from the optical disc 160 as the initial write strategy.

Next, in step S43, the recommended value of the asymmetry value β read from the optical disc 160 is set in the central controller 250 (in the RAM 250c, for example) as the target value to be used for optimizing the recording power. It is possible to use a specific value preset in the optical recording device 100 instead of a value read from the optical disc 160 as the target asymmetry value β.

Then, when a record command is given by a means not shown in the drawings (S44), in step S45, trial writing on the optical disc 60 is performed by use of the initial write strategy and target asymmetry value set as described above. That is, the write strategy (the strategy for each nT) set in the central controller 250 in step S42 is set in the laser waveform controller 240, a write strategy based on a test pattern is generated in the laser waveform controller 240, and trial writing on the optical disc 60 is performed using the optical pickup. Then the area on the optical disc 160 on which the test pattern has been recorded is reproduced using the optical pickup, the asymmetry value detected by the asymmetry detector 210 is compared with the target asymmetry value set in step S43 in the central controller 250, and control is performed to make the two values match, whereby the optimal recording power is determined.

When this trial writing has been performed and the power has been adjusted, in step S46, the pulse width of the multi-pulses is adjusted. The power may be readjusted when the pulse width of the multi-pulses is adjusted in step S46. The process in step S46 may be performed in the same way as described in the first embodiment with reference to FIGS. 5 to 7, for example.

When the pulse width of the multi-pulses has been adjusted in step S46, in step S47, the front edge position of the leading pulse is adjusted. The power may be readjusted when the front edge position of the leading pulse is adjusted in step S47. The process in step S47 may be performed in the same way as described in the third embodiment with reference to FIGS. 20 to 22, for example.

When the front edge position of the leading pulse has been adjusted in step S47, in step S48, the pulse width of the leading pulse is adjusted. The power may be readjusted when the pulse width of the leading pulse is adjusted in step S48. The process in step S48 may be performed in the same way as described in the fifth embodiment with reference to FIGS. 31 to 33, for example.

Finally, in step S49, the multi-pulse pulse width adjusted in step S46, the front edge position of the leading pulse adjusted in step S47, and the leading pulse width adjusted in step S48 are set in the laser waveform controller 240, a write strategy based on the recording data is generated in the laser waveform controller 240, and original data are written (original writing) on the optical disc 60, using the recording power determined in step S45. If the recording power has been readjusted in steps S46 to S48, the recording power determined in steps S46 to S48 may be used instead of the value determined in step S45.

Of the above processes, the process in step S40 is performed by the central controller 250 and a sensor (not shown) for detecting the insertion of an optical disc, the process in step S41 is performed by the optical pickup PU, head amplifier 190, equalizer 220, data decoder 260, and central controller 250, the processes in steps S42 and S43 are performed by the central controller 250, the process in step S44 is performed by the central controller 250 and a means (interface) for receiving record commands (not shown), the process in step S45 is performed by the head amplifier 190, asymmetry detector 210, central controller 250, laser waveform controller 240, and optical pickup PU, the processes in steps S46 to S48 are performed by the head amplifier 190, equalizer 220, space level detector 270, mark level detector 280, pulse width detector 290, central controller 250, laser waveform controller 240, and optical pickup PU, and the process in step S49 is performed by the central controller 250, laser waveform controller 240, and optical pickup PU.

In the above steps S46 to S48, the adjustment of the pulse width of the multi-pulses, the adjustment of the front edge position of the leading pulse, and the adjustment of the pulse width of the leading pulse are performed sequentially, one adjustment at a time, but after each write strategy adjustment, for example, the jitter or error rate of the signal recorded with the adjusted write strategy may be checked, and when a specified performance level is satisfied, the subsequent adjustments may be omitted and the process in step S49 may be carried out. In addition, prior to step S49, the jitter or error rate of the signal recorded with the adjusted write strategy may be checked, for example, and if a specified performance level is not satisfied, steps S46 and S47 may be repeated.

In the above steps S46 to S48, first, the pulse width of the multi-pulses is adjusted, then the front edge position of the leading pulse is adjusted, and finally, the pulse width of the leading pulse is adjusted; although this is the most preferable sequence, in practice, any of the write strategy adjustments may be carried out first.

What is claimed is:

1. An optical recording method for recording information on an optical recording medium by directing pulsed laser light onto an optical disc, comprising:
   a writing step of forming marks of prescribed lengths by directing the laser light by a write strategy including only a leading pulse or a leading pulse and a multi-pulse, and forming a recorded portion including marks and spaces of prescribed lengths, each space being situated between two marks;
   a space level reading step of reading peak levels of signals corresponding to the spaces, the signals being obtained by reading said recorded portion;
   a recording pulse width modification step of comparing the peak levels of the signals, obtained by reading said recorded portion corresponding to the spaces having the same length, according to the lengths of the marks immediately preceding the spaces, and modifying the pulse widths of the multi-pulses in the write strategy according to results of the comparisons; and
   a writing step of writing to the optical recording medium, using the pulse widths of the write strategy as modified in the recording pulse width modification step.

2. The optical recording method of claim 1, wherein the reading step reads the peak levels of signals for spaces of shortest length as the peak levels of signals corresponding to the spaces, obtained by reading said recorded portion.

3. The optical recording method of claim 1, wherein the reading step reads the peak levels of signals for spaces of second shortest length as the peak levels of signals corresponding to the spaces, obtained by reading said recorded portion.

4. The optical recording method of claim 1, wherein the recording pulse width modification step compares the peak level of a signal obtained by reading said recorded portion corresponding to a space immediately preceded by a mark of shortest length with an averaged peak level corresponding to spaces having the same length as said space immediately preceded by marks of a plurality of other lengths other than the shortest length.

5. The optical recording method of claim 1, wherein the recording pulse width modification step compares the peak level of a signal obtained by reading said recorded portion corresponding to a space immediately preceded by a mark of shortest length with the peak level corresponding to a space having the same length as said space immediately preceded by a mark of a length other than the shortest length.

6. The optical recording method of claim 1, wherein the recording pulse width modification step modifies the pulse widths to make the compared peak levels match.

7. The optical recording method of claim 1, wherein the recording pulse width modification step reduces the pulse widths of the multi-pulses when the compared peak level increases as the length of the mark immediately preceding the space decreases, and increases the pulse widths of the multi-pulses when the compared peak level decreases as the length of the mark immediately preceding the space decreases.

8. The optical recording method of claim 1, further comprising predetermining a relationship between differences obtained by comparison of the peak levels of the signals for spaces having the same length according to the lengths of the marks immediately preceding the spaces and magnitudes of changes in the pulse widths of the multi-pulses, wherein the recording pulse width modification step modifies the pulse widths of the multi-pulses according to the predetermined relationship.

9. The optical recording method of claim 1, wherein the spaces have lengths represented in units of periods of a channel clock of the signal portions corresponding to the spaces.

10. The optical recording method of claim 1, wherein the lengths of the marks are represented in units of periods of a channel clock of the signal portions corresponding to the marks.

11. An optical recording device for recording information on an optical recording medium by directing pulsed laser light onto an optical disc, comprising:
 a writing means for forming marks of prescribed lengths by directing the laser light by a write strategy including only a leading pulse or a leading pulse and a multi-pulse, and forming a recorded portion including marks and spaces of prescribed lengths, each space being situated between two marks;
 a space level reading means for reading peak levels of signals corresponding to the spaces, the signals being obtained by reading said recorded portion;
 a recording pulse width modification means for comparing the peak levels of the signals, obtained by reading said recorded portion corresponding to the spaces having the same length, according to the lengths of the marks immediately preceding the spaces, and modifying the pulse widths of the multi-pulses in the write strategy according to results of the comparisons; and
 a writing means for writing to the optical recording medium, using the pulse widths of the write strategy as modified in the recording pulse width modification step.

12. The optical recording device of claim 11, wherein the reading means reads the peak levels of signals for spaces of shortest length as the peak levels of signals corresponding to the spaces, obtained by reading said recorded portion.

13. The optical recording device of claim 11, wherein the reading means reads the peak levels of signals for spaces of second shortest length as the peak levels of signals corresponding to the spaces, obtained by reading said recorded portion.

14. The optical recording device of claim 11, wherein the recording pulse width modification means compares the peak level of a signal obtained by reading said recorded portion corresponding to a space immediately preceded by a mark of shortest length with an averaged peak level corresponding to spaces having the same length as said space immediately preceded by marks of a plurality of other lengths other than the shortest length.

15. The optical recording device of claim 11, wherein the recording pulse width modification means compares the peak level of a signal obtained by reading said recorded portion corresponding to a space immediately preceded by a mark of shortest length with the peak level corresponding to a space having the same length as said space immediately preceded by a mark of a length other than the shortest length.

16. The optical recording device of claim 11, wherein the recording pulse width modification means modifies the pulse widths to make the compared peak levels match.

17. The optical recording device of claim 11, wherein the recording pulse width modification means reduces the pulse widths of the multi-pulses when the compared peak level increases as the length of the mark immediately preceding the space decreases, and increases the pulse widths of the multi-pulses when the compared peak level decreases as the length of the mark immediately preceding the space decreases.

18. The optical recording device of claim 11, further comprising predetermining a relationship between differences obtained by comparison of the peak levels of the signals for spaces having the same length according to the lengths of the marks immediately preceding the spaces and magnitudes of changes in the pulse widths of the multi-pulses, wherein the recording pulse width modification means modifies the pulse widths of the multi-pulses according to the predetermined relationship.

19. The optical recording device of claim 11, wherein the spaces have lengths represented in units of periods of a channel clock of the signal portions corresponding to the spaces.

20. The optical recording device of claim 11, wherein the lengths of the marks are represented in units of periods of a channel clock of the signal portions corresponding to the marks.

21. An optical recording method for recording information on an optical recording medium by directing pulsed laser light onto an optical disc, comprising:
 a writing step of forming marks of prescribed lengths by directing the laser light by a write strategy including only a leading pulse or a leading pulse and a multi-pulse, and forming a recorded portion including marks and spaces of prescribed lengths, each space being situated between two marks;
 a mark level reading step of reading bottom levels of signals corresponding to the marks, the signals being obtained by reading said recorded portion; and
 a recording pulse modification step of comparing the bottom levels of signals obtained by reading said recorded portion corresponding to the marks having the same length, according to the lengths of the spaces immediately preceding the marks, and modifying the front edge positions of the leading pulses in the write strategy according to results of the comparisons.

22. The optical recording method of claim 21, wherein the mark level reading step reads the bottom levels of signals for marks of shortest length as the bottom levels of signals corresponding to the marks, obtained by reading said recorded portion.

23. The optical recording method of claim 21, wherein the mark level reading step reads the bottom levels of signals for marks of second shortest length as the bottom levels of signals corresponding to the marks, obtained by reading said recorded portion.

24. The optical recording method of claim 21, wherein the recording pulse width modification step compares the bottom level of a signal corresponding to a mark immediately preceded by a space of shortest length with an averaged bottom level corresponding to marks immediately preceded by spaces of a plurality of other lengths.

25. The optical recording method of claim 21, wherein the recording pulse width modification step compares the bottom level of a signal corresponding to a mark immediately preceded by a space of shortest length with the bottom level corresponding to a mark immediately preceded by a space of a length other than the shortest length.

26. The optical recording method of claim 21, wherein the recording pulse width modification step modifies the pulse widths to make the compared bottom levels match.

27. The optical recording method of claim 21, wherein the recording pulse width modification step advances the front edge positions of the leading pulses for forming the marks when the compared bottom level increases as the length of the space immediately preceding the mark decreases, and delays the front edge positions of the leading pulses for forming the marks when the compared bottom level decreases as the length of the space immediately preceding the mark decreases.

28. The optical recording method of claim 21, further comprising predetermining a relationship between differences obtained by comparison of the bottom levels of the signals for marks according to the lengths of the spaces immediately preceding the marks and magnitudes of changes in the front edge positions of the leading pulses, wherein the recording pulse width modification step determines a magnitude of the modification of the front edge positions of the leading pulses for forming the marks according to the predetermined relationship.

29. The optical recording method of claim 21, wherein the marks have lengths represented in units of periods of a channel clock of the signal portions corresponding to the marks.

30. The optical recording method of claim 21, wherein the lengths of the spaces are represented in units of periods of a channel clock of the signal portions corresponding to the spaces.

31. An optical recording device for recording information on an optical recording medium by directing pulsed laser light onto an optical disc, comprising:
a writing means for forming marks of prescribed lengths by directing the laser light by a write strategy including only a leading pulse or a leading pulse and a multi-pulse, and forming a recorded portion including marks and spaces of prescribed lengths, each space being situated between two marks;
a mark level reading means for reading bottom levels of signals corresponding to the marks, the signals being obtained by reading said recorded portion; and
a recording pulse modification means for comparing the bottom levels of signals obtained by reading said recorded portion corresponding to the marks having the same length, according to the lengths of the spaces immediately preceding the marks, and modifying the front edge positions of the leading pulses in the write strategy according to results of the comparisons.

32. The optical recording method of claim 31, wherein the mark level reading means reads the bottom levels of signals for marks of shortest length as the bottom levels of signals corresponding to the marks, obtained by reading said recorded portion.

33. The optical recording method of claim 31, wherein the mark level reading means reads the bottom levels of signals for marks of second shortest length as the bottom levels of signals corresponding to the marks, obtained by reading said recorded portion.

34. The optical recording method of claim 31, wherein the recording pulse width modification means compares the bottom level of a signal corresponding to a mark immediately preceded by a space of shortest length with an averaged bottom level corresponding to marks immediately preceded by spaces of a plurality of other lengths.

35. The optical recording method of claim 31, wherein the recording pulse width modification means compares the bottom level of a signal corresponding to a mark immediately preceded by a space of shortest length with the bottom level corresponding to a mark immediately preceded by a space of a length other than the shortest length.

36. The optical recording method of claim 31, wherein the recording pulse width modification means modifies the pulse widths to make the compared bottom levels match.

37. The optical recording method of claim 21, wherein the recording pulse width modification means advances the front edge positions of the leading pulses for forming the marks when the compared bottom level increases as the length of the space immediately preceding the mark decreases, and delays the front edge positions of the leading pulses for forming the marks when the compared bottom level decreases as the length of the space immediately preceding the mark decreases.

38. The optical recording method of claim 31, further comprising predetermining a relationship between differences obtained by comparison of the bottom levels of the signals for marks according to the lengths of the spaces immediately preceding the marks and magnitudes of changes in the front edge positions of the leading pulses, wherein the recording pulse width modification means determines a magnitude of the modification of the front edge positions of the leading pulses for forming the marks according to the predetermined relationship.

39. The optical recording method of claim 31, wherein the marks have lengths represented in units of periods of a channel clock of the signal portions corresponding to the marks.

40. The optical recording method of claim 31, wherein the lengths of the spaces are represented in units of periods of a channel clock of the signal portions corresponding to the spaces.

41. An optical recording method comprising:
forming marks of lengths corresponding to a prescribed number of clock periods by directing pulsed laser light onto an optical disc, and forming a recorded portion including marks and spaces of lengths corresponding to a prescribed number of clock periods, each space being situated between two marks; and
adjusting a pulse width of the laser light for recording so that in a signal obtained by reading the recorded portion, widths of portions corresponding to the marks become equal to the widths of portions corresponding to the spaces of lengths corresponding to the same number of clock periods as the marks.

42. The optical recording method in claim 41, wherein:
the laser light is pulsed according to a write strategy including only a leading pulse or a leading pulse and a multi-pulse; and
adjusting the pulse width of the laser light comprises adjusting the pulse width of the leading pulse in the write strategy.

43. An optical recording method comprising:
a step of forming marks of lengths corresponding to a prescribed number of clock periods by directing pulsed laser light onto an optical disc, and forming a recorded portion including marks and spaces of lengths corresponding to a prescribed number of clock periods, each space being situated between two marks;

a step of measuring widths of portions corresponding to the marks in a signal obtained by reading the recorded portion;

a step of measuring widths of portions corresponding to the spaces in the signal obtained by reading the recorded portion;

a step of comparing the widths of the portions corresponding to the marks with the widths of the portions corresponding to the spaces with lengths corresponding to the same number of clock periods as the marks; and a step of modifying the pulse widths of the laser light for forming the marks based on the comparison result.

44. The optical recording method of claim 43, wherein:
the laser light is pulsed according to a write strategy including only a leading pulse or a leading pulse and a multi-pulse; and
the step of modifying the pulse widths of the laser light includes adjusting the pulse width of the leading pulse in the write strategy.

45. The optical recording method of claim 41, wherein the pulse width of the laser light for recording is adjusted only for marks consisting of certain numbers of periods, among a plurality of marks consisting of mutually different numbers of periods generated according to a modulation rule for recording.

46. The optical recording method of claim 45, wherein the number of periods n of the marks generated according to the modulation rule for recording has values of 3 to 11 and 14 and the pulse width of the laser light for recording is adjusted only for marks consisting of 3 to 6 periods.

47. The optical recording method of claim 41, wherein the pulse width of the laser light for recording marks with k periods (where k is an integer) is also used as the pulse width of the laser light for recording marks with j periods (where j is an integer different from k).

48. The optical recording method of claim 47, wherein the integer j has a larger value than the integer k.

49. An optical recording and reproducing device comprising:
a means for forming marks of lengths corresponding to prescribed numbers of clock periods by directing pulsed laser light onto an optical disc, and forming a recorded portion including marks and spaces of lengths corresponding to prescribed numbers of clock periods, each space being situated between two marks;

a means for measuring widths of portions corresponding to the marks in a signal obtained by reading the recorded portion;

a means for measuring widths of portions corresponding to the spaces in the signal obtained by reading the recorded portion;

a means for comparing the widths of the portions corresponding to the marks with the widths of the portions corresponding to the spaces with lengths corresponding to the same number of clock periods as the marks; and a means for modifying the pulse widths of the laser light for forming the marks based on the comparison result.

50. The optical recording and reproducing apparatus of claim 49, wherein:
the laser light is pulsed according to a write strategy including only a leading pulse or a leading pulse and a multi-pulse; and
the means for modifying the pulse widths of the laser light includes adjusting the pulse width of the leading pulse in the write strategy.

51. The optical recording and reproducing device of claim 49, wherein the pulse width of the laser light for recording is adjusted only for marks consisting of certain numbers of periods, among a plurality of marks consisting of mutually different numbers of periods generated according to a modulation rule for recording.

52. The optical recording and reproducing device of claim 51, wherein the number of periods n of the marks generated according to the modulation rule for recording has values of 3 to 11 and 14 and the pulse width of the laser light for recording is adjusted only for marks consisting of 3 to 6 periods.

53. The optical recording and reproducing device of claim 49, wherein the pulse width of the laser light for recording marks consisting of k periods (where k is an integer) is also used as the pulse width of the laser light for recording marks consisting of j periods (where j is an integer different from k).

54. The optical recording and reproducing apparatus of claim 53, wherein the integer j has a larger value than the integer k.

55. An optical recording method for recording information on an optical recording medium by directing pulsed laser light onto an optical disc, comprising:
a writing step of forming marks of prescribed lengths by directing the laser light by a write strategy including only a leading pulse or a leading pulse and a multi-pulse, and forming a recorded portion including marks and spaces of prescribed lengths, each space being situated between two marks;

a space level reading step of reading peak levels of signals corresponding to the spaces, the signals being obtained by reading said recorded portion;

a multi-pulse width modification step of comparing the peak levels of signals obtained by reading said recorded portion corresponding to the spaces having the same length, according to the lengths of the marks immediately preceding the spaces, and modifying the pulse widths of the multi-pulses in the write strategy according to results of the comparisons;

a mark level reading step of reading bottom levels of signals corresponding to the marks, the signals being obtained by reading said recorded portion;

a front edge position modification step of comparing the bottom levels of signals obtained by reading said recorded portion corresponding to the marks having the same length, according to the lengths of the spaces immediately preceding the marks, and modifying the front edge positions of the leading pulses in the write strategy according to results of the comparisons;

a step of measuring widths of portions corresponding to the marks in the signal obtained by reading the recorded portion and a step of measuring widths of portions corresponding to the spaces in the signal obtained by reading the recorded portion;

a leading pulse width modification step of comparing the widths of the portions corresponding to the marks with the widths of the portions corresponding to the spaces with lengths corresponding to the same number of clock periods as the marks, and modifying the pulse widths of the leading pulses in the write strategy based on the comparison result; and a writing step of writing onto the optical recording medium by using the write strategy as modified in a write strategy modification step including the multi-pulse width modification step, the front edge position modification step, and the leading pulse width modification step.

56. The optical recording method of claim 55, wherein the write strategy modification step includes first executing the multi-pulse width modification step, then executing the front edge position modification step, and finally executing the leading pulse width modification step.

57. An optical recording device for recording information on an optical recording medium by directing pulsed laser light onto an optical disc, comprising:

a writing means for forming marks of prescribed lengths by pulsing the laser light according to a write strategy including only a leading pulse or a leading pulse and a multi-pulse, and forming a recorded portion including marks and spaces of prescribed lengths, each space being situated between two marks;

a space level reading means for reading peak levels of signals corresponding to the spaces, the signals being obtained by reading said recorded portion;

a multi-pulse width modification means for comparing the peak levels of signals obtained by reading said recorded portion corresponding to the spaces having the same length, according to the lengths of the marks immediately preceding the spaces, and modifying the pulse widths of the multi-pulses in the write strategy according to results of the comparisons;

a mark level reading means for reading bottom levels of signals corresponding to the marks, the signals being obtained by reading said recorded portion;

a front edge position modification means for comparing the bottom levels of signals obtained by reading said recorded portion corresponding to the marks having the same length, according to the lengths of the spaces immediately preceding the marks, and modifying the front edge positions of the leading pulses in the write strategy according to results of the comparisons;

a means for measuring widths of portions corresponding to the marks in a signal obtained by reading the recorded portion and a means for measuring widths of portions corresponding to the spaces in the signal obtained by reading the recorded portion;

a leading pulse width modification means for comparing the widths of the portions corresponding to the marks with the widths of the portions corresponding to the spaces with lengths corresponding to the same number of clock periods as the marks, and modifying the pulse widths of the leading pulses in the write strategy based on the comparison result; and a writing means for writing onto the optical recording medium by using the write strategy as modified by a write strategy modification means including the multi-pulse width modification means, the front edge position modification means, and the leading pulse width modification means.

58. The optical recording device in claim 57, wherein the write strategy modification means first executes the multi-pulse width modification means, then executes the front edge position modification means and finally executes the leading pulse width modification means.

* * * * *